(12) United States Patent
Hyman

(10) Patent No.: US 11,978,352 B2
(45) Date of Patent: *May 7, 2024

(54) IMAGE MAKING MEDIUM, COMPOSITIONS AND WORKS OF ART, DESIGN AND ARCHITECTURE

(71) Applicant: Sydney Hyman, New York, NY (US)

(72) Inventor: Sydney Hyman, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,895

(22) Filed: Jun. 6, 2022

(65) Prior Publication Data

US 2022/0301452 A1 Sep. 22, 2022

Related U.S. Application Data

(63) Continuation of application No. 15/647,051, filed on Jul. 11, 2017, now Pat. No. 11,355,027, which is a continuation of application No. 14/584,921, filed on Dec. 29, 2014, now Pat. No. 9,786,194, which is a continuation-in-part of application No. 11/118,975, filed on Apr. 28, 2005, now Pat. No. 8,921,473.

(60) Provisional application No. 60/567,022, filed on Apr. 30, 2004.

(51) Int. Cl.
| | |
|---|---|
| *G09B 11/10* | (2006.01) |
| *B44C 3/04* | (2006.01) |
| *B44C 5/00* | (2006.01) |
| *B44D 3/18* | (2006.01) |
| *B44F 1/00* | (2006.01) |
| *C08K 5/00* | (2006.01) |

(52) U.S. Cl.
CPC .............. *G09B 11/10* (2013.01); *B44C 3/046* (2013.01); *B44C 3/048* (2013.01); *B44C 5/00* (2013.01); *B44D 3/18* (2013.01); *B44F 1/00* (2013.01); *C08K 5/005* (2013.01)

(58) Field of Classification Search
CPC ......... G09B 11/10; B44C 3/046; B44C 3/048; B44C 5/00; B44D 3/18; B44F 1/00
See application file for complete search history.

(56) References Cited

U.S. PATENT DOCUMENTS

| | | | | |
|---|---|---|---|---|
| 8,921,473 B1 * | 12/2014 | Hyman | ..................... | C08K 3/04 524/495 |
| 9,786,194 B2 * | 10/2017 | Hyman | ..................... | B44D 3/18 |
| 11,355,027 B2 * | 6/2022 | Hyman | ................... | B44C 3/048 |

* cited by examiner

*Primary Examiner* — Edward J Cain

(57) ABSTRACT

The present invention relates to a macroscopic, two or three-dimensional support medium that facilitates artistic expression and the creation and display of macroscopic art, design that is applied art and architecture. The invention also relates to various methods of making such novel support mediums and the works of art, design and architecture they are made as or into. Examples are works of art, design and architecture made with new and extraordinary aesthetic and/or functional properties from the use of nanomaterials.

22 Claims, No Drawings

IMAGE MAKING MEDIUM, COMPOSITIONS AND WORKS OF ART, DESIGN AND ARCHITECTURE

CROSS-REFERENCE TO RELATED APPLICATIONS

This application is a continuation of allowed patent application Ser. No. 15/647,051 filed Jul. 11, 2017 that will issue as U.S. Pat. No. 11,355,027 on Jun. 7, 2022 and that is a continuation of patent application Ser. No. 14/584,921 filed Dec. 29, 2014, now U.S. Pat. No. 9,786,194, which a continuation-in-part of patent application Ser. No. 11/118,975 filed Apr. 28, 2005, now U.S. Pat. No. 8,921,473, which claims the benefit of Provisional Application No. 60/567,022 filed Apr. 30, 2004. The content of each prior patent application and issued patent is expressly incorporated herein by reference thereto.

FIELD OF INVENTION

The present invention relates to a medium for making macroscopic, two or three-dimensional works of art, design, pictures and architecture. The present invention also relates to a process for making the medium, it relates to methods for using the medium to make art, design, pictures and architecture, and it relates to the works of art, design, pictures and architecture made.

BACKGROUND OF THE INVENTION

New mediums, new processes, and modifications of conventional mediums and processes often expand the use of formal elements in image making and in the images created. The creation of new images becomes possible, and ideas can be realized in images that could not be comparably achieved using conventional mediums and processes. Consequently, for thousands of years those making images of art, design, pictures and architecture and have focused an enormous amount of work on image making mediums and processes, particularly exploring mediums and processes that were unconventional or experimental for use in image making at the time. This endeavor has continued to this day with science and cutting edge science playing a major role historically. Today designers, artists, architects and other image makers are deeply involved in exploring all kinds of areas of science, technology and related fields in order to develop new artwork, new works of design, new pictures and new architecture; in order to realize their ideas preferably without compromising; and in order to expand and innovate art, design, pictures, architecture and image making. The present invention continues this historical and mainstream current of image making tied to science.

The present invention combines art, design, pictures and architecture with science as never before. The wide and exciting uses of nanomaterials in macroscopic image making, and in macroscopic works of art, design, pictures and architecture, particularly the extraordinary aesthetic effects, features and works that can be created had not been known or explored prior to the work of the Inventor of the present invention (e.g., refer to U.S. Pat. No. 8,921,473). By taking advantage of a wide range of nanomaterials, light-emitting devices, transparent forms and other unconventional and novel materials and processes, and often by focusing on the use of such materials and processes for aesthetic elements, the present invention expands image making, and the present invention expands art, design and architecture.

This invention offers very desirable new mediums and processes for making art, design and architecture as well as novel variations of conventional image making mediums and processes, both of which have many variations, both of which have useful and new aesthetic and functional consequences, and both of which have extraordinary potential. Examples are works of art, design and architecture with new and extraordinary aesthetic and/or functional properties from the use of nanomaterials. Further examples are new works of art, design and architecture made with novel light-emitting devices, or transparent or translucent polymers. As a more specific example, works of art, design and architecture made with nanomaterials can have forms that are slighter, with less mass than would otherwise be possible without compromising their structure or strength. Such works of art, design and architecture can thus have an appearance that is lighter, slighter, thinner, more airy and/or more open than would be possible using conventional materials without compromising the work's strength or structure. In addition, when creating such art, design and architecture, decisions about form can be less determined by practical structural considerations and more determined by other aesthetic and utilitarian considerations.

Artists, designers, architects and other image makers will be glad that there are ways to create works they could only imagine prior to the present invention. They will also be glad that many compositions of the present invention can be used in combination with so many conventional practices in art, design and architecture.

By opening the horizon for image making, this invention promises to expand the variety of new works of art, design and architecture that will exist and because it provides aesthetic and functional changes at a fundamental level, the present invention also has the potential to revolutionize image making, art, design and architecture. Refer to further description in the documents incorporated herein by reference.

SUMMARY OF THE INVENTION

The present invention relates to novel two or three-dimensional support mediums. These mediums facilitate artistic and aesthetic expression and the creation and display of works of art, works of design that are applied art, pictures and/or architecture. These mediums are made using unconventional materials, therefore they enable the artist, designer, architect or other image maker to create art, works of design that are applied art, pictures and architecture with aesthetic and functional elements, features and/or an overall impression that has previously been unachievable.

In embodiments, the invention is a macroscopic, two or three-dimensional support medium for a work of art, design that is applied art or architecture, that facilitates the creation and the display or presentation of a two or three-dimensional work of art, design that is applied art, or architecture. The support medium or work is made macroscopic and two or three-dimensional, with at least one nanomaterial that is not found in nature and that is other than a carbon nanotube or fullerene added to conductive polymer or to a material that has conductive polymer to improve its conductive or emissive properties.

In embodiments, the support medium or work may be made with a macroscopic material or composition that is incapable of actively changing over time using a means more complex than or other than a conventional on/off or dimmer.

In embodiments, the at least one nanomaterial may affect the color or add to the color of the image support and/or the work. In embodiments the support medium or work may be made as or into a two or three-dimensional artwork, work of design that is applied art or architecture that lacks a means of interactivity or of actively changing more complex than or other than a conventional on/off or dimmer.

In embodiments, the support medium or work is made as or into a whole in and of itself with distinct edges or boundaries, and in embodiments, the support medium or work is made as or into a macroscopic two or three-dimensional work of art, design that is applied art or architecture.

In embodiments the work of art, design or architecture is other than a conventional computer, camera, phone, personal digital assistant device, digital photo frame, digital picture frame, portable media player device or utilitarian wrist watch.

The invention also relates to various methods of making such novel two or three-dimensional support mediums, and also methods of making them as or developing them into works of art, works of design that are applied art or works of architecture.

DETAILED DESCRIPTION OF THE INVENTION

The present invention provides novel two or three-dimensional support mediums which are new reinvented versions of a conventional utilitarian fine artist's canvas, canvas panel, canvas pad, art board or drawing pad. These mediums facilitate artistic expression and the creation and display of art, design, pictures and/or architecture, made therewith, thereupon or therefrom. Because these mediums are generally made using unconventional art materials, they can enable the creation of works with formal elements and overall impression that has previously been unachievable.

The inventive image specifications described herein, including the specifications for image support mediums and aesthetic works that are works in progress or complete, can be further understood when used with preferred embodiments disclosed in U.S. Pat. Nos. 7,629,400, 8,669,325 and 8,921,473, each of which is expressly incorporated herein by reference thereto and/or when applied to fitting examples, illustrations and drawings in these documents. For instance, as a few examples of specifications for the compositions of reinvented canvases, canvas panels, art boards, canvas pads, drawing pads, image making books and pads and armatures provided herein, and specifications for image support mediums, image support stabilizers, surface preparation stabilizers, artworks, works of design, architecture and their aesthetic, functional and physical properties and features provided herein can be further understood by the text, examples, illustrations and drawings (Figures) in U.S. Pat. Nos. 7,629,400, 8,669,325 and 8,921,473 describing and showing such compositions.

The inventive image support medium and aesthetic works of the present invention typically have specifications from one or more preferred embodiments.

In preferred embodiments, the inventive medium and aesthetic works of the present invention are made with one or more nanomaterials. In preferred embodiments, use of one or more nanomaterials provides, enhances or enables works of the present invention to have one or more formal elements, aesthetic elements or visible properties that are enhanced or that are enhanced to the extent that they could not be comparably achieved just using conventional materials, methods and practices.

Examples are art, design, pictures, architecture, aesthetic works in progress, finished aesthetic works, image support mediums, reinvented canvases, and image making pads and books with one or more of these properties enhanced or provided by the use of one or more nanomaterials: strength, permanence, rigidity, conductivity; a form or mass that is slighter; a device, machine or system that is enhanced, improved, novel and/or smaller; desirable visual and/or optical effects; control of heat; the ability to detect problems or risks in the work or this ability plus the ability to respond; smart materials; materials that can change or be changed, or that can interact and/or respond; enhanced and/or novel threads, yarns, cords, cables, fibers, fabrics, wires, ropes, textiles, meshes, woven materials; bonding that is enhanced or enabled; enhanced or novel paints, colorants, pigments, dyes, inks, primers, adhesives, layers, films, coatings and surfaces; porosity or absorbency; enhancements for using of multiple parts in works; enhancements for mounting, installation and display of works of the present invention; enhancement for use of movement and sound in works of the present invention e.g., by use of shape memory polymers, and nanomaterials that reduce sound or vibration; and/or enhanced or novel functionality for works of the present invention. Further examples are enhanced and novel aesthetic properties and effects such a sense of being light; a sense of being airy; enhanced or novel aesthetic of light and space; a sense of floating or weightlessness; the appearance that the laws of gravity are being defied; the appearance of precarious balance in inventive images; a sense of being threatening (e.g., due to the appearance of precarious balance); an ethereal sense; objecthood; the perception or the reality of form being dematerialized, etc. Refer to US Patent Application No. 20030035917-A1. Nanomaterials also can make it possible for artists, designers, architects and other image makers to make image making choices based more or based entirely on aesthetics rather than on concerns that are utilitarian, practical or structural, e.g., because nanomaterials can enhance or provide strength to works they may not need as much mass to have the structure needed. Further description and examples are forthcoming and in the documents incorporated herein by reference.

In preferred embodiments the inventive medium and aesthetic works of the present invention are made with or as a light-emitter or light emitting device that is one or a combination of: an organic light-emitting diode (OLED); a light-emitting display screen that is partially or entirely transparent or translucent; a light-emitting display screen capable of flexing or folding; a light-emitting display screen that is approximately about 6 mm thick or thinner; or a light emitter or light emitting device made with at least one nanomaterial, graphene, nanotube, nanocrystal, quantum dot, a quantum dot display, quantum dot lighting, quantum dot light emitting diode and/or QD LED.

In preferred embodiments the inventive medium and aesthetic works of the present invention are made with or as an electronic paper display or e-material, and preferably, the work is: fine art; it is architecture; it is clothing design, hat design or belt design; it is a work of design that functions as a tote bag, a handbag, or a container; it is jewelry design as a necklace, a pin or earrings; or it is a work of design for viewing or display apart from being worn directly upon the human body as jewelry design, clothing design or watch design.

In preferred embodiments the inventive medium and aesthetic works of the present invention are made with or as one or more two or three dimensional display devices and according to (a) and (b), and also preferably according to (c) too:

(a) the work is or has a display device that is light emissive or non-light-emissive, or it is or has a compositional arrangement with two or more such display devices, and (b) the work has the means for using this or these display devices for the creation, development, change and/or recreation of an aesthetic work, art, design, a picture or an architectural work once, twice, multiple times and/or in an ongoing process employing one or more image making options that are greater and/or more complex than those on a viewing device for displaying externally produced images input into it, with the visual effect that can be created visible from one or more of the work's sides or angles, and with this visual effect more complex than or other than that from a conventional on/off switch or dimmer, and preferably (c) the display device or devices are made or developed so that they are free from any separate alternative functionality or purpose that differs from that stated in this claim; or they work as part of or with a computer that is other than a conventional computer.

Thus as an option, two or three dimensional art, design, pictures and/or architecture can be created, developed, changed and/or recreated in a process in which one or more finished or unfinished sketches, versions, variations, works in progress and/or images are generated over any period of time, using one or more of the work's sides or angles.

In preferred embodiments the inventive medium, aesthetic works of the present invention or part thereof are made with or as a visible tangible form or display that is largely or entirely transparent or translucent, and capable of aesthetic change that can be seen from one or more sides or angles, with its visible aesthetic change capable of occurring independent of any separate light source that may be part of the work, with its visible aesthetic change requiring the work to be active rather than entirely passive. The transparent or translucent form or display is preferably part or all of the work which is other than conventional privacy glass.

Thus for example, such a work might be made with: one or more parts or electronic parts that are at least partially transparent or translucent; a conductor or conduit that is at least partially transparent or translucent; a display device that is light emissive or non-light emissive and that is at least partially transparent or translucent such as an OLED, LCD, or another light emitting device; one or more nanomaterials that might be unseen and/or transparent or translucent; polymer electronics and/or a transistor that is at least partially transparent or translucent; a solar cell or other means of having or using energy that is at least partially transparent or translucent; a hologram that is intangible and/or at least partially transparent or translucent; a polymer or polymeric composition capable of responding or responding to stimuli, a trigger, or an influence; and/or a material or form capable of changing or responding with change in light, in response to light, or as a photochromic effect. Such works of these preferred embodiments might be made with one or more: light effects; light projections; light sources; colorants, transparent or translucent colorants, or colorants with light effects; or any other variations described herein or in the documents incorporated by reference.

As further examples, works of the present invention made according to these preferred embodiments with or as a visible tangible form or display that is largely or entirely transparent or translucent and capable of aesthetic change might serve as part or all of: windows, walls, partitions, ceilings, interior design, fashion design, lighting design or furniture design, e.g., they may have a means of mounting, attaching or installing as such. For example, such a work that might be rigid and/or flexible, and may be made with the means to attach or install over a conventional window, wall or ceiling. When examples of such works change, they might become opaque, more opaque or partially opaque. The change of such works may occur at any rate, continuously or discontinuously, and it may present still images, a narrative, a moving image, a video presentation, a film, or an aesthetic work that is seen over time, that unfolds over time or that develops over time as the work changes. Such works may be programmed, and/or interactive or responsive in any way. They may use input employing any method or means. They may work with a connection to the Internet, using a broadcast method, and/or using a wireless method. In addition or instead, they may have any of the other variations described herein and/or in the incorporated documents.

Thus as illustrations, an aesthetic work made according to these embodiments may resemble a conventional artwork, painting or drawing, or a conventional artwork by a well-known artist, designer or architect. It may be at least partially see through, it may even be entirely transparent. It would have one or more of its visible aesthetic elements changing over time at any rate. One or more colors, lines, shapes, forms or figures; its subject matter, narrative or story; a drawing, a picture, a pattern, a realistic depiction, a photographic image, an abstract form or presentation; or a part of any of these may change over time. Such a work might serve as a window, as its entire structure, as part of it or as a sheet that goes over part or all of a window. It might have a solar cell directed at the sunlight outdoors. It might be a self-powered aesthetic work. It might emit light indoors, e.g., when the sun goes down. It might be interactive, responsive, connected to the Internet, with a wireless means, with a means of broadcast or a combination of these. Further examples show graduated color or one or more geometric shapes changing over time. In examples, aesthetic works have a simple shape that changes over time. In other examples an aesthetic work is installed vertically and it shows the sun moving over time like the real sun moves, it shows a realistic or abstracted view of the horizon changing over time as the real horizon changes, or it shows a realistic or abstracted fantasy changing over time.

In preferred embodiments the inventive medium and aesthetic works of the present invention are made with a visible intangible hologram or with such a hologram that is interactive or responsive. As an example, a trigger, stimuli, influence, human interaction or other interaction with such a hologram may bring about visible change in the work, visible change in one or more of its aesthetic elements or in its overall aesthetic.

In preferred embodiments the inventive medium and aesthetic works of the present invention are made with an organic transistor, a transparent transistor, an organic light-emitting transistor (OLET), or a transistor that is a combination of these.

In preferred embodiments the inventive medium and aesthetic works are made with a polymer or with a polymeric composition that has one or more of these specifications: (a) transparency and/or translucency, (b) other desired optical or visual properties, (c) strength, stability, permanence, or the polymer or polymeric composition is prepared to prevent discoloration or other change over time; (d) a stabilizer, a stabilizer that enhances or provides functional and/or aesthetic properties, and/or a stabilizer that enhances permanence or prevents change over time; (e) a nanomaterial; (f) conductivity and/or light emission, or a conductive polymer that is: capable of conducting electricity that flows or is non-static, emits light and/or is in a device so that the conductive polymer is separate from any e-material display, photographic film or photographic paper that might also be part of the work; (g) it is or it is part of an image support medium, an image support stabilizer, and/or a canvas-like support; (h) absorbency, using an absorbent polymer; (i) the ability to be responsive or to respond to a trigger, stimuli or influence; (j) it enables the further processing desired, or it has a surface that bonds to conventional art mediums and applications and/or conventional paints; (k) it provides or enables the image to have an aesthetic or structural element, (l) it is a layer of a display device that may be light emissive or non-light emissive; or (l) a combination of these.

Thus for example, the inventive image support medium might be a clear canvas composition made with transparent and/or translucent polymer, with this clear canvas composition prepared to prevent discoloration and/or other change over time, and with this clear canvas composition other than conventional acrylic sheeting.

In preferred embodiments the inventive medium and aesthetic works of the present invention are made or developed so that they are: sculpture, a mobile, a mural, an openwork form, a kinetic work, pictorial, a painting, fine art, collage, design, architecture, an abstract work of art or design, and/or a wearable work or art or design; or the inventive medium and aesthetic works of the present invention are made or developed so that they show: a figure, an animal, a still life, landscape, nature, the sky, a part or aspect of any of these, subject matter that is not physically present, drawing, painting, an imprimatura, underpainting, collage, a pattern, a depiction or representation of a recognizable subject; a visual effect or design resembling that in a well-known work of art or design or resembling that by a well-known artist or designer; an overall aesthetic shape or form that is figurative or that depicts or represents a recognizable subject; one or more of these that changes or that can be changed over time; or a combination of these.

In preferred embodiments the inventive medium and aesthetic works of the present invention are made or developed so that they resemble a conventional artist's canvas, canvas panel, canvas pad, art board or drawing pad; as an image making book, as an image making pad or so that they resemble a conventional image making book or pad; so that they have deckled edges, irregularities resembling handmade paper, and/or texture resembling conventional canvas; or so that they have an aesthetic texture made by taking one or more positive or negative impressions from one or more organic or natural materials or so that they have an aesthetic texture resembling this.

In preferred embodiments the inventive medium and aesthetic works of the present invention are made or developed so that they have a means of display or installation like or resembling that used on a conventional artwork or picture; and/or they are made or developed so that they have one or more of: a matt or a frame; a means of hanging; a means of mounting or installation on a vertical support or a wall; a pedestal or base; a means that enables them to be freestanding or vertically freestanding; a means by which they can roll, scroll and/or fold; a rigid mount system, a wire mount system, or a combination rigid and wire mount system; or a means of installation, mounting or display that displays the work leaving space between it and the wall, ceiling, floor or other structure from which it is installed, mounted or presented. In preferred embodiments aesthetic works of the present invention are hung, installed or mounted for display as art.

In preferred embodiments the inventive medium and aesthetic works of the present invention are made or developed so that most or all of their utilitarian elements are hidden from view and/or entirely or predominantly unobvious or unapparent to viewers looking at them as a whole, or the work has its utilitarian elements integrated in this way when it is inactive.

As examples of these preferred embodiments, the image-making support medium, the aesthetic work and/or the work of art, design, the picture or the work of architecture are made with one or more parts for mounting, installation or display; with one or more utilitarian parts; with one or more cords, electronic parts, control buttons, wiring, switches, battery, solar cell, or power source; a framework, support or bracing; an interactive feature or part, and/or an input feature or part hidden from view and/or entirely or largely unobvious or unapparent to viewers looking at the work as a whole.

In preferred embodiments aesthetic works of the present invention are made or developed so that they show the signature or distinguishing mark identifying the artist, designer or group of artists and/or designers who created it which is other than the mark of an industrial or commercial manufacturer or scientific organization. In preferred embodiments the aesthetic work has a title as art, design, a picture or architecture.

In preferred embodiments the inventive medium and aesthetic works of the present invention are made or developed with a surface sufficiently clean to render it receptive to superimposed artists' paint, so that it has enhanced bond strength and permanence.

In preferred embodiments the inventive medium and aesthetic works of the present invention are made or developed so that they have a fine-art stabilizer that bonds to or enhances its bond to one or more superimposed conventional artists' paints.

In preferred embodiments the inventive medium and aesthetic works of the present invention are accompanied by instructions for developing the work, instructions for modifying or changing the work, and/or instructions for displaying the work.

In preferred embodiments the inventive medium and aesthetic works of the present invention are made or developed so that they have a means enabling the creation, development and/or change of a visible pictorial, artwork or design element on one or more viewable areas or sides with the work being active rather than entirely passive, so that the visual element is more complex than or other than the visual effect of a conventional on/off switch or a conventional dimmer.

The term "image support medium" or "image support" is used herein to mean a medium, material or composition that is made to be developed into artwork, design, a picture or architecture that is a work in progress or a completed work. Typically such development is done using additive and/or subtractive processes, such as by adding matter to an image support medium and/or by removing matter from it, e.g., by painting it, by adding a part to it and/or by incising it. An image support medium or an image support is typically intended to be a starting and/or supportive material or composition to be used to create an aesthetic work of art, design, a picture or architecture for display and/or appreciation.

As used herein, the term "image" is used to mean a work of art, design, a picture or architecture intended for visual observation. An image can be a work in progress or it can be complete. An image may be realistic, representational, symbolic, abstract, surreal, narrative and/or utilitarian. Further examples of images are paintings, sculptures, pictures, drawings, murals, mobiles, collages, constructions, installations, Computer Art, Video Art, Light Art, Light and Perceptual Art, stage sets, architectural design, furniture design, fashion design, graphic design, crafts, jewelry design, product design, interior design, lighting design, costume design, an edition of ten partitions dividing a room with a jungle printed in and on them, an edition of five tables bearing geometric drawing in graphite and pastel, and an edition of a hundred windows with real organic forms (such as flowers) embedded in them and colorful depictions of similar organic forms painted on them. In general, the term "images" refers to the group of all images, however, the context may further define the group as appropriate.

Inventive images are works in progress and complete works of art, design, pictures and architecture, and include:

(A) images that are recognizable as one or more known forms of art or design, such as architecture, and works that are: realistic, representational, photorealist, abstract, geometric abstraction, surrealist, symbolic, expressionist, minimalist, graffiti art, still life, figurative, portrait, landscape, modernist, folk art, primitive art, kitsch, shaped painting, installation, construction, painting, sculpture, mobile, print, photography, drawing, collage, assemblage, graphic art, furniture design, jewelry design, interior design, fashion design, product design, craft, set design, costume design, pictorial images, or a combination thereof;

(B) images that are recognized as art or design by a curator with proven expertise in contemporary art or design at an American museum of art which is accredited by the American Association of Museums or by an art scholar or an art critic with proven expertise in contemporary art or design; (C) images that are original art, design, pictures or architecture; (D) aesthetic works that are interpretations, statements, expressions, or combinations of these; (E) images that have an aesthetic that is at least minimally apparent; (F) images that function as one or more known forms of art or design, or are in a collection of images such as a museum, or a private or corporate collection; (G) images that are recognizable as creations by a specific individual, such as images recognizable as creations made in a specific circumstance or condition that is not ordinary, or an image made by an image maker who is established or well known as an image maker; (H) images made in limited editions, e.g., in an edition of one, preferably during their first 75 years of existence, in an edition of less than about 1500, more preferably less than about 500; (I) images displayed as art, design or architecture; images displayed as art, design or architecture which are part of a collection of art, design or architecture; images displayed as art, architecture or design using a means of display or installation conventionally used to display art, design or architecture; or images of art, design or architecture displayed in a conventional venue for viewing art, design or architecture. Among examples of these venues are museums and galleries e.g., a museum or gallery dedicated to art, design, architecture or crafts; a museum or gallery with a department dedicated to exhibiting such works; or a lobby that also functions as an exhibition gallery for art, design or architecture. (J) Images of art, design, pictures or architecture bearing the signature, (such as the name or mark) of the artist, designer or creator who made them; or images of art, design or architecture with a title, with a title marked on them or with a title accompanying them by the artist or creator who made them. (K) Images of art, design or architecture accompanied by a certificate of authenticity, bill of sale for art, design or architecture, or other document identifying them as images.

As used herein, "design" refers to images of utilitarian art which are for visual observation, but which are not decoration. Unlike decoration, design inventive images are an end in and of themselves. That is, they do not function as part of something else. They do not merely embellish, ornament, enhance, or beautify something else. As used herein, the term "design" is synonymous with applied art, but it does not include decoration.

"Colorant" or "coloration" refers to anything that is a source of color, or color from any source, e.g., pigments, dyes, light, conductive polymer, particles; elements that are collaged, attached, embedded, or inlaid; printing, painting, image making medium and materials, etc.

The term "e-material" is used to mean: (a) electronic paper; (b) electro-optic displays or mediums that might be bistable, flexible, paper-like, with 2, 3 or more colors, reflective and/or non-light-emissive; (c) technologies used to make these, and/or (d) similar technologies. (Note: electronic papers and/or the technologies used to make them might also be called reflective displays; electro-optic displays; electrochromic systems, electrophoretic coloration or mediums, electrophoretic displays or EPD, electrophoretic information display or EPID, electrophoretic ink, electrophoretic film or EPF, e-paper, epaper, eSign, ebooks, electronic books, e-maps, electronic newspapers, e-newspapers, organic electronic paper, smart paper, smart sign, SmartSign, SyncroSign, smart billboards, electronic ink, e-ink, eink, digital ink, digital paper, flexible displays, paper-like displays, paper quality displays, photonic ink, p-ink, radio paper, updateable radio paper, electronic reusable paper, electrochromatic display, NanoChromics, BiNem, Microcup EPD, iMoD, Ink-in-Motion, Gyricon, other brand names, other variations of any of these, similar names, etc.)

The term "bistable" means having two or more (multiple) stable or resting states during which the e-material, the electro-optic material, the material or the display preferable does not use any energy or electricity (though it may use low energy or it may be stable or resting at its lowest energy state). Activation, a trigger, stimulant or influence such as energy or electricity is preferably only needed to transition from one stable or resting state to another, to change the formal elements, the coloration and/or the display. As used herein the term bistable which conventionally refers two stable or resting states, may mean "multi-stable" referring to more than two stable or resting states.

The term "electro-optic display or medium" refers to a material that has two or more display states differing in at least one optical property, that is capable of being changed one display state to another by an electric field, an electromagnetic field, electricity, light, and/or radio wave. An electro-optic display or medium may or may not be an electrochromic system.

The term "electrochromic system" refers to materials that change color and/or transparency upon application of an electrical potential, when voltage is applied, or by the use of electricity. An electrochromic system is a kind of electro-optic medium or display.

Whereas the term "polymer" in US Patent Application No. 20030035917-A1 might typically or preferably refer to synthetic or non-natural polymers, the use of the term "polymer" with smart materials that are natural polymers or that have them, and the use of the term "polymer" with nanomaterials and/or nanotechnology are exceptions. Used with smart materials, nanomaterials and/or nanotechnology polymer of the present invention might be synthetic and/or natural (e.g., PMMA, glass and/or paper), though it is most often synthetic or non-natural.

The term "stabilizer" or "fine-art stabilizer" as used herein, refers to any object, compound, component, or action that imparts chemical, mechanical, or dimensional stability to an item, either directly or indirectly. Stabilizers include processing aids, as well as materials that reduce or eliminate changes to an image support medium, an aesthetic work or image after it has been formed. Moreover, an image support medium, an aesthetic work or an inventive image may have more than one stabilizer, which may be similar or different.

Often a single stabilizer affects more than one property in a work of the present invention. Typically, the stabilizer includes less than about 40% by volume of the total volume an image however there are significant examples which differ. For example, an image support stabilizer may be one hundred percent of the volume of an image, and a nanomaterial may be any percentage of it ranging from a very small percentage to making up all of its volume depending on the specifications of each individual image. There are also stabilizers that are not part of the composition, such as processing aid stabilizers and energy conducted by a conductive polymer.

One class of stabilizers that are particularly useful in the present invention are color stabilizers, such as those that reduce or eliminate discoloration of polymers. Examples are ultra violet light stabilizers, ultra violet light absorbers, and hindered amine light stabilizers (HALS).

Other useful stabilizers are ingredients added to cPRM i) to cause surfaces of the cPRM exposed to air during the polymerization reaction to form smooth surfaces; or ii) to promote the complete curing of the cPRM. Compositions superimposed upon incompletely cured polymer surfaces that further cure or fully cure them are stabilizers.

Still further useful stabilizers include layers, ingredients and parts that strengthen, reinforce, support, or enhance the support of an image support medium, an aesthetic work or an inventive image, such as layers, ingredients and parts that enhance an image's strength, its stability, its form, or its structure, e.g., so that the image can be set up, installed or displayed for viewing. These layers, ingredients or parts are for example, on or in the polymer in an inventive image. These stabilizers may be polymeric or non-polymeric. Also, it is often desirable that inventive images with these strengthening stabilizers have one or more additional, different stabilizers, such as a stabilizer that preserves the color stability of the polymer depending on the specifications of individual inventive images. Examples of these strengthening stabilizers follow. (a) Fiber, such as fiberglass like surfacing veil fiberglass, and fabric fibers. It is preferred that transparent or translucent conventional fabric (such as shims) that, to the unaided human eye does not have an open weave, that is superimposed by transparent or translucent cPRM that becomes discolored (e.g., yellow or amber discoloration of a polymer caused by exposure to ultra violet light that appears within 3 years of the polymer's formation) is not used. (b) The new unique means of installation and display described herein are in this class of stabilizers, such as the new rigid mount system, the new wire mount system, and the new combination rigid and wire mount system described herein; (c) Other members of this class of stabilizers are types of 2D and 3D image supports used on or in a polymer in inventive images. It is often preferable that these stabilizers be polymeric. Among the many variations of these stabilizers are some of the examples which follow on this list; (d) rigid layers or parts on or in the polymer that strengthen the polymer; (e) layers including a strong polymer such as a cross linked polymer on or in a polymer in an inventive image that is less strong, the use of which makes the image stronger, more stable, function more effectively, or more permanent; (f) layers or parts on or in the polymer, that are or that function as backings, frames, stretchers, crossbars, reinforcing ribs or struts, lead lines (e.g., as in glass works), mats, and frameworks used to reinforce and strengthen conventional images; (g) a layer or part (such as a substrate, an internal layer, or an external layer) that provides or enhances the support of a polymer part or layer which in its use in an inventive image, is weak or not strong, fragile, flexible, delicate, brittle, gelatinous or somewhat gelatinous, or at risk to change over time in form, structure or surface, such as a substrate supporting a conductive polymer or an absorbent polymer in an inventive image, or a rigid part that enhances the structure of flexible polymer in an inventive image; (h) one or more nanomaterials; (i) a processing aid for polymer; or a melt rheology processing aid stabilizer that modifies melt rheology during processing, that lessens the drop off in mechanical or physical properties during processing, and/or that is made with an acrylic polymer formulation; (j) more than one of these examples (a)-(i) used on or in a single inventive image; (k) a strengthening stabilizer with a form that is a combination of two or more of the forms described in examples (a)-(j) used in and/or on an inventive image.

Other types of stabilizers that are useful in the present invention include moisture scavengers; antioxidants; materials that remove bubbles from and/or defoam cPRM; antiozonants; leveling agents; optical brighteners and other compositions that absorb ultraviolet light and fluoresce in the visible blue spectrum; cPRM viscosity modifiers and associative thickeners; and polymerization regulators for example, inhibitors (such as free radical inhibitors).

Other stabilizers protect polymer inventive images or parts thereof against changes in physical properties, or enhance physical or mechanical properties, dimensional stability, or heat resistance of polymer inventive images. Examples are stabilizers that enhance the physical or mechanical properties or the dimensional stability of absorbent polymers, such as ingredients used in absorbent polymers and in cPRM forming absorbent polymers that make them less gelatinous, stronger, or more solid. Other examples are stabilizers for use in inventive images that protect polymers or parts thereof (such as their surfaces) against delamination, peeling, chalking (e.g., pigment washes or rubs off), other reduced adhesion of the primer or top coat, cracking, checking, the loss of coating integrity, loss of surface gloss, loss of surface distinctness, loss of visual depth, or other surface degradation (such as HALS by Ciba-Geigy). There are stabilizers that affect mar resistance, surface slip, or surface flow. There are impact modifier stabilizers; stabilizers that are plasticizers or that maintain or enhance polymer flexibility (such as dibutyl phthalate); and stabilizers that maintain or enhance the hardness of polymers or parts thereof. There are stabilizers that inhibit or protect against organic corrosion in polymers or deactivate metal. There are thermal and heat stabilizers both for processing polymers and for protecting formed polymers. There are stabilizers used in cPRM to control shrinkage as it cures (such as milled fibers). An ingredient added to polymerization reaction mixture or to a polymer to modify the polymer's absorbency is also a stabilizer.

The formation of some polymers typically requires certain stabilizers. For example, specific stabilizers are typically required for the formation of conductive polymers such as those conductive polymers that emit light. Both the process of doping or treating a polymer so that it becomes conductive or more conductive, and the dopant or agent used in such processes are stabilizers. For example, a polymer might be doped so that electrons are removed such as through oxidation (e.g., with chlorine, bromine, or iodine vapor) or so that electrons are introduced such as through reductive doping (e.g., with an alkali metal). Energy conducted by a conductive polymer is a stabilizer in any form, as is the form or device that can supply or carry that energy. Used with a conductive polymer in an inventive image, electrical current, solar power or another form of energy, a battery, and wires that carry energy to a conductive polymer are stabilizers. Moreover, spin casting processes and printing processes (such as ink jet printing) used to apply conductive polymers to image supports, other inventive image surfaces, or parts thereof, are also stabilizers. Stabilizers aid in processing polymers or stabilizers aid in processing polymers using conventional practices, e.g., affecting melt flow, a melt rheology processing aid stabilizer, a lubricating stabilizer, etc.

In some embodiments, PRM is radiation cured, for instance, by the use of ultraviolet light or nearby blue light, or by electron beam (EB). Radiation that initiates or aids polymerization is a stabilizer. A stabilizer might be used that improves the ability to develop formed polymer or formed linear polymer using subtractive processes (e.g., like cutting, incising, drilling, carving, sanding). This stabilizer might be an impact modifier.

One or more ingredients that enable the formation or fortification of the bond between the polymer inventive image and at least one superimposed application or colorant are stabilizers. When mixed into cPRM typically in amounts of about 0.4% to 40% by volume of the total volume of the cPRM, conventional paints, sizes, primers, binders used in conventional image making mediums and materials, conventional mediums for painting, absorbent polymers, cPRM or PRM that forms absorbent polymers, and wax and compositions containing wax, can be stabilizers if they enable the formation or fortification of the bond between the polymer and one or more superimpositions made upon it. Examples of such stabilizers are conventional oil and acrylic paints and painting mediums.

The use of opposing charges can also enable the formation or fortification of a bond. Thus, the use of a negatively or a positively charged monomer stabilizer in a neutral cPRM can enable the formation or fortification of a bond between the polymer formed and an oppositely charged superimposed application, such as a paint, an ink, or another colorant. Such negatively or positively charged monomer stabilizers are preferably used in a neutral cPRM at about 0.4% to 40% (by volume), preferably at about 0.5% to 10%, and more preferably at about 0.5% to 6%. Adhesion promoters such as products made to promote the adhesion of a polymer to a substrate, may also be used as stabilizers in inventive images, such as adhesion resins by Creanova Inc.

Other stabilizers are ingredients added to applications made on polymer inventive images, typically in amounts from about 0.4% to 40%, by volume, but more preferably in amounts from about 0.4% to 25%, by volume of the application's total volume, (i) to cause or enhance the bond between that application and the polymer inventive image; or (ii) to further cure or fully cure the polymer inventive image onto which it is applied. Examples of such stabilizers are cPRM, solvents appropriate for the linear polymer surfaces they are superimposed upon, MEKP, photoinitiators, and other catalysts. Such stabilizers might be mixed into applications, for instance into a conventional image making material or medium (such as a conventional paint, a painting medium or paper pulp); into an unconventional image making material or medium; or into a glue or adhesive.

One or more portions of an inventive image may be vulnerable to agents that modify or damage it undesirably. These portions can be shielded from the undesirable agent(s) by some other portion or component of the inventive image, which may have this capability due to the presence of one or more stabilizers. Thus, for example, the shielded portion or portions of the inventive image may require less or no stabilizer(s) pertinent to the particular undesirable agent or agents. For instance, this shielding effect may be possible due to the relative geometric positions of the shielding and the shielded parts of an inventive image, and by their orientation with respect to the source of the undesirable agent or agents. Examples of undesirable agents are: (1) UV light causing polymer yellowing. Since UV exposure can be directional, then after consideration of reflection, diffraction, etc., such a shielding inventive image part may not necessarily completely envelop the inventive image part it is protecting; (2) Oxygen which might cause discoloration or deterioration of a portion or a component of an inventive image. This agent is not directional. Shielding may be provided by a surrounding element of the inventive image which is impermeable to oxygen, such as one of many plastics. Other coatings might be effective should the post-evaporation material still be fluid closing evaporative pores before the polymerization becomes too viscous (e.g., a polyurethane paint whose solvent evaporates before the liquid mixture polymerizes); (3) Moisture, which should follow the pattern of oxygen, but is more polar than oxygen and typically less reactive, although it does hydrogen bond; (4) Noxious gases or any other diffusible gases which might harm an inventive image. A protective coating can be used if such protection is needed; (5) Substances used to clean or care for the inventive image, e.g., such substances which are solvents for use on polymer are preferably limited to those solvents which do not undesirably alter (for example, dissolve, distort or abrade) any polymer used on an inventive image surface; (6) Any other undesirable agent or agents, e.g., any other undesirable noxious agent. In an illustration, a layer of linear polymer containing a component which absorbs UV without decomposition or discoloration (thus stabilizes itself to UV) on the external surface of an a layer of linear polymer with UV light stabilizer in it on the external surfaces of an inventive image, could protect both the linear polymer and the deeper parts of the inventive image from undesirable effects which might have otherwise resulted from the inventive image's exposure to UV light. Other examples of these stabilizers are the barriers and layers for encapsulation, sealing or hermetically sealing of devices, systems and ingredients like OLEDs, e-materials, circuits, and conductive polymer.

Surface preparation stabilizers are preferred stabilizers. A single inventive image may have one or more surface preparation stabilizers. The formula, y–about 40=about 0.786x, is a preferred linear relationship between "x", the approximate percentage of polymer in the inventive image's surface preparation stabilizers (by volume), and "y", the approximate maximum percentage of surface preparation stabilizer in the inventive image's total volume. Thus, for example, if there is no polymer in the surface preparation stabilizer in an inventive image, this stabilizer includes less than about 40% of the inventive image's total volume. If an inventive image's surface preparation stabilizer is made of about 35% or more polymer, it includes less than about 67.5% of the inventive image's total volume. If an inventive image's surface preparation stabilizer is made of about 70% or more polymer, it includes less than about 95% of the inventive image's total volume.

One kind of surface preparation stabilizer is a composition on the surface of an inventive image or part thereof that (i) causes or enhances bonding to one or more superimpositions; or (ii) functions as an underlayer for further processing by additive or subtractive processes (e.g., as a primer, as underpainting, as underdrawing, as a ground, or as an imprimatura). In completed inventive images, surface preparation stabilizers are at least in part superimposed by one or more compositions that are different from the surfaces they superimpose or different from the polymer beneath the surfaces they superimpose. In addition, or alternately, in completed inventive images, surface preparation stabilizers are at least partially carved, incised, or both. Such surface preparation stabilizers might be made using polymers that may be carved or incised effectively, e.g., they used on image surfaces that cannot be carved or incised as effectively. Surface preparation stabilizers might contribute to inventive images aesthetically or structurally prior to further processing them.

Surface preparation stabilizers and the surfaces or image supports they are used upon may or may not be made or entirely made of polymers of the present invention. Surface preparation stabilizers may be continuous or discontinuous on part or all of one or more inventive image surfaces. For example, a surface preparation stabilizer on a polymer inventive image might be an imprimatura made of a composition that is not a conventional paint, serving as an intermediary enabling a superimposed conventional paint to bond to that polymer that might not have bonded or bonded as strongly to that polymer had it been applied directly onto its surface. The same surface preparation stabilizer or a different one might enable an inventive image to have a carved or incised drawing, pattern, or texture. Depending on their use in an inventive image, one or more conventional image making materials, mediums, or both may serve as a surface preparation stabilizer, e.g., conventional paints, binders, primers, etc. A mixed polymer may be a surface preparation stabilizer. Bonding spots and Separating Layers can be surface preparation stabilizers. Separating Layers may have surface preparation stabilizers on them.

Another kind of surface preparation stabilizer is SSI on a polymer inventive image surface. Whether they are continuous or discontinuous on a polymer surface, SSI are a surface preparation stabilizer, provided they are partially or entirely, yet directly superimposed by: (i) a conventional image making medium (such as paint, ink, pencil, pastel, chalk, pen, crayon, a photographic emulsion, printing, another marker); (ii) a colorant with an unconventional vehicle (such as a paint made with cPRM as its binder); (iii) a conventional or an unconventional underlayer (such as underdrawing, underpainting, a primer, an imprimatura or a ground); or (iv) a combination of these. Thus, for example, SSI superimposed by mediums or materials for the sole purpose of bonding are not stabilizers, and SSI superimposed by protective coatings, fixatives, or sealers are not stabilizers.

Image support stabilizers are both a class of stabilizers and a type of image support. Image support stabilizers are either made to bond to at least one superimposition (such as a paint or ink). Or image support stabilizers are comprised of a polymer composition which by its formulation or design, works well with one or more subtractive processes (such as cutting, carving, or incising). For example, poly-mers made for subtractive processes involving the use of tools that would be ineffective on linear polymer surfaces would typically be made of crosslinked polymer formulations (e.g., tools that heat up as they are used so that their bits or blades get clogged by the linear polymer). Image supports made of greater than about 85% (by volume) polymethyl methacrylate or methyl methacrylate, which are exact, even geometric shapes or forms (like conventional preformed acrylic sheets, rods, cubes, or spheres) and which are preferably transparent or translucent, are typically not image support stabilizers, unless for example, they have surface preparation stabilizers on them made of a different composition (preferably polymeric) in which case they might be image support stabilizers. Also, conventional polymer image supports in the form of sheets and films that are preferably transparent or translucent, are typically not image support stabilizers, (e.g., acetate, MYLAR® and vinyl have all been made into images by cutting), unless for example, they have surface preparation stabilizers on them made of a different composition (preferably polymeric) in which case they might be image support stabilizers.

One kind of image support stabilizer includes at least one polymer that is a transparent polymer or a synthetic translucent polymer. Typically, the volume of these image support stabilizers has a percentage of transparent or synthetic translucent polymer that is at least about 51%, preferably at least about 55%, more preferably, at least about 65%, still more preferably at least about 75%, and most preferably at least about 85%, in different embodiments. A preferred image support stabilizer is made with at least one nanomaterial. Another kind of image support stabilizer includes at least one polymer that is a synthetic absorbent polymer or a conductive polymer. Yet another kind of image support stabilizer includes a surface preparation stabilizer superimposed on at least a substantial portion of at least one surface of an image support.

Separating layer stabilizers are another kind of image support stabilizer. These are substantially planar polymer layers that are at least partially transparent or translucent. The two, planar, opposite sides of a separating layer stabilizer are made to separate superimposed applications, other colorants, carving, incising, or other marking. Thus, for example, separating layer stabilizers enable applications, other colorants, carving, incising, or other marking to be added to inventive images in unlimited layers, without having to be created directly on one another. Separating layer stabilizers may contain one or more nanomaterials, non-polymeric ingredients, or other stabilizers. The compositions of applications or other colorants separated by a separating layer stabilizer must be different from that of the stabilizer, though they may be the same as one another. It is preferable that applications separated by a separating layer stabilizer be bonded to it. Conventional polymer image supports are typically not separating layer stabilizers without an additional stabilizer or additional polymer of the present invention (e.g., sheets and films of polyester, MYLAR®, acetate, and acrylic). As an example, in forming an inventive image, one or more separating layer stabilizers are used to separate layers of paint and incising. This separating layer stabilizer might, for example, be electrically active or comprised of a conductive polymer such as a polymer light emitting diode or PLED.

Image support stabilizers that are not separating layer stabilizers are typically the principal element in their inventive image's shape or form, and they typically remain so in the completed image. Of the completed inventive image's total volume, image support stabilizers typically comprise about 51% to 100%, preferably about 55% to 100%, more preferably about 65% to 100%, still more preferably about 70% to 100%, and most preferably about 75% to 100%, in different embodiments. Image support stabilizers which are not separating layer stabilizers are often part of their image's structure also. Among examples are image support stabilizers made using rigid polymers, and image support stabilizers made using flexible polymer, that may for example, be bonded to one or more other polymeric or non-polymeric elements that provide structural support. An image support stabilizer may therefore be an inventive image's principal structural element, its entire structure, or almost its entire structure. In another example, flexible image support stabilizers can rely on another image part or on their method of installation or display for structural support to any degree, (e.g., a flexible image support might be draped over another image part or over a pedestal).

Image support stabilizers made to bond to at least one superimposition are typically, at least partially superimposed by at least one bonding composition that is different from their composition. Image support stabilizers made for further processing using a subtractive process are typically further processed as such. Image support stabilizers may be made of one or more polymers. If desired, image support stabilizers may have one or more other stabilizers as ingredients (e.g., they may have one or more fiber stabilizers, UV light stabilizers, doped conductive polymers, electrodes for conductive polymers, or surface preparation stabilizers). As an example, an inventive image support stabilizer might be a 2D or 3D transparent or translucent polymer form that bonds to a superimposed conventional paint, or that can be effectively incised or carved using a hand held tool. Typically, image support stabilizers that are not separating layer stabilizers do not have their function as the image's principal shape or form changed as they are processed.

It is preferable for image support stabilizers to be made with a percentage of one or more conventional polymer image supports or other conventional polymer image making mediums (e.g., conventional acrylic paints, gels, or sheets, or a conventional polymer film like acetate, MYLAR® or Denril made by Borden and Riley Paper Co. Inc. in Hollis NY), which is up to about 60%, preferably up to about 55%, more preferably up to about 50%, still more preferably up to about 45%, still more preferably up to about 40%, still more preferably up to about 35%, still more preferably up to about 30%, and most preferably up to about 25%. Moreover, it is often desirable for image support stabilizers to be made without conventional polymer image supports or without other conventional polymer image making mediums with the exception of conventional polymer paints like acrylic paints. If the polymer in an image support stabilizer is comprised of a percentage (by volume) of one or more conventional polymer image making mediums that is preferably greater than the amounts listed above, then (a), (b) and/or (c) are typically preferable: (a) at least one stabilizer that is not an image support stabilizer (such as a fiber stabilizer, a color stabilizer like a UV light stabilizer, a doped conductive polymer, electrodes for a conductive polymer, or a defoamer stabilizer), is preferably added to the conventional polymer as part of the image support stabilizer; (b) the inventive image preferably has at least one other stabilizer that does not include conventional polymer image making mediums (in addition to this image support stabilizer), and/or (c) the image support stabilizer preferably also contains polymer of the present invention or the conventional polymer medium is not included in the calculation of the total polymer in the image support stabilizer.

In addition, it is generally preferable for an image support stabilizer to contain at least one stabilizer that is not an image support if the percentage (by volume) of one or more preformed conventional polymeric materials with exact, even geometric shapes or forms (like conventional polymer sheets, films, rods, bars, cubes, bowls, or spheres) used in the image support stabilizer is greater than about 65%, preferably greater than about 50%, more preferably greater than about 30%, still more preferably greater than about 18%, and most preferably greater than about 8%.

Preferred Embodiments of the Present Invention

In the preferred embodiments, at least a part of an inventive image is transparent or translucent. In preferred embodiments the image support medium is partially or entirely made with polymer or transparent or translucent polymer.

In embodiments, two or three dimensional image support mediums, aesthetic images and parts thereof are made by (i) preparing a mold or image support; (ii) preparing a PRM of one or more materials capable of forming a polymer, with other ingredients if desired, or preparing a solution with a polymer; (iii) adding at least one catalyst to the PRM before or after it is put on the mold or image support, or preparing the polymer in a solution; (iv) optionally, before or after the previous step or the step which follows, adding at least one stabilizer to the PRM, to the cPRM (liquid or gelled), or to the polymer; (v) putting the PRM or the cPRM or the solution on at least one part of a mold, image support or image support made of polymer, wood, paper, stone, ceramic, metal, fabric, or glass. The composition created may be the image desired, or if desired it may be an image support medium that is further processed. In addition to this process, there are other preferred processes. Image support mediums made in this way might provide most or all of the shape, form and/or structure to the image or part thereof.

In preferred embodiments, an inventive image or part thereof is made with poly(methyl methacrylate) or acrylic (PMMA) that is: (a) a syndiotactic PMMA, (b) a high molecular weight PMMA, or (c) a PMMA with a high glass transition (Tg). An inventive image or part thereof might be made with a polymeric formulation made with one or more of the PMMAs in the preceding (a)-(c) plus at least one other ingredient that may be a polymer or an ingredient that enhances the ability of the formed polymer to bond to superimpositions like paints. As preferred examples, one of the preceding PMMAs might be made as: (d) a copolymer with the second polymer having a high molecular weight or a higher molecular weight than the PMMA, (e) a copolymer with the second polymer having a high glass transition (Tg) or a higher glass transition (Tg) than the PMMA. In related embodiments, an inventive image or part thereof is formed with a copolymer made with a conventional PMMA plus a second polymer having a high molecular weight or a higher molecular weight than the PMMA. Or this copolymer might be made with a conventional PMMA plus a second polymer having a high glass transition (Tg) or a higher glass transition (Tg) than the PMMA. It is preferable to make sure that the polymers used in all of these copolymers are compatible. Use of these kinds of PMMAs may be desirable because they may be more rigid or less sagging than conventional PMMA, e.g., for use in or as a strengthening stabilizer, or an image support that may be a stabilizer. In other preferred embodiments, an inventive image is made with polymer formed with a melt rheology processing aid stabilizer that modifies it's melt rheology or that lessens the drop off in its mechanical or physical properties during processing. Such a melt rheology processing aid stabilizer might be used to form one or more of the kinds of PMMA described above in this paragraph. Use of a melt rheology processing aid stabilizer may for example, decrease the sagging or increase the rigidity of formed polymers such as linear polymers like acrylics, for example to form thin acrylic inventive images or image supports that may be stabilizers, e.g., making them less floppy or rigid makes further processing and/or display easier. Examples of melt rheology processing aid stabilizers are made with acrylic, they have a high molecular weight, they may be used at a low percentage (e.g., at about 1% or from about 0.5% to about 2%), and they will not alter or decrease the permanence of the polymer or the acrylic formed. Examples of melt rheology processing aid stabilizers are made by Rohm and Haas which is part of Dow Chemical, such as Paraloid™ K120ND and Paraloid™ K130D which are preferred for use in forming clear acrylic.

In embodiments, the polymer, the linear polymer or the acrylic polymer in an inventive image is formed with a stabilizer that improves the ability to develop it after it is formed using subtractive processes, such as by cutting, incising, drilling, carving, sanding, etc. An example of such a stabilizer is an impact modifier. In embodiments, polymer in an inventive image has an impact modifier stabilizer, e.g., polymer with an impact modifier may be the entire inventive image or part of it, such as an image support stabilizer, a strengthening stabilizer, a means of display or a part of such a means or another inventive image part. Among the properties an impact modifier might impart or enhance in a linear polymer like acrylic are an increase in its workability particularly with subtractive processes. These are additional examples of impact modifier stabilizers for use in inventive images. Examples of impact modifiers from Rohm and Haas (www.rohmhaas.com) which is part of Dow Chemical, Midland Michigan are: Paraloid™ products such as Paraloid™ HIA-80, Paraloid™ BTA-717, Paraloid™ BTA-730, Paraloid™EXL products, and others. More examples of impact modifiers for inventive images are: stabilizers made with various forms of acrylic; MBS copolymer; Poly(ethylene/maleic anhydride); Poly(maleic anhydride 1-octadecene); Poly(glycidyl methacrylate). Further examples of impact modifier stabilizers are from Arkema Inc. of Philadelphia PA (www.arkema-inc.com) such as their Clearstrength® and Durastrength® products and from Altuglas www.plexiglas-.com which is part of Arkema. Preferred examples of acrylic resins or pellets made with an impact modifier for use in inventive images are: Plexiglas® Impact Modified Acrylic Resins from Altuglas such as Plexiglas® DR, Plexiglas® MI-7, Plexiglas® HFI-7, Plexiglas® HFI-10, Plexiglas® SG-7 and Plexiglas® SG-10. Examples of acrylic sheets made with an impact modifier in them from Altuglas' are Plexiglas® T and Plexiglas® SG Plus. Further examples are from Plaskolite Inc. www.plaskolite.com of Columbus Ohio, such as their Duraplex® impact modified acrylic sheets.

In preferred embodiments, an inventive image, part thereof or an image support which may be a stabilizer, are formed using both a melt rheology processing aid stabilizer and an impact modifier stabilizer, e.g., formed using an acrylic like Plexiglas® with both stabilizers.

In various embodiments, inventive images are designed with two or more different polymers that are at least partially superimposed or connected. One or more of these polymers might be in layers, parts, or applications in or on the image (e.g., on the other, different polymer or polymers). The compositions may or may not also contain non-polymeric ingredients. At least one of these superimposed or connected polymers in the compositions of these embodiments provides, enhances or enables the image to have at least one aesthetic element, such as emitted light, other light effects, video effects, coloration, optical effects, transparency, translucency, the ability to bond to at least one superimposed medium (such as a colorant like paint or ink), or the ability to be developed by subtractive processes. In addition, at least one different polymer in the polymeric compositions of these embodiments, provides support to the polymeric composition. Thus, for example, a polymer which is desirable for use in an inventive image for aesthetic purposes, but which is weak or less strong or permanent than desired, is strengthened or made more permanent, and often is made more functional in the image desired too. Such designs using different polymers are often desirable in the use of absorbent polymers, conductive polymers, flexible polymers, and other polymers that are aesthetically desirable but might be weak or used in a small percentage or a thin application.

In embodiments, inventive images or part thereof such as image supports (e.g., stabilizers) are made of at least three superimposed layers. The two outer layers are made of one or more polymers chosen for their stability, permanence, optical properties, aesthetic properties and their ability to be further processed if desired (e.g., their ability to bond to superimpositions). For example, the outer layers might be made of acrylic, e.g., with added stabilizer(s) to prevent discoloration and/or deterioration of ingredients that may not be stable such as by using a UV light stabilizer, a UV light absorber and/or other such stabilizers described in US Patent Application No. 20030035917-A1. If desired, one or more nanomaterials might be added also, such as nanomaterials that enhance or enable bonding, desirable surface properties, permanence, strength, rigidity, and/or any of the other properties described herein. The middle layer is selected to give strength and structural support to the form, e.g., a large thin sheet of acrylic will sag and flop thus a central layer of a material that gives strength and support can enable the image's form to remain thin even though it may be large. It is generally desirable for this central layer to have a stabilizer to prevent discoloration and deterioration also, e.g., a UV light stabilizer, a UV light absorber and/or other such stabilizers described in US Patent Application No. 20030035917-A1.

In some embodiments, inventive images are made that are less strong or less permanent than they might be, as an aesthetic choice, to facilitate the process of creation desired, or to enable the image to function best for its purpose or for one of its purposes.

When using more than one kind of material or medium in an inventive image, and these different ingredients are not on physically separate parts of the image, it is desirable to be mindful of differences in the parameters of their expansion, such as differences in their coefficients of thermal expansion and differences in comparable parameters of any other kind of expansion (like expansion due to absorption of moisture such as humidity absorbed by a hydrophilic plastic or by paper in an image). When differences in the parameters (coefficients) of expansion of different inventive image ingredients are significant or great, it is desirable to ensure that these differences do not risk or cause undesirable effects to the resultant inventive image (such as a decrease in its strength, actual cracking, or bending or the risk of loss of strength). It is preferable that all measures taken for this purpose be tailored to the precise specifications of each inventive image, e.g., ingredients can be substituted, or the image can be designed to avoid or decrease the likelihood of such undesirable effects.

In embodiments, a polymer inventive image surface that may have nanomaterials or other smart materials is corona treated. A corona treatment might also be called a corona discharge treatment. In examples, such a corona treatment enhances and/or enables bonding of the polymer surface to superimpositions such as to adhesives and colorants (like inks, paints, coatings, etc.).

In embodiments, products conventionally used as adhesives and/or products conventionally used to make adhesives are used to make inventive images or part thereof. In illustrations, an adhesive product, a mixture of two or more adhesive products, or a mixture containing at least one adhesive product is used: i). to connect inventive image parts, ii) in or as a surface preparation stabilizer (e.g., to bond to conventional art materials like paints and pastels), iii) in or as an inventive image surface, iv) to make bonding spots, or v) to make a Separating Layer. In a further illustration, an adhesive product is made of or with a form of acrylic. In embodiments, cPRM used to make inventive images or part thereof is a polymeric solution. Once applied, it may bond to superimpositions (like conventional image making mediums) or it may have a stabilizer that enables or enhances such bonding. In embodiments, it is preferable that polymeric solutions or adhesive products used to make inventive images have relatively low molecular weights. In embodiments, the surfaces of inventive images or parts thereof are made of one or more polymeric solutions and/or adhesive products that are capable of bonding to superimposed conventional art materials, paints, pastels, inks, and/or adhesives. Although these inventive image surfaces made of one or more polymeric solutions and/or adhesive products may bond to one or more superimpositions when they are wet or when they are tacky or sticky, it is more preferable that they bond to one or more superimpositions when they are dry, and most preferable when they are dry, not tacky and not sticky.

In preferred embodiments, a solution containing at least one polymer and/or at least one monomer is used to make inventive images. For instance, a solution from one of these embodiments might be used to enable or enhance bonding to superimposed applications. Examples of the solutions that might be used in these embodiments are the PARALOID products by Rohm and Haas of Philadelphia PA, Golden Artist Colors Mineral Spirits Acrylic products, and adhesive products. In embodiments, inventive images or part thereof are made with one or more of: PARALOID such as: PARALOID B-67 MT; Paraloid A10S; Paraloid A-11; Paraloid A-101; Paraloid B-60; Paraloid B-66; Paraloid B-72; Paraloid B-82; ACRYLITE® OP3 acrylics by Cyro Industries of Rockawy, NJ (www.cyro.com); products by Golden Artist Colors of New Berlin, NY www.goldenpaints.com; isobutyl methacrylate, n-butyl methacrylate, P(BA/MMA), a MMA/BMA copolymer, butyl methacrylate, P(BA/MAA/MMA), styrene/acrylic copolymer, ethylmethacrylate polymer; ELVACITE by Lucite International of Cordova TN such as: Elvacite 4067; or the Ciba Geigy stabilizers: TINUVIN 770; TINUVIN 770DF; TINUVIN 234 and TINUVIN 328.

In preferred embodiments, an ingredient is added to a polymeric solution that may have at least one nanomaterial and/or other smart material, or that may be a nanomaterial and/or smart material. This ingredient is one or more of: i). a colorant that has a binder, ii). the binder for a colorant, iii). an adhesive product, iv). a primer, gesso, or sizing material, v). the binder for a primer, gesso, or sizing material, vi). an ingredient that is compatible with one of these, vii). nanomaterials, or viii). a combination of these. Examples of such ingredients are: an art material or its binder, such as paint, a drawing material, a printing material, a photographic emulsion, a binder for any of these (e.g., ink or the binder for ink), nanomaterials. Among other examples of such ingredients are an adhesive product; a primer, gesso, or sizing material or the binder for one of these; a binder that contains acrylic, a material that is compatible with any of these, or a mixture of two or more of these. More specific examples of such ingredients are: linseed oil, poppyseed oil, safflower oil, wax, hide glue or rabbit skin glue, gum arabic, SWNT, nanoparticles, nanofibers, other nanomaterials, acrylic emulsions or vinyl resins used in paint, in gesso or in primers; acrylic emulsions compatible with those used in acrylic paints, in gesso or in primers (like GAC products by Golden Artist Colors such as GAC 100 and 200, or like RHOPLEX by Rohm and Haas), alkyd binders, vinyl paints, vinyl binders, oil paint, acrylic paint, alkyd paint, etc. In examples, the proportions of mixtures made in these embodiments are optimized in order to create the strongest bond possible to a) the substrate each mixture will be applied upon and/or b) to one or more subsequent superimpositions. Preferably this is done without compromising other aspects of the inventive image's permanence or the aesthetic desired. In another example, in mixtures produced in these embodiments, the percentage (by volume) of the ingredient or ingredients (collectively) added into the initial polymeric solution may preferably be less than about 50%, more preferably about 40% or less, desirably it may be more than about 0.2%, preferably more than about 0.4%, preferably it may be less than about 30%, more desirably less than about 25%, more preferably less than about 18%, and most preferably less than 10%.

In a more specific example, an ingredient such as those in the description above, is added to a polymeric solution that contains a form of acrylic, e.g., a solution containing an acrylic polymer, an acrylic copolymer, isobutyl methacrylate, n-butyl methacrylate, P(BA/MMA), a MMA/BMA copolymer, butyl methacrylate, P(BA/MAA/MMA), styrene/acrylic copolymer, methyl methacrylate, ethylmethacrylate polymer, etc. (such as Golden Artist Colors MSA products and the PARALOID products). Such a mixture might for example form an inventive image or a part thereof such as an image support (e.g., stabilizer), or a surface preparation stabilizer, etc. For instance, such a mixture might be applied on an inventive image surface that is wholly or partially acrylic.

In other preferred embodiments, an inventive image or a part thereof is made using a polymeric solution in: i). mineral spirits, ii). turpentine, or in iii). another solvent that is compatible with oils (such as linseed oil, safflower oil or poppyseed oil), and/or alkyds (such as conventional alkyd art materials like LIQUIN by Winsor and Newton of Harrow, Middlesex England, refer to www.winsornewton.com). For example, this might be a solution made using one or more of these products:

a) a solution containing a form of acrylic (refer to the examples above);
  b) one of Golden's MSA materials or a mixture containing two or more of them;
  c) PARALOID B-67 MT resin solution;
  d) ELVACITE products;
  e) another such polymeric solution, and/or
  f) a mixture of two or more of these. For instance, these solutions might be used to make an inventive image or part thereof, such as an image support that might be a stabilizer, or a surface preparation stabilizer. In a variation, one or more ingredients might be added to polymeric solutions in these embodiments which may for instance, be one or more: nanomaterials, nanomaterials that enhance or enable bonding, other smart materials, oil or alkyd paints, oil or alkyd paint binders (such as linseed oil, poppyseed oil, safflower oil or LIQUIN), oil or alkyd based adhesive products, oil or alkyd based primers, gessos or sizing materials or the binder(s) for these; or a combination of these. In examples, the proportions of these mixtures might be optimized in order to create the strongest bond possible to a). the substrate each mixture will be applied upon and/or b). one or more subsequent superimpositions. However in other examples, it is preferable that the amount of the ingredient or ingredients (collectively) mixed into the polymeric solution, be a smaller percentage of the total mixture than the amount of the polymeric solution used, (e.g., examples of specific preferred percentages are provided above).

The polymer formed using the solutions in any of these or other such embodiments, the polymer formed using the adhesive products described herein or in US Patent Application No. 20030035917-A1, or the polymer formed using mixtures containing one or more of these, might for instance, function as part or all of an inventive image, an image support (e.g., stabilizer), or a surface preparation stabilizer; it might function as coloration, as bonding spots, as a Separating Layer, and/or as an underlayer (e.g., as underpainting, underdrawing, an imprimatura, a ground or another kind of underlayer). These inventive images might be further processed, for instance, in additive and/or subtractive processes. (All of these aspects of inventive images are further described in US Patent Application No. 20030035917-A1.) Inventive image surfaces (such as surface preparation stabilizers) of these embodiments may for instance, be superimposed, e.g., by one or more applications such as paints, conventional art materials, pastels, by attachments, etc. The superimposition(s) might for example, bond to one or more ingredients added into the surface of the inventive image superimposed. This ingredient or these ingredients (collectively) might for example, be added into the mixture used to form such inventive image surfaces at any percentage, e.g., measuring by weight the percentage might be between about 0.75%-35%, more desirably between about 1.5% and 30%, more desirably between about 3% and 25%, more preferably between about 3% and 20%, most preferably between about 3% and 16%, most preferably between about 3% and 12%, and most desirably between about 3% and 9%.

Examples

Preferred examples of the foregoing follow.

Example 1). An inventive image surface that may or may not have one or more nanomaterials or other smart materials such as any of the examples herein, (such as a surface preparation stabilizer) made with a polymeric solution and/or an adhesive product to which an oil or a bonding ingredient is added (e.g., in the form of an adhesive product, a primer, a gesso, a paint, a printing material, a binder, or a sizing material that is comprised of oil or that contains oil; or in the form of a compatible ingredient) might be superimposed by: i). the same material or materials that were added into the polymeric solution, the adhesive product, or the mixture containing one or both of these; by ii). one or more materials which contain the ingredient or which contain at least one of the ingredients added into the polymeric solution, the adhesive product, or the mixture containing one or both of these; iii) a material compatible with one of those described in i). or ii). Such inventive image surfaces might for example, be superimposed by oil paint, oil pastels or encaustics; and/or by an adhesive product, a primer, a binder, gesso, ink, or a sizing material containing oil.

Example 2). An inventive image surface that may or may not have one or more nanomaterials or other smart materials such as any of the examples herein, (such as a surface preparation stabilizer) made with a polymeric solution and/or adhesive product, to which at least one acrylic ingredient is added (e.g., such as an acrylic emulsion, an acrylic solution, another acrylic binder, and/or an adhesive product, primer, gesso, size or paint containing acrylic, etc.), might be superimposed by one or more of: i). the material that was added into the polymeric solution or adhesive product, the mixture containing one or both of these, or a compatible material, ii). a material which contains at least one of the ingredients added into the polymeric solution or adhesive product, the mixture containing one or both of these, or a compatible ingredient, iii). an oil paint, an oil pastel, encaustic or other oil based image making material, iv). a combination of these, such as superimposed acrylic paint and/or attachments made using an acrylic adhesive product (e.g., collage). Such inventive images might for example, be superimposed by an acrylic paint.

Example 3). An inventive image surface that may or may not have one or more nanomaterials or other smart materials such as any of the examples herein, (such as a surface preparation stabilizer) made with a polymeric solution and/or an adhesive product to which an alkyd is added (e.g., in the form of an adhesive product, a primer, a gesso, a paint, a binder, or a sizing material that is comprised of alkyd or that contains alkyd, or in the form of a compatible added ingredient) might be superimposed by: i). the same material or materials that were ingredients added into the polymeric solution, the adhesive product, or the mixture containing one or both of these; by ii). one or more materials which contain the ingredient or at least one of the ingredients that was added into the polymeric solution, the adhesive product or the mixture containing one or both of these, iii) a material compatible with one of those described in i). or ii). Such inventive image surfaces might for example, be superimposed by oil or alkyd paint, by oil or alkyd drawing materials; by encaustics; by an adhesive product, a primer, a binder, gesso or a sizing material containing oil or alkyd; and/or by an ink containing oil or alkyd.

Example 4). An inventive image surface that may or may not have one or more nanomaterials or other smart materials such as any of the examples herein, (such as a surface preparation stabilizer) made with a polymeric solution and/or an adhesive product to which a vinyl is added (e.g., in the form of an adhesive product, a primer, a gesso, a paint, a binder, or a sizing material that is comprised of vinyl or that contains vinyl, or in the form of a compatible added ingredient) might be superimposed by: i). the same material or materials that were ingredients added into the polymeric solution, the adhesive product or the mixture containing one or both of these; by ii). one or more materials which contain the ingredient or at least one of the ingredients that were added into the polymeric solution, the adhesive product or the mixture containing one or both of these, iii) a material compatible with one of those described in i). or ii). Such inventive image surfaces might for example, be superimposed by vinyl colorants like a paint (such as FLASHE® by Lefranc and Bourgeois of Le Mans, France); and/or by an adhesive product, a primer, a binder, gesso or a sizing material containing vinyl, such as emulsified vinyl glues like a polyvinyl acetate (PVA) glue (e.g., to make attachments, to collage, to connect parts, etc.).

Example 5). Inventive image surfaces that may or may not have one or more nanomaterials or other smart materials such as any of the examples herein, made using:
a) polymeric solutions (with or without added ingredients such as the examples of polymeric solutions), which are solutions in mineral spirits, in turpentine, and/or in another solvent that is compatible with oils and/or alkyds, e.g., the solvent is compatible with oils used in art materials or compatible with alkyd art materials,
b) oil based or alkyd adhesive products (with or without added ingredients), or
c) a combination or a mixture of these,
any of which might for example be superimposed by: i). oil or alkyd paints or inks, ii). oil based marking materials or marking materials that contain oil such as pastels, oil based pens, iii). encaustics, iv). other oil or alkyd based art materials or colorants, v). other art materials, vi). a bonding solution containing acrylic, vii). bonding adhesive products (such as adhesive products that contain oil or alkyd ingredients), viii). a solution in the same solvent or in a solvent that dissolves the inventive image surface at least a little, or, ix). a combination of these.

These examples and embodiments might for instance, be used to make new kinds of 2D or 3D canvases, walls, and sculptures (with or without utilitarian functions) that can be marked upon and colored, e.g., painted, drawn upon, collaged, that can have photographic pictures added to them, attachments, etc.

Additive and/or subtractive processes can typically be used to make and/or rework inventive images, one or more times, at one or more stages in the image's formation or anytime thereafter, as desired. In various embodiments, more cPRM, polymer, a device, an OLED and/or one or more other ingredients are added to an inventive image, (e.g., to its polymer). In various embodiments, cPRM, polymer and/or one or more other ingredients are subtracted from an inventive image, e.g., by cutting, sanding, sandblasting, other abrading processes, carving, engraving, cutting, chiseling, incising, removing connections or hardware, and/or by breaking it, using any of a wide variety of tools, conventional practices, and/or by hand. The addition and/or subtraction of polymer and/or other ingredients typically offers workability, reworkability and controllability in making inventive images and it can create and/or affect one or more formal elements of an image. Those of ordinary skill in the art will be able to envision many other suitable additive and/or subtractive processes for use in working the medium of the invention.

The compositional arrangement of inventive images are unlimited and often workable, reworkable and controllable as desired. Inventive images can be formed in any process or processes desired, as will be readily understood by those of ordinary skill in the art.

Polymers of the present invention may have linear chains, and/or may be crosslinked. Materials used in forming polymer of the present invention typically include one or more polymerizable monomers, and one or more initiators or catalysts which are appropriate for polymerizing the specific monomer or monomers, preferably mixed together. Some polymers like conductive polymers may be used in solution in forming inventive images, e.g., conductive polymer in a solution applied to an image support. In another example, a cPRM for the present invention might be comprised of only one monomer and its initiator or catalyst. However, multiple monomers (preferably mixed), pre-polymers, polymers, multiple initiators and/or catalysts (preferably mixed), or combinations of these can be used to form polymer, as desired. Should any of the monomers require a specific catalyst, it is preferable to add that catalyst into the mixture. In forming many inventive images, the monomer, or at least one of the monomers, used is capable of forming polymer that preferably contributes aesthetically to the composition, e.g., it may be transparent or translucent, it may have desired optical properties (such as a particular refractive index and/or light transmittance), it may have other desirable aesthetic properties, it may be strong or stabile in a manner which enables the image to be permanent, it may enable further processing as desired, or a combination of these. In particular, preferred monomers include esters, urethane-forming components, acrylics, ethylene-forming monomers, monomers that form conductive or absorbent polymers, or any other suitable monomer. Preferably, the PRM forms polymer with desired aesthetic properties or so that it enables desired aesthetic properties in the image.

In a preferred embodiment, inventive image supports are made using the polymer, with or without other ingredients. They may or may not be stabilizers. These image supports have noticeable irregularities or imperfections in their shapes or forms. For example, they look handmade, whether or not they are, e.g., they have irregularities like those commonly seen in handmade papers and in papers with deckled edges (papers with deckled edges can look handmade when they are not). In comparison to the shapes and forms in which conventional polymer is commonly available commercially, (e.g., in smooth even sheets, and rods, cubes, pyramids and spheres with exact forms, etc.), the image supports in this embodiment are not even, perfect, exact, smooth, or they do not have other such regular or machine made appearances. Though they might be symmetrical, geometric, or machine made, image supports of this embodiment have clearly visible irregularities or imperfections in shape or form. Another example is a 3D rectangular image support with undulations or irregular bumps (not a perfect even texture). Image supports of this embodiment might be used as initial image supports. Image supports of this embodiment might be further processed as desired, e.g., as paintings.

It is typically desired that inventive images are permanent or that they are as stable, as long lasting or as permanent as possible. For example, it is preferred that coloration of inventive images does not substantially change undesirably over time. It is preferred that parts of inventive images that change undesirably over time be replaceable, rechargeable, or repairable, e.g., electronic parts, light emitting parts, batteries or OLEDs that have a limited lifespan. Or, for instance, over time changes such as a yellow or amber color develop on some polymers which may be undesirable. It is generally desirable to use one or more stabilizers to enhance the permanence of inventive images.

Nanomaterials

In preferred embodiments, nanomaterials are used to make inventive images or part thereof. Inventive images may be made with at least one nanomaterial of any kind, using nanotechnology and/or any other process(es) or means desired, and inventive images might be nanomaterials. Nanomaterials are smart materials. Inventive images or parts thereof made with nanomaterials preferably have one or more properties (i.e., formal elements) that are enhanced, improved, new, different, and/or unique in comparison to images made without nanomaterials like conventional images. Inventive images made with nanomaterials may be smart.

One or more nanomaterials may be used in or as an inventive image. As used herein the term nanomaterial (which might also be called nanostructure) refers to materials with physical phenomena, structural features, and/or construct structures that typically have at least one dimension measuring in the range called nanoscale which is roughly from about 1.0 nm (nanometer) or more preferably about 0.1 nm, up to about 100 nm, up to about 130 nm, up to about 200 nm, desirably up to about 350 nm, more desirably up to about 500 nm, preferably up to about 600 nm, more preferably up to about 750 nm, most desirably up to about 850 nm, and most preferably up to about 1000 nm (1 micron). Nanomaterials may be nanoscale, or they may be any larger size with nanoscale structural features. Nanomaterials are man-made. They include materials, structures, devices, machines or systems of any size that are partially or entirely fabricated, engineered, controlled, manipulated, or designed on an atomic or molecular scale, atom by atom, molecule by molecule, or with atomic or molecular scale precision, such as by process(es) which might be called nanotechnology, molecular nanotechnology, molecular manufacturing, nanomanipulation, nanofabrication, submicron manufacturing or sub-micron manufacturing, submicron technology or sub-micron technology, bottom-up manufacturing, positional assembly, chemical synthesis, self-assembly, and/or top-down manufacturing.

Examples of nanomaterials in Category (a) are nanoscale materials and systems with at least one dimension in the nanometer size range. Examples include, but are not limited to: nanoclays; nanoparticles (NPs) of metals, polymers, ceramics, or any combination of them; carbon nanotubes (CNTs), single wall nanotubes (SWNT), multi wall nanotubes (MWNTs) and double walled nanotubes or double walled CNT of any size, shape, morphology, chirality and texture; nanotubes (NTs) of other materials; branched, Y and other NT junctions; NT networks; nanostructured carbon or nanocarbons; nanofibers; nanorods; nanomachines; nanocrystals (NCs); nanoclusters; nanofilms; fullerenes; quantum dots (QDs); QDs that generate light; emissive nanomaterials; devices and systems that are nanomaterials with improved and/or new properties from nanotechnology; nanoelectronics; nanocomputers; nanochips; nanosensors or sensors with nanomaterials; smart materials or responsive materials with nanomaterials; nanowires; nanomaterials made using controlled crystallization processes; polymer, metal or ceramic (or any combination of them) matrix nanocomposites using nanoscale reinforcement; homogeneous nanomaterials, nanostructures and nanocomposites; DNA controlled, altered, or engineered by man, artificial DNA; viruses; NPs of any material; and other nanostructures.

Nanomaterials in Category (b) contain structural features in the nanoscale size range. Examples include but are not limited to: polymers or ceramics; buckypaper; substrates or layers with arrays of SWNTs, MWNTs or both; nanocrystalline materials (e.g., these may have overall size measuring several millimeters or inches but their grain size may be in the range of 0.1-500 nm such as nanocrystalline metals); threads, yarn, ropes, cables, mesh, fabrics, networks of NTs or nanowires; various structural arrangements using nanomaterials including laminates and sandwich structures; and nanocomposites made by two nanomaterials or made by combining a nanomaterial with any bulk material.

Nanomaterials typically have properties considered novel, unusual and even extraordinary, that are often due or due in part to the nanoscale size of their physical phenomena, structural features, and/or construct structures. These properties might be most apparent when the nanoscale range is below or around about 100 nm, though they can be apparent in the nanoscale range above 100 nm. Because of their novel, unusual and extraordinary properties nanomaterials typically have an ability or an extraordinary ability to change or to enhance other materials. Examples of nanomaterials have one or more macroscopic properties (which are formal elements) determined or enhanced by their molecular properties. Because of their notable, novel, unusual and extraordinary properties, nanomaterials typically have an ability to enhance or change other materials. Image support mediums, inventive images made with them, or parts thereof made with nanomaterials preferably have one or more properties (i.e., formal elements) that are enhanced, improved, new, different, and/or unique in comparison to mediums and images made without nanomaterials.

A nanomaterial might be comprised of one or more ingredients or components from a vastly diverse range of materials, such as one or more nanomaterials, nanoparticles, nanotubes, nanocrystals, nanowires, nanorods, nanodevices, polymers, carbides, oxides, nitrides, metals, alloys, ceramics, molecules, chemicals, atoms, composites, biological materials, other examples provided herein, combinations of these, and/or other examples. Nanomaterials might be organic and/or inorganic. Examples of nanomaterials that might be used to make inventive images have names that begin with the prefix "nano," and that fit a nano[x] pattern, in which [x]=anything, e.g., [x] might be a word describing the nanomaterial, it's composition or structure, such as nanocrystal, nanotube, nanowire, etc. There are plenty more examples herein, in the referenced patent applications, in the public domain (online, in other publications, etc.), and many more examples will come into existence. Any of these may be used to make inventive images. Nanomaterials for use in image support mediums and images may be fabricated, engineered, manipulated, controlled, designed and/or further processed in any process(es), using any means.

The following materials may be used in image support mediums and images, however it is preferred that they are not considered nanomaterials. (1) Although materials made using bulk technology and not nanotechnology, that have nanoscale physical phenomena, structural features, and/or construct structures (such as conventional cellulose paper, and conventional metal) may be used in inventive images as desired, it is highly preferred that they are not considered nanomaterials. In bulk technology, atoms and molecules are manipulated in bulk, (rather than individually or one by one). (2) It is also highly preferred that natural materials of a size in the nanoscale range, and natural materials with nanoscale features, structures, and/or physical phenomena that have not been made, fabricated, engineered, controlled or designed by man using nanotechnology, are not considered nanomaterials. Among examples of these are bacteria, soot, and natural nanoscale materials in their natural material hosts, e.g., natural, unaltered rocks, plants, clay, shells, and minerals that naturally have unaltered nanoscale features, structures, and/or physical phenomena, such as NCs or NPs. However, natural materials that have been made, engineered, controlled, designed or processed by man or using nanotechnology, that fit into at least one of the 2 nanomaterial categories above are preferably considered nanomaterials herein.

Nanomaterials used in embodiments may have a wide variety of compositions, sizes, forms, surfaces and/or structures. These specifications may affect or determine their properties, and/or the formal elements they may enhance or impart to inventive images.

It is preferable that inventive images are macroscopic or visible to the human eye without unusual or extraordinary assistance, e.g., without a microscope. In preferred embodiments, at least two nanomaterials but typically many nanomaterials that may be nanoscale and/or macroscopic, the same and/or different, are used to make a material or device for an inventive image or part thereof that may or may not be nanoscale, such as a material or device made of CNTs, or of CNTs and polymer. The use of nanomaterials preferably improves and/or imparts one or more desirable formal elements to nanocomposites, hybrid nanomaterials, and inventive images. Nanomaterials, such as nanocomposites and hybrid nanomaterials might, for example, be used as image supports that may be stabilizers, they may be image parts, devices (like OLEDs or solar cells), coatings, layers, colorants, fibers, textiles, underlayers, interactive or responsive, and/or as other forms in inventive images.

Nanomaterials for use in inventive images are preferably selected, made, engineered, manipulated, or used for the properties (i.e. formal elements) they bring to, enhance in and/or enable in inventive images. In embodiments, it is often desirable that nanomaterials be used in a percentage or an amount that is at least sufficient enough to enhance, enable, create, modify or change one or more formal elements in the inventive image formed (in comparison to a comparable conventional image made without the nanomaterials, if one could be made). Nanomaterials may for example, change, enhance and/or modify in response to viewers, e.g., interactively or not, using touch controls, gesture or movement recognition, sensors, etc. In an example, nanomaterials might self-actuate, e.g., responding to an internal and/or external trigger or stimulant, such as programming, electricity, a change in light or temperature, etc. In embodiments, inventive images are made with nanomaterials that enhance or impart improved or novel properties to inventive images in their use with other ingredients, such as polymers.

Nanoscale nanomaterials may for example, not be visible in an inventive image or part thereof that is transparent and colorless, such as a transparent colorless polymer inventive image or part thereof, like a clear layer on an inventive image, or a clear image support that might be a stabilizer, e.g., CNTs may not be visible in a clear polymer nanocomposite or hybrid inventive image support. Alternately, nanoscale nanomaterials may be visible in inventive images and some may be desirable for the visual and/or optical properties they enhance or impart, e.g., effects of color and/or light. For example, they might be visible in inventive images when used in high percentages, in high concentrations and/or very close to one another.

It is very desirable to make inventive images that use and/or exploit the enhanced, different, new and extraordinary features that can be achieved using the vast range of nanomaterials. The use of nanomaterials and the use of nanotechnology in inventive images and/or in making inventive images are typically highly preferred stabilizers. Nanomaterials may be used as stabilizers at any percentage in inventive images. Energy used in conjunction with nanomaterials in inventive images is a stabilizer as are the means or devices that carry it (e.g., solar or electric energy used with CNTs, conducting nanowires, sensors, integrated circuits, other electronics, and devices made using nanotechnology, etc.).

The large surface area of nanoscale nanomaterials and of the nanoscale features that larger nanomaterials have in comparison to conventional materials, may be useful in embodiments. It may contribute to or enable desirable properties that might be improved and/or new. For instance, the larger surface area of nanomaterials might enable interactions, properties, behaviors and effects in inventive images that are different from conventional materials that might enhance inventive images, such as increased chemical activity, greater solubility (e.g., in water or PRM), more durable surfaces, more uniform surfaces, more consistent coloration (e.g., better color mixtures, more subtle color gradations, etc.), enhanced bonding, enhanced performance (e.g., of devices), enhanced reactions, and/or enhanced interactions (e.g., between nanomaterials and other materials in nanocomposites, in mixtures, in the use of catalysts, etc.).

In preferred embodiments, nanomaterials are used to make image supports that might be polymeric (e.g., stabilizers), or that might be non-polymeric (e.g., metal, glass, ceramic, stone, canvas, etc.). Nanotechnology and nanomaterials enable the formation of novel and improved materials such as re-engineered conventional materials, completely novel materials, as well as materials that combine desirable properties of different materials that might not have ever been combined naturally and that may not have ever been combined before. Among these are nanomaterials, hybrid nanomaterials, nanocomposites, and inventive images with properties that are new or improved compared to conventional materials.

Nanomaterials for use in inventive images may be fabricated, engineered, manipulated, controlled, designed and/or further processed in any process(es). In preferred embodiments nanomaterials are selected, made, grown, designed, engineered and/or controlled to optimize the properties they may enhance or impart to inventive images. Nanotechnology and nanomaterials enable inventive images or parts thereof to be made, designed or engineered on an atomic or molecular scale and/or from the bottom up, to the extent desired, if desired. The materials made in these embodiments might for example, be made, grown, designed or engineered using molecular nanotechnology, molecular manufacturing, nanomanipulation, nanofabrication and/or self-assembly process(es). In an embodiment, it is preferable to make inventive images or part thereof using nanomaterials, nanoscale nanomaterials, or CNTs that are high in quality, pure, defect free, clean and/or free of byproducts or as close to this as possible.

Further examples of formal elements (or properties) that might be enhanced in inventive images or imparted to them by nanomaterials and/or nanotechnology follow in (A)-(R). See U.S. Pat. No. 8,921,473 for more information.

(A) In embodiments, nanomaterials and/or nanotechnology might enable, assist, cause or provide these properties or formal elements in inventive images: enhanced strength and/or permanence; enhanced mechanical and/or physical properties; reduce sagging; enhanced tensile strength; resistance to change and/or wear, hardness, scratch resistance and/or toughness; it might reduce fragility; enhance weatherability, enhance durability, enhance resistance to rust or corrosion, and/or enhance the ability to self-clean or to repel stains, dirt, and/or liquids (e.g., water); it might provide anti-microbial properties; improve chemical and/or heat resistance, provide or enhance the ability to self-heal, and/or enhance flame retardancy; it might impart or improve magnetic properties; enhance permanence, enhance strength or hardness; increase resistance to adverse effects of UV light, (e.g., functioning as a UV light stabilizer or absorber); it might enhance toughness and resilience, reduce fragility, brittleness and/or tendency to crack or fracture, etc. Moreover inventive images made in these embodiments might have one or more of these improved or new properties without compromising the aesthetic desired, e.g., the nanomaterials may be invisible, even if the inventive image is transparent and colorless. Nanomaterials may for example, be or be in image supports or strengthening stabilizers in inventive images. Nanomaterials might be protective layers or external layers in inventive images. Some kinds of nanomaterials may enhance toughness, while reducing fragility, brittleness, the tendency to fracture or crack, and/or other such properties of inventive images or parts thereof, thereby enhancing strength and permanence.

Among the consequences of using nanomaterials are: enhanced ability for inventive images to be self-supporting and/or freestanding; and the ability to make inventive images or parts thereof slighter, with less mass, less bulky, thinner, smaller, lighter in weight, less solid and/or hollow, with parts such as a structure) that may be less visible, and/or more easily hidden from view. Nanomaterials can enhance or provide properties to conventional materials or conventional image making mediums, e.g., enhancing their strength and permanence.

(B) In embodiments, nanomaterials and/or nanotechnology might enable, assist or cause inventive images or part thereof to be conductive, semi conductive, or superconducting. The conductive properties of nanomaterials may be used in inventive images for a wide array of features, such as, solar devices or cells, OLEDs, EL Lamps, other light sources, reflective displays, e-materials, EPDs, electrochromatic effects, thermochromatic effects (e.g., the electricity can be used to produce heat), computers, devices that play sound, sensors, optoelectronic devices, electroactive layers, smart features, other interactive features, other devices or systems, etc. It might also be useful and desirable in paints or other colorants, for printing, as coatings, as layers, as surface preparation stabilizers, for bonding, in fibers, in textiles, in thin films, as inks, as underlayers, to make image supports that might be stabilizers, to make other image parts, or to make the entire inventive image. In inventive images, the use of a conventional means of conductivity (e.g., copper wires, ITO, ITO coated polymer or glass), might be partially or entirely replaced by nanomaterials such as nanowires, e.g., using CNT, polymer with nanomaterials in it, graphene, or buckypaper. Nanomaterials might be unseen conductors in inventive images such as in transparent or translucent image supports, aesthetic works or parts of these. Note that in other embodiments, nanomaterials might be insulators in inventive images.

(C) In embodiments, nanomaterials and/or nanotechnology might be used to make part or all of devices, machines and/or systems that may be nanoscale or larger in inventive images. In addition or instead, nanomaterials and/or nanotechnology may enable, assist or cause light emission in inventive images or part thereof. Among examples of nanomaterials useful in these embodiments are: CNT used with polymer, nanotubes used with polymer, light emissive CNT, other light emitting nanomaterials or luminescent nanomaterials; glass nanowires; quantum dots or quantum dot light emitters, island metal films (IMFs) or metal island films; light emitting silicon; and/or other nanomaterials. Examples of the devices, machines and systems or parts thereof that might be partially or entirely made of nanomaterials in inventive images are: electric, electronic and mechanical devices, machines and systems; printed electronics made with carbon nanotubes; computers, displays, transistors, TFTs, field effect transistors (FET); transparent or translucent transistors, flexible transistors, capacitors, supercapacitors, thin film capacitors, thin film supercapacitors, inductors, resistors, actuators, circuits, integrated circuits, batteries, high-energy-density batteries, nanobatteries, power cells, fuel cells, light emitters, OLEDs, other LEDs, displays, other light sources or light emitting devices, conductive systems, wiring systems, diodes, detectors, sensors, electromagnetic sensors, photosensors; motors; machines, materials and/or systems that: record light, have nanomaterial circuits, have CNT circuits, have antennas with nanomaterials, are partially or entirely made from a single molecule; smart window and electroactive window devices, systems or effects; reflective displays or e-materials, a computer part, computer chips or chips, memory, optical memory devices, memory with porphyrins; optoelectronic memory devices; other data storage; an OLED, a device or system made with a porphyrin; information transmission; nanoelectric devices based on ionic conductors; microelectronics made with nanotechnology and/or nanomaterials; communications devices, machines and systems; semiconductor devices with CNTs; devices, machines and systems in the form of fiber, fibers or nanofibers; fuel cells; lasers; photovoltaic cells or devices; solar cells; photonic and optoelectronic materials, devices, machines and systems; optical interconnects; switches; an oscillator or an electromechanical oscillator with CNTs; photonic band gap materials; optical mirrors, materials, devices and systems or one of these for communication; photovoltaic molecular or solid state structures, cells, devices or machines that do artificial photosynthesis imitating natural photosynthesis; Graetzel or Gratzel cells made with nanomaterials; devices, machines and/or systems made using DNA, artificial DNA, self-assembly, protein, bacteria, and/or other biological materials that may be natural or artificial; heat conducting, modulation or diffusing devices, machines and systems; nanoelectromechanical systems; electronics with diamond nanomaterials; and microelectromechanical systems.

Such devices, machines, systems and parts thereof and others may be very thin, planar, flat or relatively flat, and/or flexible, e.g., solar cells or devices, transistors, batteries, reflective displays, e-materials, light emitters, OLEDs, circuits, electronic systems, etc. Examples function very quickly, very efficiently with high quality performance. Examples are made using nanotechnology, and examples are made using nanotechnology and conventional practices.

Inventive images may have solar cells, photovoltaics, or other such means made using nanomaterials and/or nanotechnology to convert outdoor light, indoor light, infrared light, a broad spectrum of both visible and invisible light, or a combination of these into energy or electricity. These might be made with polymer, that might be conductive or semi conductive, e.g., with a fullerene, nanocrystal or quantum dot. These and/or the inventive images or the parts thereof that have them, might be flexible, rigid, thin, very thin, any shape, flat, opaque, colored, translucent, transparent, and/or made to the dimensions and/or other specifications desired. They might be made using printing processes, with or without silicon and/or the use of vacuum systems conventionally used to make silicon based solar cells. They might be made in a non-vacuum process, in a coating process or in a solution coating process, in a printing process, in a self-assembly process and/or in a roll to roll process, e.g., using coating or printing machines and rollers.

Part or all of polymer solar cells might be in a liquid, solution or other non-solid form. It might be brushed, painted, printed, spin cast, coated, applied in a colorant or paint, sprayed (e.g., in thin layers) and//or glued or adhered onto an inventive image or part thereof, such as onto an image support (e.g., a stabilizer), that might be rigid and/or flexible, like a polymeric composition, fabric, fibers, a textile, or a flexible non-woven form that might be able to unroll and roll up, and/or fold and fold up (like a polymer film or thin sheet). Such a solar cell might for example be made directly on and/or in polymer inventive image surfaces or forms, such as on and/or in inventive images that function as walls, paintings, sculptures, windows, skylights, sculptures, partitions, coverings, clothing, textiles, handbags, and/or fibers, etc. Materials and processes that protect these solar cells and photovoltaics made using conductive polymer, nanotechnology and/or nanomaterials from adverse external or environmental elements are stabilizers, e.g., materials that encase or hermetically seal these solar cells or photovoltaics. Also, light converted by solar cells, photovoltaics or other such means made using conductive polymer, nanomaterials and/or nanotechnology in an inventive image, is a stabilizer. Energy or electricity produced by such means is a stabilizer too, provided it is used by the inventive image for a formal element. In a preferred example, inventive images might be made with solar cells or photovoltaic cells or devices made by and/or made using technology by Konarka Technologies in Lowell MA (refer to www.konarkatech.com or www.konarka.com), and quantum well solar cells such as those by QuantaSol (www.quantasol.com) Surrey, UK. Polymer image supports which are or which have solar cells or photovoltaic devices like those by Konarka may be flexible, thin, and light weight, and they may be stabilizers. Photovoltaic fibers, textiles, fabrics, woven materials, clothing, examples of these that are fully integrated, and/or the technology for any of these might be used to make inventive images. These might be able to generate power or electricity using light. The power generated might be used for another formal element, e.g., to run a display or light. This power is a stabilizer.

In other examples, NCs that are very good harvesters of light might be used in photovoltaic devices, light sources, OLEDs, solar cells, and/or in polymer nanocomposites or hybrid nanomaterials in inventive images.

In examples, smart materials that change in response to an electric field might be made from NPs or other nanomaterials for use in inventive images. Such nanomaterials might for example, swell, expand, contract and/or bend in response to a trigger, stimuli and/or influence.

In further examples, nanotechnology and/or nanomaterials are used to make reflective displays, electro-optic mediums, electrochromic systems or (e.g., displays), and/or e-materials for use as inventive images or parts thereof. These may be bistable, flexible, rigid, opaque and/or transparent. NanoChromic displays by Ntera of Dublin, Ireland (refer to www.ntera.com) are further examples. Other preferred examples are E-Ink Corp.'s displays and technology (see www.eink.com) made with nanomaterials and/or nanotechnology.

In examples, devices, systems, machines circuits, electronics, sensors, photonic systems, electronics, polymer electronics, other such forms, or parts of these might be made by printing, ink jet printing, writing, marking, spraying, spin coating, painting, or applying nanomaterials, conductive polymers and/or compositions containing one or a combination of these to an image support that may be a stabilizer. For instance, such forms may be made by adding nanomaterials to a liquid or other medium like a solvent or a polymer. This might then be used as an ink, a paint or a colorant. The mixture might be applied using any method, e.g., it might be used in an ink jet printer, in a pen, in a marker, on a brush, in a pencil, etc. Nanomaterials might be key components in smart inks, intelligent inks, smart colorants, smart paints, etc.

Use of nanomaterials in light sources might enhance or impart to them and/or to their inventive image one or more of the properties described herein such as color and/or light properties, enhanced performance and/or functionality, enhanced mechanical and/or physical properties, greater stability or permanence, conductivity, etc. Nanomaterials, conductive or semi conductive nanomaterials (such as nanotubes, CNTs, nanowires, nanofibers and NCs) may cause, enhance or contribute to light emission in inventive images. As an example, crossed wires made with nanoscale semiconductors may function as light emitters. Buckytubes or CNT may be great field emitters, they can be used to make electron based devices more effective and longer lasting, and to make flat panel displays for inventive images. CNTs might be used in different ways to make light emitting inventive images. CNT can produce streams of electrons with high efficiency which might be used for light emission in inventive images such as for still and/or for changing light emission, e.g., as they may be used in displays like televisions and computer monitors. In another example, CNTs can be used in LEDs, e.g., CNT diodes or CNT LEDs. Such a diode may or may not be able to also function as a field effect transistor. Semiconducting nanotubes may fluoresce and CNTs may enhance the fluorescence of materials they are close to. CNTs may for example, act as a source of electrons stimulating light emission from a secondary fluorescent material. Electron field emissive materials or Field Emission Devices (FED) might be used to make inventive images in these embodiments, such as in making displays like flat screen displays. Among the uses of light from CNTs in inventive images, may be for light bulbs, communication, displays and/or processing data in computers, transistors, optical communications, electronic devices, etc. In further examples, other emissive nanomaterials might be used in these embodiments, e.g., NCs or quantum dots. Inventive images may be made with OLEDs that have at least one quantum dot. Quantum dot polymer composites or hybrid nanomaterials might be used to make OLEDs or LEDs in inventive images, for example, combining the desirable properties of inorganic materials (such as their stability, their color purity, and their high performance electrical and optical properties) with the desirable properties of polymers or of conductive polymers (such as their flexibility and manufacturing processes like solution processing). Examples might be called hybrid OLEDs combining both organic and inorganic ingredients or layers, e.g., made by Professor Karen Gleason at MIT in MA.

As an example, NCs and/or other nanomaterials embedded in polymer, glass or crystal might emit light in an inventive image. In another example, inventive images might be made with one or more OLEDs, LEDs or nano-OLEDs made using nanomaterials like semiconductor NCs. In an example, light sources like hybrid OLEDs that have light emitters made with cadmium selenium (CdSe) NCs, quantum dots or colloidal quantum dots might be used in inventive images or part thereof. Also, quantum dots may be efficient light emitters and/or they might offer other enhancements in inventive images such as modification of the color or of the color quality of the emitters. OLEDs inventive images may be made with quantum dots.

Nanomaterials in conventional displays (like flat screens) may be desirable in inventive images or part thereof, e.g., light emitting paintings, sculptures, murals, walls, pillows, chairs, tables, lamps, handbags, etc. Devices, machines, systems, light, and/or emitted light in inventive images may enable or create a desirable function, subject matter, content, meaning, and/or aesthetic. Notably, the visibility and aesthetic contribution of devices, machines, and systems in inventive images can be controlled as never before, enabling new aesthetic effects and novel images. These embodiments offer ways that inventive images might be smart images. They may for example, have capabilities, that might be significant and/or novel; they may self-actuate; and/or they might respond to or interact with external stimuli, the environment and/or viewers, directly or indirectly. Nanomaterials used in devices, systems and machines in inventive images might enable them to have enormous memory capability in an extremely small size form (e.g., the size of a postage stamp or smaller). They might be easy to use or integrate into inventive images that might be interactive, responsive, smart, novel, unique, and/or unlike any images ever made before. Devices, machine and systems made with nanomaterials might for example, be part of inventive image supports that may be stabilizers. Devices, machine and systems made with nanomaterials might for example, be unseen in inventive images, they may be too small to be visible, they may be transparent or translucent, e.g., used in image support mediums and aesthetic images that are transparent or translucent. Devices, machine and systems made with nanomaterials may be used to make inventive images with utilitarian functions, or used in inventive images that can unroll and roll up, scroll and/or fold and fold up. As an illustration, an inventive image that might have a utilitarian function (e.g., a wall, clothing, a ceiling, a floor, a table, a chair, a container, a wearable accessory, etc.) may have computers or nanocomputers as part of it that may or may not be visible, but which may have any or all features conventional computers offer or more.

(D) In embodiments, nanomaterials and/or nanotechnology might enhance or impart visual and/or optical effects in inventive images such as color and/or light properties. The visual and/or optical effects created in these embodiments might change and/or modulate in inventive images, e.g., changing on their own, such as due to programming; changing with stimulation, triggering, or another influence such as with a stabilizer like electricity (such as electrochromatic or electrochromic effects); a chemical; a liquid (e.g., solvatechromic effects in which liquid stimulates color change); light (e.g., photochromic effects); temperature change (e.g., thermochromic effects); one or more sensors; electron beam (e.g., carsolchromic effects in which electron beam stimulates color change); pressure (e.g., piezorochromic effects or piezochromism in which pressure stimulates color change); changing by use of a dial, a button or touch control, or in response to voice command, sound, movement, light changes, or viewer interaction.

In an example, semiconductor quantum dots might fluoresce, reflect, refract and/or absorb light, triggered by electricity or light producing electrochromic or photochromic effects.

In further examples, nanomaterials enhance or impart visual and/or optical effects (such as effects of color and light) by their visibility in inventive images by their ability to disperse or aggregate in response to a stimulant, trigger or influence, and/or by their interaction(s) with other ingredient(s) in or component(s) of these inventive images. In other examples, the use of nanomaterials and/or nanotechnology in inventive images or part thereof, might enhance or provide iridescence, fluorescence, reflectivity, luster, color (hue, value and/or intensity), transparency, translucency, opacity, a high refractive index, and/or effects from the use of a different refractive index. Such effects might for example, be created on one or more inventive image surfaces, they might exist within inventive images, or at different depths within it, e.g., at different depths within a transparent or translucent polymer nanocomposite inventive image or part thereof (like an image support that may be a stabilizer). Also, in examples, the large surface area of nanomaterials and their small size may enhance or create these and/or other visual and optical effects, e.g., enhanced color saturation, more subtle color gradations, more complete color mixtures, enhanced transparency, enhanced gloss, enhanced mattness, enhanced reflectivity, enhanced luster, enhanced iridescence, etc. In examples, inventive images or parts thereof such as layers, films and thin films made using nanomaterials may be photochromic or electrochromatic effects, e.g., capable of changing from clear and colorless, to a blue that might be transparent, translucent or opaque. An inventive image's function might change as its color and light properties change (e.g., it may serve as a light source that is triggered by the presence of people or that is triggered by a switch); or it may even change from being see through (transparent or translucent) to not being see through (to less translucent or even to being opaque) such as from serving as a window to serving as a wall or as a partition. Other formal elements might change as its color and light properties change too, e.g., it's subject matter and meaning.

(E) In embodiments, nanomaterials and/or nanotechnology might enhance or impart inventive images with the ability to conduct, modulate, diffuse, resist and/or block heat. This ability may for example, be useful to cool inventive images e.g., to cool heat from their devices, computers, systems, electronics, machines and the like that are nanoscale or larger. This ability may enhance the function, stability and permanence of inventive images. In examples, nanomaterials may enable inventive images to modify the temperature in the area around them. For example, an inventive image functioning as a wall, a mural, a ceiling, a floor, a sculpture, or as part thereof may affect the temperature of the room or area around it in a desirable way, in a way that contributes to the meaning of the image, e.g., the image may show a scene correlating with its effect on the temperature nearby such as showing the tropics and emitting warmth.

(F) In embodiments, nanotechnology and/or nanomaterials may enable, give, or assist in giving inventive images or parts thereof the ability to detect problems or risks within themselves, and/or the ability to mitigate, resolve or eliminate such problems or risks. Examples of such nanomaterials are sensors, computers, devices, machines, systems, systems with cameras, nanocomposites and/or hybrid nanomaterials such as those made with polymer. These might be conductive or non-conductive, and nanoscale or larger. Among the problems and risks that such nanomaterials might detect or assist in detecting are cracks, fractures, impact, dents, weaknesses, hardware failure, fatigue, temperature or light changes, other environmental conditions, viewers getting to close to the inventive image, etc. An inventive image may for example, make changes itself to mitigate, resolve or eliminate such problems or risks, e.g., changes in its inner structure and/or surface. For example, a polymer nanocomposite or hybrid nanomaterial in an inventive image or part thereof might be self-repairing, or self-healing. In one illustration, a composite or hybrid nanomaterial might have conductive nanomaterials (such as CNTs), and tiny filled minicapsules (e.g., a micron or so wide). When a crack or fracture occurs, the change in the material's electrical properties might trigger the minicapsules in that area to open and fill the crack or fracture (e.g., using sensors to pinpoint the crack's location). In an example, a nanotube polymer composite material used to make inventive images may automatically return to its original form if it is pushed in, bent or damaged, e.g., using EAPs that are nanomaterials.

(G) In embodiments, inventive images have one or more threads, yarns, cords, strands, cables, fibers, fabrics, wires, ropes, textiles, meshes, woven materials, or the like (hereafter referred to as TYCSC) made using nanotechnology and/or nanomaterials. These may or may not be nanoscale. TYCSC might for example, be made with: graphene, buckypaper, silica, colloidal silica, nanoclay particles, polyester, nylon, acrylic, PMMA, polystyrene, cellulose, nanowires; nanomaterials in nanocomposites or hybrid nanomaterials enhancing conventional TYCSC (e.g., enhancing silk, cotton, and linen); or other nanomaterials. TYCSC may enhance properties in inventive images or impart properties to them that are improved or new, such as: greater strength, mechanical properties, electrical conductivity, durability, solvent resistance, resilience, permanence, thermal or heat properties (such as thermal conductivity, raising the temperature at which the material softens, etc.), reduced shrinkage, porosity, absorbency, reduced absorbency, nonabsorbency or being impenetrable, light properties (such as light emission), color effects (such as the ability to shift or modulate color), stiffness, reduced shrinkage, the ability to be self-cleaning or to repel stains and dirt, properties from having a small diameter, properties from having a high surface area, reduced weight, the ability to change or modulate, the ability to be responsive, the ability to be interactive, the ability to self-actuate; the ability to function as or like a device, a system or part thereof (e.g., a sensor; a device or system with sensors; solar cell, electricity storing supercapacitor, OLED, light emitter, computer, communications device, etc.); other enhanced or new properties, e.g., refer to other examples herein. Moreover, TYCSC made of these embodiments may be stronger, tougher, slighter, lighter weight, less visible, more easily hidden from view and/or different aesthetically and/or functionally in other ways from conventional TYCSC. TYCSC might comprise an inventive image or part thereof, and they may be made and developed using any process(es), so that they have any specifications desired.

As a further illustration, an inventive image or part thereof made of TYCSC such as a woven fabric or textile with nanomaterials might be smart. For example, it might change or modulate in color(s) and/or in light properties (such as light emission), e.g., responsively, for example, triggered by light, voice, gesture, movement, touch, temperature etc., powered by a battery, solar cell or system. An inventive image or part thereof made of a fabric or textile such as this might change in color and/or light properties according to the time of day, and/or it might become more or less porous according to weather or environmental conditions. As an example, such a smart fabric might be inventive image clothing, walls or floors that might change color and/or light properties as day changes to night, and that might also provide more warmth when it is cooler as well as more free passage of air when it is hot. In an example, such a smart fabric might be used in a composite or hybrid nanomaterial such as with one or more polymers, e.g., embedded in or attached to polymer or an image support, even as a strengthening stabilizer.

(H) In embodiments, nanomaterials and/or nanotechnology might enhance, fortify or cause temporary, lasting or permanent bonding in inventive images. Examples of such nanomaterials are: CNTs, CNTs in or with polymer; inorganic or inorganic hard phase nanomaterials or NPs such as silica or silica NPs; nanomaterials that function for bonding, sticking or gripping in inventive images in a manner that is like, similar to or mimicking the way that the feet of insects, lizards, and/or geckos do; and other nanomaterials.

(I) In embodiments, inventive images or part thereof might be made with one or more paints, colorants, pigments, dyes, inks, primers, adhesives, layers, films, coatings and/or surfaces that are made with nanomaterials and/or nanotechnology. Examples have properties which are enhanced, novel, desirable and/or useful, such as any of the nanomaterial properties described herein, like the ability to change in its color or light properties; properties from large surface area and small size of nanomaterials; the ability to be interactive or responsive to a command, trigger, stimuli, or influence, e.g., environmental change, electricity, changes in light and/or sound; movement, touch, etc. Films, layer or coatings made using nanomaterials might be organic, inorganic, thin or very thin (e.g., from about 1 nm to about 5 nm, they may only be one molecule or one atom thick, and/or they may be buckypaper); continuous, discontinuous, uniform, irregular, even, thin or extremely thin, protective, conductive, electroactive (e.g., electrically active transparent coatings or transparent electrodes), electrochromatic, photochromic, colorless, only slightly colored or tinted, transparent, translucent, they might impart a light property (e.g., iridescence, a metallic shimmer, emitted light), they may enhance the inventive image's durability or permanence, scratch resistance, toughness, strength, rigidity, etc. Examples may function as new kinds of varnishes, finishes or sealants, or as clear colorless protective or finish coatings or films on inventive images.

The large surface area and small size of nanomaterials or of the features of nanomaterials might bring improved or new properties to paints, colorants, pigments, dyes, inks, primers, adhesives, layers, films, coatings and/or surfaces used in inventive images. Examples are described herein, like greater color saturation, enhanced light properties, a more subtle and greater range of colors, more thorough color mixtures, more subtle color gradations, more uniform surface, enhanced scratch resistance, new or enhanced bonding capability, etc.

(J) In embodiments, nanomaterials and/or nanotechnology enable, assist or cause inventive images or part thereof to be absorbent and/or porous (e.g., pores that are nanoscale and/or larger pores), for aesthetic or utilitarian purposes. Nanotechnology may enable pores to be formed, designed, engineered or controlled as desired. In examples, absorbent or porous nanomaterials of might be used: in layers, in nanocomposites, in nanocomposite layers, and/or in hybrid nanomaterials in inventive images or part thereof. Pores increase the surface area of nanomaterials, which might enhance their uses in inventive images. The porous or absorbent polymers and nanomaterials of these embodiments may for example, enhance or enable bonding (e.g., superimposed applications may penetrate); impart or enhance light properties (e.g., making the surface matte); or be used in an electrically insulating membrane or material in the inventive image. They may control, allow, or selectively allow passage of subjects through it or through part of it. Moreover, the porosity or absorbency of the inventive image or part thereof might be tunable, controllable, and/or changeable (e.g., using a stimulant, trigger, programming or design). In an illustration, pores or the lack of pores, absorbency or the lack thereof in inventive images keeps molecules, subjects that threaten or decrease permanence, and other subjects out of or off of them, e.g., protecting a more vulnerable or less permanent inventive image part beneath, such as protecting its coloration, e.g., protecting conventional painting and drawing applications. In an example, nanoscale holes improve a solar cell, (see the work of Harry Atwater at Caltech, in Pasadena, CA). In examples, inventive images are made with nanoporous solids made of carbon, silicon, silicate(s), polymer(s), ceramic(s), metallic mineral(s) or compound(s) of organic material(s); metal or organic materials and silicon. Or, they might be made with polymer and ceramic, or with metal—organic framework(s), grid(s) or lattice(s) (e.g., like nanocubes).

(K) In embodiments, the use of nanomaterials and/or nanotechnology can improve and/or change inventive images made of multiple parts. For example, nanomaterials such as nanocomposites, might be used in layers in inventive images or in part thereof. Or they might be used in one or more locations or parts in inventive images e.g., places that require or may need greater strength, parts that move or are interactive, etc.

(l) In embodiments, nanomaterials and/or nanotechnology are used to enhance or create part or all of the means of mounting, installing or displaying inventive images, and this means may be improved and/or new in comparison to conventional practices.

(M) In embodiments, movement and/or sound in inventive images is enhanced, assisted, or created using nanomaterials. Such movement and/or sound(s) may or may not depend on, or require viewer initiation or interaction, or initiation by change in the environment, or another trigger, stimulant or influence. In an example, shape memory nanomaterial such as a polymer nanocomposite or hybrid nanomaterial (e.g., made with CNTs and a polymer), might be used in an inventive image which returns to its original shape when exposed to a trigger, stimulus or influence (that may be part of the inventive image and/or external to it) such as electricity, heat, or any of the other examples herein. In an embodiment, nanomaterials are used to reduce sound and/or movement in inventive images.

(N) In embodiments, inventive images made using nanomaterials and/or nanotechnology are able to function differently than images made without nanomaterials. They may be smart, with enhanced and/or new properties that enable them to function in new or improved ways, e.g., using devices or the ability to be interactive or responsive.

(O) In embodiments, inventive images or parts thereof may have aesthetic properties or an overall aesthetic enhanced by or the result of the use of nanotechnology and/or nanomaterials. Examples are: an aesthetic of light and space; a sense of being light and/or airy; a sense of floating or weightlessness; the appearance that laws of gravity are defied; the appearance of precarious balance; a sense of being threatening (e.g., due to the appearance of precarious balance); an ethereal sense; objecthood; the perception or reality of form being dematerialized, and other aesthetic effects. (US Patent Application No. 20030035917-A1). Such aesthetic effects may for example, be possible because nanomaterials gave an inventive image a greater strength to weight ratio, emitted light, and other improved or new properties described herein.

(P) In embodiments, the use of nanomaterials and/or nanotechnology might enable, assist or cause inventive images to have subject matter, content and/or meaning that was not otherwise possible and/or that is new, e.g., due to the improved and new properties from nanomaterials.

(Q) In embodiments, the use of nanomaterials and/or nanotechnology might reduce or eliminate the need for aesthetic choices in making inventive images to be determined by practical, structural and/or utilitarian concerns, e.g., a lot of utilitarian functions can be hidden due to the reduced size of nanomaterials such as smaller devices.

(R) Nanomaterials and/or nanotechnology enables inventive images to have an aesthetic of light and space, and this might be done in new and unique ways and/or in ways that make these images new and unique. (US Patent Application No. 20030035917-A1.)

In an embodiment, piezoelectric nanomaterials, piezoelectric nanocomposites or piezoelectric polymer nanocomposites are used to make inventive images. Nanomaterials might for example, be used to enhance piezoelectric polymers. In embodiments, inventive images are made with photorefractive polymer.

In embodiments, inventive images are made with porphyrins, porphyrin molecules, porphyrin nanotubes, hollow porphyrin nanotubes, porphyrin nanofibers, platinum-porphine compounds, porphyrin nanomaterials (which be nanoscale or larger), or porphyrin nanocomposites or hybrid nanomaterials. These might for example, be used in OLEDs, in memory chips; for their electronic properties, their optical properties, their luminosity or their light emission; in solar cells or light-harvesting devices, in nanodevices; in electronic and photonic devices, in sensors, for producing hydrogen; because they are light absorbing, light-active or photoactive (light applied to porphyrins may excite an electron); for their photocatalytic ability; in porphyrin-polymer nanocomposites or hybrid nanomaterials, to enhance properties like efficiency, for various formal elements, etc. (Refer to U.S. Pat. No. 6,413,656).

In various embodiments, roll to roll or continuous manufacturing processes are used to make inventive images or part thereof such as: polymer electronics, organic electronics, polymer semi-conductors, circuits, integrated circuits, backplanes, memory, OLEDs, sensors, e-materials, flat panel and flexible displays, photovoltaics or solar cells, TFTs, organic TFTs, polymer transistors, batteries, parts of these, etc. Roll to roll or continuous manufacturing may create flexible inventive images or parts thereof.

The materials listed below as (a) through (g) may be used in inventive images:

(a) nanomaterials which may be metal or which may be NPs of gold, silver and/or copper, that are in ceramic or pottery glazes, that are in ceramic or pottery iridescent or metallic glazes, and/or that are in ceramic or pottery lustre glazes; (b) metal or metallic NPs in glass; gold colloidal NPs in glass or silver colloidal NPs in glass; or gold, silver, chromium, cobalt and/or molybdenum NPs in glass; any of these used to produce or effect coloration in glass; any of these used to produce red, orange, purple, green or yellow coloration in glass; (c) metal NPs used in paint, or paint that has gold, silver, chromium, cobalt and/or molybdenum NPs. (d) carbon black NPs, carbon black NP composites; carbon black NP polymer composites; or carbon black NP rubber composites. (e) zeolite catalysts, zeolites in catalysts, catalysts with nanomaterials, or catalysts with nanomaterials of a type that were used in catalysts prior to May 1, 2003 or prior to May 1, 2004, that do not have other, different nanomaterials. (f) glass nanofibers. (g) silicate NPs, montmorillonite or either of these in the form of clay; silica nanomaterials in poly(dimethylsiloxane) or PDMS, or silicone rubber. Yet, in embodiments, it may be desirable that one or more of the materials listed above in (a)-(g) not be the basis for designating the mediums or images they are part of as inventive images, it may be desirable that one or more of them are not classified as nanomaterials, as smart materials, and/or as stabilizers herein, unless their inventive images are also described by (h), (i) and/or (j) as follows:

(h) The structural properties of the nanomaterials and/or NPs have been controlled, designed, manipulated or engineered using nanotechnology that these materials enhance or impart the desired properties to inventive images (e.g., the nanomaterials' shape, size, local environment, and/or degree of aggregation have been designed or engineered to create the desired properties such as optical properties, and/or light properties). (i) The nanomaterials and/or NPs have been functionalized or their surfaces have been chemically controlled, designed, engineered, added to, coated, modified, or changed using nanotechology.

(j) The nanomaterials and/or NPs enhance or provide one or more of these properties or formal elements to inventive images in i)-xii) referred to hereinafter as "X-elements":

i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, NCs, nanoyarn, and/or smart dust; v). machines, devices and/or systems or part thereof which may or may not be nanoscale or visible to the unaided naked human eye (such as computers, integrated circuits, power cells, solar energy devices, computers, displays, sensors, light emitters, other electric and/or mechanical devices, part of any of these, etc.); vi). visual effects, optical effects and/or light effects which are reversible; vii). one or more formal elements that change and/or modulate; viii). aesthetic effects that can change and/or be modified by electricity; ix). sound and/or movement; x). the ability to be interactive with and/or responsive to a viewer, to the environment or both; xi). the ability to detect, respond to and/or correct problems or other matters within the inventive image; xii). at least one property that would have been considered extraordinary, novel, unusual or remarkable at a date after May 1, 2003 or after May 1, 2004. In embodiments, it may be desirable that the use of one or more of the materials described in (a)-(g) above not be the basis for the designation of their mediums or images as inventive images, and/or that they not be classified as nanomaterials, as smart materials and/or as stabilizers herein.

In embodiments, if the use of nanomaterials that may or may not be nanoscale and/or visible to the unaided human eye that are photosensitive, photosensors, light filters, silver and/or silver NPs, and/or other nanomaterials in photographic and/or silver halide emulsions, films, coatings and layers in mediums or images is the basis by which they are designated inventive images, (a), (b) and/or (c) might be preferable. (a) These emulsions, films, coatings or layers are used on image supports or other inventive image surfaces that fit one or more of the following descriptions. They are: i). not papers or not paper-like, ii). stiff or rigid, iii). at least about 0.2 cm thick, preferably at least about 0.3 cm thick, more preferably at least about 0.45 cm thick, desirably at least about 0.6 cm thick, most preferably at least about 0.8 cm thick, and most desirably at least about 1.0 cm thick, iv). not in the shape, not with the form and/or not with the structure of a conventional image support or paper used for this same purpose prior to May 1, 2003 or prior to May 1, 2004, v). not in a shape or a form that is paper-like, rectilinear, regular, uniform, consistent, even, untextured, symmetrical, balanced, smooth, standardized, homogeneous, and/or other such characteristics, and/or vi). in a shape or form that is non-rectilinear, non-geometric, nonplanar, irregular, nonuniform, inconsistent or varied, uneven, textured or textured more deeply than ordinary sanding or sandblasting, asymmetrical, unsymmetrical or nonsymmetrical, unbalanced or off balance, rough or unsmooth, non-standardized, inhomogeneous, perforated, with negative space, or with other such characteristics. (b) Nanomaterials in these emulsions, films, coatings or layers enhance or provide one or more X-elements (see above) to inventive images, and/or with machines, devices and/or systems or part thereof which may or may not be responsive to light, effects of color (that may be reversible); and/or some or all changes in such emulsions, films, coatings and layers due to light exposure are reversible. (c) There are nanomaterials in these emulsions, films, coatings or layers that may or may not be nanoscale and/or visible to the unaided human eye, that were not used in versions of such emulsions, films, coatings or layers that were conventional prior to May 1, 2003 or prior to May 1, 2004.

In embodiments, it may be desirable that the use of one or more nanomaterials that are photosensitive, photosensors, light filters, silver and/or silver NPs, and/or other nanomaterials in photographic and/or silver halide emulsions, films, coatings and layers in images, not be the basis for the designation of their mediums or images as inventive images. It may be desirable that one or more of these nanomaterials not be classified as nanomaterials, as smart materials and/or as stabilizers herein.

In embodiments, if nanomaterials (such as NPs) that may or may not be nanoscale and/or invisible to the unaided naked human eye, in inks, in printer inks, or in ink jet printer inks in image making mediums or images are the basis for designating them as inventive images, and/or if nanomaterials (such as NPs) that function as pigment(s), other colorant(s) and/or mordant(s), in inks, in printer inks, or in ink jet printer inks in image making mediums or images are the basis for designating them as inventive images, (a), (b), and/or (c) might be preferable.

(a) These inks, printer inks, or ink jet-printed inks are used on image supports or other inventive image surfaces that are: i). not paper and not paper-like, ii). stiff or rigid, iii). at least about 0.2 cm thick, preferably at least about 0.3 cm thick, more preferably at least about 0.45 cm thick, desirably at least about 0.6 cm thick, most preferably at least about 0.8 cm thick, and most desirably at least about 1.0 cm thick, iv). not in the shape, not with the form and/or not with the structure of a conventional image support or paper used for this same purpose prior to May 1, 2003 or prior to May 1, 2004, v). not in a shape or a form that is paper-like, rectilinear, regular, uniform, consistent, even, untextured, symmetrical, balanced, smooth, standardized, homogeneous, and/or other such characteristics, and/or vi). in a shape or form that is non-rectilinear, nonplanar, irregular, nonuniform, inconsistent or varied, uneven, textured or textured more deeply than ordinary sanding or sandblasting, asymmetrical, unsymmetrical or nonsymmetrical, unbalanced or off balance, rough or unsmooth, non-standardized, inhomogeneous, or with other such characteristics.

(b) Nanomaterials that may or may not be nanoscale and/or visible to the unaided human eye in these inks, printer inks, or ink jet-printed inks enhance or provide one or more X-elements to inventive images and/or optical effects and/or light effects beyond those of a conventional pigment or dye, which may be reversible. (c) There are nanomaterials in these inks, printer inks, or ink jet printer inks (that may or may not be nanoscale and/or visible to the unaided human eye), that were not used in versions of such inks, printer inks, or ink jet printer inks that were conventional prior to May 1, 2003 or prior to May 1, 2004.

However, in embodiments it may be desirable for one or more such nanomaterials, in inks, in printer inks, or in ink jet printer inks in mediums or images not to be the basis for designating them as inventive images. It may be preferable that one or more of such materials not be classified as nanomaterials, as smart materials and/or as stabilizers herein.

Embodiments are directed at: (i). Nanomaterials that may or may not be nanoscale and/or visible to the unaided human eye in coatings, (ii). NPs in coatings, (iii). polymeric NPs in coatings, and/or (iv) nanomaterials functioning as mordants or pigments in coatings. If one or more of the materials described in (i)-(iv) above are on printing papers, on ink jet printing papers, on photographic papers, on digital media, on other papers, and/or on film, and one or more of these are thin and even coatings, and it or they are clear and colorless or uniformly colored, and it or they are the basis by which mediums or images are designated inventive images, (a), (b) and/or (c) described below for its use in the image might be preferable.

(a) These coatings are used on image supports or other inventive image surfaces that are: i). not papers and/or not paper-like, ii). stiff or rigid, iii). at least about 0.2 cm thick, preferably at least about 0.3 cm thick, more preferably at least about 0.45 cm thick, desirably at least about 0.6 cm thick, most preferably at least about 0.8 cm thick, and most desirably at least about 1.0 cm thick, iv). not in the shape, the form and/or the structure of a conventional image support or paper used for this same purpose prior to May 1, 2003 or prior to May 1, 2004, v). not in a shape or a form that is paper-like, rectilinear, regular, uniform, consistent, even, untextured, symmetrical, balanced, smooth, standardized, homogeneous, and/or other such characteristics, and/or vi). in a shape or form that is non-rectilinear, non-geometric, nonplanar, irregular, nonuniform, inconsistent or varied, uneven, textured or textured more deeply than ordinary sanding or sandblasting, perforated, with negative spaces, discontinuous, asymmetrical, unsymmetrical or nonsymmetrical, unbalanced or off balance, rough or unsmooth, non-standardized, inhomogeneous, or with other such characteristics.

(b) Nanomaterials in these coatings enhance or provide one or more of X-elements to inventive images, and/or visual, optical and/or light effects beyond those of a conventional pigment or dye, which may be reversible. (c) There are nanomaterials in these coatings (that may or may not be nanoscale and/or visible to the unaided human eye), that were not used in versions of such coatings that were conventional prior to May 1, 2003 or prior to May 1, 2004.

In embodiments directed at (i). Nanomaterials that may or may not be nanoscale and/or visible to the unaided human eye in coatings, (ii). NPs in coatings, (iii). polymeric NPs in coatings, and/or (iv). Nanomaterials that may or may not be nanoscale and/or visible to the unaided human eye that function as mordants or pigments in coatings, wherein (i), (ii), (iii), and/or (iv) are on printing papers, on ink jet printing papers, on photographic papers, on digital media, on other papers, and/or on film, and (i), (ii), (iii), and/or (iv) are also be thin and even coatings, and clear and colorless or uniformly colored, it may be desirable that one or more of (i), (ii), (iii), and/or (iv) are not the basis by which their image making mediums or images are designated inventive images. It may be desirable that that one or more of (i), (ii), (iii), and/or (iv) are not classified as nanomaterials, as smart materials and/or as stabilizers herein.

Though conventional computer papers, conventional ink jet printing papers, other conventional printing papers, conventional photographic papers, conventional digital media, other conventional papers, and conventional film that are nanomaterials or that are made with at least one nanomaterial (e.g., in their coatings, binders, size, and/or emulsions) may be used in inventive images in any form (e.g., conventional image making papers such as those used for drawing, papers and digital mediums by Eastman Kodak of Rochester, NY), in embodiments it may be preferable that their nanomaterial(s) are not classified as nanomaterials, as smart materials, as stabilizers, and/or that they not be the basis by which a medium or an image is designated an inventive image. However, if at least one of their nanomaterial(s) is of a kind which was not conventionally used in such products prior to May 1, 2003 or prior to May 1, 2004, it is preferable that the image making medium or image be considered an inventive image and that its nanomaterial(s) are considered nanomaterials, smart materials and/or stabilizers. Nanomaterials used in the ways described above might also be the basis for the designation of their medium or image as an inventive image, they might also be smart materials and/or stabilizers if they enhance or provide one or more X-elements, or one or more visual, optical and/or light effects beyond those considered conventional, which might be reversible.

In embodiments, if the use of nanomaterials or NPs that may or may not be nanoscale and/or visible to the unaided human eye as or in pigments, dyes and/or paints is the basis for designating image making mediums or images as inventive images, it may be preferable that these nanomaterials enhance or provide one or more X-elements, and/or visual, optical and/or light effects beyond those of a conventional pigment or dye, wherein these effects may be reversible. Though pigments, dyes and/or paints which are nanomaterials or which are made with nanomaterials may be used to make inventive images, it may be desirable that the use of one or more of these nanomaterials in embodiments not be the basis by which mediums or images are determined to be inventive images. It may be desirable that one or more of these nanomaterials are not classified as nanomaterials, as smart materials, and/or as stabilizers herein. Yet, if the nanomaterial(s) are of a kind not conventionally used in pigments, dyes and/or paints prior to May 1, 2003 or May 1, 2004, or if it is a nanomaterial that did not exist in art, design or architecture prior to one or both of these dates, it may be preferable that the image or medium be considered an inventive image and that the nanomaterial be considered a smart material.

In embodiments, the use of nanomaterials may enhance or impart one or more of the following properties to building materials, walls and windows in architecture; in sealants, coatings or paints (that are preferably thin layers or applications which are uniform or relatively uniform in appearance) used in architecture. The properties are: heat reflection, heat absorption, and/or insulation; the ability to self-clean, repel dirt, resist staining, and/or repel water; enhanced weatherability, durability, hardness, UV light protection; flame-retardancy; the sealing of pores (e.g., the use of nanosize ingredients in a coating or filler for their ability to fill pores when applied on a substrate due to their great surface area, such as to seal wood, concrete, stone, etc.), other properties that were enhanced or provided by nanomaterials in such uses prior to May 1, 2003 or prior to May 1, 2004, and other such utilitarian properties. However, it may be preferable that this not be the basis by which a medium or architecture is designated an inventive image, and it may be preferred that the use of such nanomaterials for the utilitarian properties listed above in architecture not enable the nanomaterials to be classified as stabilizers, or as smart materials. Other reasons may or may not exist that will enable the use of the same nanomaterials, the same nanotechnology and/or one or more others in architectural images to be the basis for the designation of mediums for architecture or architecture as inventive images, the basis by which the nanomaterial(s) are classified as stabilizers and/or as smart materials. For example, if the nanomaterial is of a kind which was not conventionally used for such purposes prior to May 1, 2003 or prior to May 1, 2004, if such use of the nanomaterial did not exist in architecture prior to one or both of these dates, if the nanomaterial is of a kind which would have been considered extraordinary or novel for such use prior to one or both of these dates, or if it enhances or provides one or more X-elements and/or visual, optical and/or light effects beyond those of a conventional pigment or dye (that may be reversible), designation of the medium or image as an inventive image may be preferable, and it may be preferable that the nanomaterial be considered a nanomaterial and a smart material of the present invention.

In embodiments, the use of nanomaterials or nanotechnology may enhance or impart one or more properties to images of design; or to fabrics, textiles, fashion design, jewelry, upholstery, or coatings used in design. Examples of these properties are: the ability to self-clean, repel dirt, resist staining, and/or repel water; freedom from or resistance to wrinkles, flame resistance; communication, informational or Internet capability; the ability to monitor or effect the body and/or the environment (e.g., for the purpose of human health or comfort; to effect body temperature or absorb human odor, moisture or gas); antibacterial properties; utilitarian properties in or on fabrics (e.g., in coatings); the ability to power another device (e.g., iPod or computer); other properties enhanced or provided by nanomaterials in such uses prior to May 1, 2003 or prior to May 1, 2004, and/or other utilitarian or principally utilitarian properties. However, it may be preferable that this not be the basis by which these materials, mediums or images of design are designated inventive images, and it may be preferred that the use of such nanomaterials for the properties listed above in mediums or images of design not enable the nanomaterials to be classified as smart materials and/or as stabilizers. In specific images of design, the same nanomaterials, the same nanotechnology and/or one or more others, may enable the medium or image of design to be designated an inventive image and it may enable the nanomaterial(s) to be classified as stabilizers and/or as smart materials. However, if the nanomaterial is of a kind which was not conventionally used for such purposes prior to May 1, 2003 or prior to May 1, 2004, if such use of the nanomaterial did not exist in design, or in fabrics, textiles, fashion design, or coatings used in design prior to one or both of these dates; if the nanomaterial is of a kind which would have been considered extraordinary or novel for such use prior to one or both of these dates, or if the nanomaterial enhances or provides one or more X-elements and/or visual, optical and/or light effects beyond those that are conventional (that may be reversible), it may be preferable that the medium or image be considered an inventive image and/or that the nanomaterial be considered a stabilizer and a smart material.

An embodiment is directed at compositions with simple extremely minimal designs which emit light or function as lighting (e.g., OLEDs). This might be an OLED that emits uniform, monochrome, static light that appears white, colorless, natural or like daylight, with or without a dimmer for variable brightness level or without any additional aesthetic variation, e.g., a continuous plane of white or colorless light on the ceiling or wall in a geometric shape like a rectilinear shape or oval, that may be dimmed. It may be desirable that such light emissive mediums or images not be considered inventive images, or that their classification as inventive images only occur if they are one or more of: A) thicker than 2D planar, thicker than about 0.25", 0.33", 0.5", 0.68", 0.75", or 1.0," 3D, textured or textured more deeply than ordinary sanding or sandblasting; irregular in shape, form or surface; with negative spaces, embedding, inlays, attachments, incising, embossed, an uneven form, other light properties like reflectivity, another utilitarian function like serving as a window, the ability to be responsive or interactive (such as responding to changes in natural light or responsive to a viewer), or with aesthetic variations not in conventional wallpaper; B) with one or more nanomaterials, other smart materials that are not OLEDs, that are X-elements; C) wallpaper with a non-repetitious pattern or no pattern (e.g., interrupted repetition or no repetition), D) emitting light that changes in a way other than its overall brightness level, or emitted light with another aesthetic effects or irregularity; and/or E) in a shape or form that is non-rectilinear, non-geometric, nonplanar, irregular, nonuniform, inconsistent or varied, uneven, perforated, discontinuous, asymmetrical, unsymmetrical or nonsymmetrical, unbalanced or off balance, rough or unsmooth, non-standardized, inhomogeneous, or with other such characteristics.

In the context of the present invention, for certain inventive images, for images of design or for all such inventive images, it might be desirable that the terms "image" and "design" not include works with such extremely minimal designs, and/or with designs having visual patterns that can be clearly seen to repeat multiple times throughout the medium or image.

It may be preferable that e-materials or the technology for them from Fujitsu of Japan not be the basis by which a medium or image is designated an inventive image, or this preference may be desirable if the e-material has one or more of: (a) proprietary technology by Fujitsu that existed in about 2005 or earlier, (b) a size less than: about 4.0" diagonal, about 110 pixels per inch or less, about 320×240 pixels QVGA, and/or about 0.8 mm thick or about 0.6 mm thick, or thicker, (c) bendability, it is bendable with an image memory function, or it can bend without significant loss of quality to a radius that is greater but not less than about 59 to 39 mm, (d) a thin film flexible substrate, (e) a passive matrix, (f) cholesteric liquid crystal display, (g) text, informational text, updated text, interactive text, text that is news or narrative, and/or (h) a means of taking in or receiving data or images such as: Bluetooth, Wi-Fi or other wireless connection, Ethernet, a UBS stick, Compact Flash, memory card, similar means, etc. It may be preferable that e-materials or the technology for them by Fujitsu be the basis for designating mediums or image as inventive images if they: (i) provide a full range of color, or at least 3 or 4 colors, (j) have a diameter greater than about 6 to 15 inches, (k) are not easily portable or hand held (e.g., too large or inconveniently shaped), (l) fold, bend, roll or flex without significant loss of quality to a radius less than about 59 to 39 mm, (m) have an active matrix, (n) are not narrative, do not tell a story or the news, do not provide or process data or information, are fine art or have no utilitarian function, (o) change coloration using a stimulant or a stimulant not initiated by physical contact such as changes in temperature, atmosphere, weather, light, ambient or environmental change; sound (e.g., sound of a viewer, voice command, music, noise, etc.); change in the stock market, etc., and/or (p) cannot take in or receive data or an image from: another device or source, a device that it is not physically connected to, another location, a cell phone, Bluetooth, Wi-Fi or other wireless connection, Ethernet, a UBS stick, Compact Flash, memory card or similar means.

Inventive images may be mediums for making graphic design or they may be graphic design. However if some smart materials or technologies described herein are used in these mediums or images (e.g., if they are or have an OLED and/or e-material) and this is the basis for designating them inventive images, it may be preferable that: A) they do not contain any: visible legible text, logo, or legible text that is narrative, promotional, for sales purposes, informational, and/or news, B) the graphics are not: diagrams, charts, signs, advertising or illustrations of text (e.g., in a book, story, news or narrative text), C) the text is poetic, nonsensical or not legible, D) they are a nanomaterial or they have at least one nanomaterial, E) they have at least one of the X-elements, F) the inventive image is for making fine art graphic design, or graphic design with no utilitarian, non-visual function, or it is a work of graphic design that fits this description, and/or G) they have a shape or form that is one or more of: representational (e.g., shaped like a star or a horse), 2D planar, foldable, flexible, rollable, irregular, non-rectilinear, nonplanar, nonuniform, non-geometric, inconsistent or varied, uneven, textured or textured more deeply than ordinary sanding or sandblasting; asymmetrical, unsymmetrical or nonsymmetrical; unbalanced or off balance; rough or unsmooth; non-standardized, inhomogeneous, or other such characteristics.

In embodiments, the use of nanomaterials or nanotechnology may enhance or impart one or more of the following properties to architectural images, to mediums for making them, or to devices, machines or systems that are not images themselves but that might be considered part of architectural images or a medium for them. Among the properties are (a) properties that enable the architectural space to function effectively or more effectively with little or reduced human effort; (b) properties that enable the automation of one or more domestic, informational, operational and/or utilitarian tasks or that make such tasks easier, e.g., using sensors, computers, monitoring devices, robots, remote devices, other forms of artificial intelligence, etc.; (c) enhanced or new ability to control or operate systems, devices, machines and/or appliances that are not mediums or images themselves within the architectural space (such as those for heat, air condition, ventilation, water, the clothes drier, lighting, security, communication, information, entertainment, etc, e.g., automatically turning down the television or stereo when the phone rings, or the use of gestures to turn on appliances); (d) to enhance or add safety or security, such as to keep an eye on a child or a disabled or elderly person, to detect intruders, to prevent slipping, etc; (e) the ability to automatically track the status of subjects which might be chosen, or changed and/or communicate human needs (like keeping a list of what is in the refrigerator, automatically ordering groceries that are not in the architectural space, automatically suggesting menus or attire suitable for the weather, keeping the daily calendar, serving as an assistant to human memory, etc.); (f) to assist occupant(s) of the architectural space, for convenience or to lessen the effort needed for the architectural space to function as desired; and/or (g) for other such properties or utilitarian purposes. Though such properties and other properties enhanced or enabled by nanomaterials in architecture prior to May 1, 2003 or prior to May 1, 2004 from nanomaterials or nanotechnology may be integrated into an architectural space to any extent and though such architectural space might be called smart or intelligent, it is preferable that they not be the basis by which architecture or a medium for it is designated an inventive image, or a smart or intelligent inventive image. It is also preferred that the use of such nanomaterials for properties listed above in architecture or mediums for it, and for other properties enhanced or enabled by nanomaterials in architecture or in a medium for it prior to May 1, 2003 or prior to May 1, 2004 not enable the nanomaterials to be classified either as smart materials or as stabilizers.

It may be preferable that displays or flat panel displays that are (i) flexible, or (ii) transparent and/or translucent, not be the basis for designation of these forms as inventive images unless they have one or more of (A)-(I): (A) both (i) and (ii) above, (B) forms flexible enough to fold, bend or roll: (i) to any extent, curving the form, or so that opposite parts of their form meet, (ii) without significant loss of quality, with their functionality in tack, unchanged, or changed only in a way that is minor, insubstantial, and/or not visually or aesthetically disruptive, (iii) to a radius of: about 3-1 inch or less, or of about 59-39 mm or less, (C) they: are not narrative, do not tell a story or the news, and are not televisions; do not provide or process data, information or email; are not phones or video phones; they are fine art, and/or as images, they have no utilitarian function, or they only have a secondary or minor utilitarian function, (D) coloration that changes using a stimulant, or using a stimulant which is not initiated by physical contact with the inventive image, (E) a nanomaterial, an x-element or another smart material, (F) an additional light effect (e.g., a lens, iridescence, other examples herein and in cited references), (G) they do not resemble conventional windows, and/or (H) they cannot take in or receive data or an image from: another device or source, a device not physically connected, another location, a cell phone, Bluetooth, WiFi wireless, other wireless connection, Ethernet, a UBS stick, Compact Flash, memory card or similar means; or (I) these inventive images, or their form or structure are: i) at least about 0.2 cm thick, preferably at least about 0.3 cm thick, more preferably at least about 0.45 cm thick, desirably at least about 0.6 cm thick, most preferably at least about 0.8 cm thick, and most desirably at least about 1.0 cm thick, ii). not paper-like, not in the shape, the form and/or the structure of conventional paper, iii). not in a shape or a form that is rectilinear, regular, uniform, consistent, even, untextured, symmetrical, balanced, smooth, standardized, homogeneous, and/or other such characteristics, and/or iv). in a shape or form that is stiff or rigid, non-rectilinear, non-geometric, nonplanar, irregular, nonuniform, inconsistent or varied, uneven, textured or textured more deeply than ordinary sanding or sandblasting, perforated, with negative spaces, discontinuous, asymmetrical, unsymmetrical or nonsymmetrical, unbalanced or off balance, rough or unsmooth, non-standardized, inhomogeneous, or with other such characteristics.

It may be preferred that electrochromic and/or smart window technology (systems, displays, etc.), and/or technology that changes a colorless transparent or translucent material to a colored, opaque, reflective or mirrored state, or that changes from transparent to translucent or almost to opaque in mediums for making images and in works of design that function as smart versions of: windows, partitions, skylights, privacy walls, mirrors, and the like (such as in architecture and cars), not qualify as the basis for designation as inventive images. Or this may be preferred if one or more of these conditions exist. (A) The inventive image's form, it's coloration and/or it's surface is: uniform, even, evenly graduated, regular, continuous, smooth, planar, rectilinear, rectangular, geometric, window-like, highly utilitarian (e.g., optimized for portability, privacy, temperature control and/or ergonomics), and/or made of an even, regular, very thin layer or film on an even, regular, transparent or translucent image support. (B) In at least one of its states, the technology provides or enhances the inventive image's coloration in a manner that is: even, uniform, graduated, gray, milky white or off white, colorless, transparent, translucent, opaque, reflective or like a mirror, regularly repetitious, in a repeating pattern or a repeating wallpaper-like design, monochrome, with minimal color or with two colors and possibly other colors from their mixtures, showing only one color at a time; and/or with color that changes or transitions evenly, uniformly, in progressive gradations, all over the medium at once (e.g., about 90% or more) or in an even wave moving across the medium, etc. (C) The technology is bistable. (D) The technology was conventional in art, design or architecture prior to May 1, 2003 or prior to May 1, 2004, and the medium preferably is that same kind of art, design or architecture; (E) the technology has, is on, and/or is within a conventional window of any kind, or an image support with a shape, a form and/or a structure that is window-like, or that is like a kind of window or skylight that was conventional prior to May 1, 2003 or prior to May 1, 2004, (F) the technology that does not alter the work's conventional window-like or mirror-like appearance, shape, form or structure, or (G) The function of this technology is primarily or entirely utilitarian (e.g., for anti-glare or anti reflection, to block light or heat, for privacy or security, etc.).

It might be preferable that the use of such technology in mediums and images that function as: windows, partitions, skylights, privacy walls, mirrors, and the like (such as in architecture or design) be the basis for which such mediums or images are designated inventive images if one or more of these criteria are met: (I) the medium or image has a shape, a form, a structure and/or coloration that is: (I-i) non-window-like or non-mirror-like; unusual or rare for a window, skylight or mirror; not optimized for utilitarian purposes or not entirely utilitarian (e.g., not optimized for portability, privacy purposes, temperature control and/or ergonomics, or in a shape, form, structure or coloration that reduces or changes the its ability to function as a conventional window); (I-ii) nonplanar, non-rectilinear, non-geometric, irregular, nonuniform, inconsistent or variable, uneven, textured irregularly or more deeply than ordinary sandblasting, perforated, with negative space; asymmetrical, unsymmetrical or nonsymmetrical, unbalanced or off balance, non-standardized, inhomogeneous; irregularly, unevenly or inconsistently colored; showing more than one color at a time; with color, transparency and/or translucency that changes selectively (such as in a design); (I-iii) presenting an element that is: representational, symbolic or pictorial, or another depiction, picture, drawing or design; and/or (I-iv) with other such variations; (J) it is fine art, it's main or only use is visual, or it is for making such an image. (K) the medium or image is a nanomaterial or it has a nanomaterial; or it is a nanomaterial or has a nanomaterial of a kind not conventionally used for such purposes prior to May 1, 2003 or prior to May 1, 2004; or it or they are of a kind that did not exist in electrochromic systems or smart window technologies in art, design or architecture prior to one or both of these dates; or it or they are of a kind which would have been considered extraordinary or novel for such use prior to one or both of these dates.

Electronics, integrated circuits, memory, processors and/or chips made using nanomaterials and/or nanotechnology may be used as desired in inventive images. However, it may be preferable that such mediums or images not be designated inventive images, and/or that they not be designated as having nanomaterials or as being nanomaterials if the electronics, the integrated circuits, the processors and/or the chips are or have one or more of: (a) an Intel processor on the chart in U.S. Pat. No. 8,921,473, (b) a processor, an integrated circuit or a chip made using nanomaterials all of which were used in processors, integrated circuits or chips prior to May 1, 2003 or prior to May 1, 2004; (c) a processor, an integrated circuit or a chip made using nanomaterials like or similar to those in (a) or (b); (d) a processor, an integrated circuit or a chip made using process(es) that are about 150 nm or greater but not less, more preferably about 130 nm or greater but not less, preferably about 90 nm or greater but not less, more desirably about 80 nm or greater, more preferably about 60 nm or greater and most preferably about 44 nm or greater. Refer to U.S. Pat. No. 8,921,473.

It is preferable that mediums and images with electronics, integrated circuits, memory, processors and/or chips made using nanomaterials and/or nanotechnology be designated inventive images, and/or that they be designated as having nanomaterials or as being nanomaterials if their integrated circuits, processors and/or chips meet one or more of the following criteria. (A) They are nanomaterials or they were made using at least one nanomaterial that: did not exist in processors, integrated circuits or chips used in images prior to May 1, 2003 or prior to May 1, 2004; and/or that would have been considered extraordinary or novel prior to one or both of these dates, (B) The inventive image is fine art, or it's use is primarily or exclusively for aesthetic or non-utilitarian purposes.

(D) They are made with one or more: nanowire, silicon nanowire, strained germanium nanomaterials, nanotubes, CNT, buckytubes, conductive polymer, conductive polymer nanomaterial, NRAM by Nantero, chips that do quantum computing, superconducting nanocircuits, quantum dots, quantum bits or qubits, DNA and/or the self-assembly capability of DNA, optoelectronic memory such as those made using carbon nanotubes, ferroelectric random access memory, FRAM, or memory made with ferroelectric nanomaterials such as ferroelectric nanodisks and/or nanorods, magnetic RAM or MRAM, ovonic memory or ovonic unified memory; molecular memory that reads and writes data by adding and removing electrons off nanoscale molecules, hybrid devices that combine nanotechnology and MEMS such as IBM's Millipede, memory with three dimensional architectures, data storage made using germanium crystals or NCs, nanowire memory cells, porphyrins, memory made using porphyrins, holographic memory; made with nano-lithography such as liquid immersion or immersion lithographic processes, imprint lithography or nanoimprint lithography, or extreme ultraviolet lithography; optical memory that stores photonic qubits, nanomechanical memory such as that made from single-crystal silicon wafers, memory by ZettaCore of Denver, Colorado; a memory device, a FLASH memory device, circuits or logic circuits made using NCs, silicon NCs and/or silicon-based self-assembly, memory devices made using molecules called rotaxanes (such as those made by HP's Quantum Science Research Lab), and/or other novel or extraordinary nanomaterials or nanotechnology processes. (d) They are made with a combination of these.

Inventive images may be made using electronics, devices, machines, systems or ingredients that are capable of making formerly static formal elements changeable or of assisting or enhancing this capability, or that are capable or being responsive or smart, which do not contribute to the inventive image in any way using this capability, (e.g., electronic or nanotech materials or parts used for unchanging properties of texture, color, pattern, structure, form, collage, etc.). In such cases, it may be preferable that these ingredients are not classified as: a smart material, a stabilizer, or a nanomaterial, and/or that they are not the basis for designating a medium or an image as an inventive image or as part thereof herein.

In embodiments, inventive images or part thereof are one or more sun prints, photograms, negative photographic prints, positive photographic prints, negative photographic transparencies, positive photographic transparencies, holograms, or as combinations of these, as desired. These can be transparent, translucent, opaque, partially opaque, or combinations of these, and they can be further processed as desired. For instance, inventive images or part thereof might be transparent photographic transparencies made or applied on polymer that is transparent, translucent, opaque, partially opaque, or a combination of these, e.g., portraits landscapes, abstractions, etc.

In some embodiments, inventive images present a 2D or 3D intangible holographic display or hologram (which may appear to be floating), which may be interactive and/or responsive, e.g., made with conductive polymer or nanomaterials. It might appear to move or change, it have sound, they might be controlled by a computer, by sensors, they might be controlled remotely from one or more locations, etc. The other part or parts of the inventive images in these embodiments (e.g., the tangible part, the part containing one or more polymers, or the part or parts that create the intangible holographic display), may or may not be visible to viewers. In these embodiments, light, sensors, computers or related materials, projector, other devices, movement or gesture recognition technology, touch controls, and other inventive image ingredients used to form or process the holograms and to enable them to function interactively and/or responsively are stabilizers. In examples, the viewer may touch a part of the intangible hologram and it may respond by changing its display (e.g., its light, its color, its rate of change, its subject matter, its sound, etc.). In addition or instead, the image may respond by activating a physically separate, tangible device and/or inventive image part. In embodiments, inventive images are made using holographic colorants. In a further embodiment, one or more parts, layers or effects that are stereoscopic, autostereoscopic, lenticular or computer generated are part of an inventive image.

In embodiments, at least one intangible holographic display or hologram comprised of light is part of inventive images. Such intangible holograms may be interactive or responsive. Because they have no tangible form, and because tangible form may not be physically connected to them or touching them, such holograms may appear to be floating, and they may dematerialize the space of an inventive image, an effect which may depend on the rest of the inventive image. The intangible holographic displays of these embodiments might appear two dimensional or three dimensional, they might appear to move, they might be displays that change over time, they might be accompanied by sound, they might be controlled by a computer, by sensors, using an interactive feature, by movement or gesture, using light, they might be controlled remotely from one or more locations other than where the holographic display(s) appear, or a combination of these. The other part or parts of the inventive images in these embodiments (e.g., the tangible part, the part containing one or more polymers, or the part or parts that create the intangible holographic display), may or may not be visible to viewers, e.g., these image parts may be hidden from view, for instance, hidden in the wall, in the ceiling, in the image's mount or base, located in a remote place, etc. Polymer might be used in these embodiments for example, as one or more image supports, in the form of one or more photographic layers (e.g., with holograms recorded on them by lasers), as a colorant, as another image part, or a combination of these.

In some of these embodiments, the intangible holographic display or hologram (which may appear to be floating), is interactive and/or responsive. In these embodiments, light, sensors, computers or related materials, projector, other devices, movement or gesture recognition technology, touch controls, and other inventive image ingredients used to form or process the holograms and to enable them to function interactively and/or responsively are stabilizers. The holograms in these embodiments, might or might not require that the space they are viewed in be darkened or dark. In examples, the viewer may touch a part of the intangible two or three dimensional hologram and it may respond by changing its display (e.g., its light, its color, its rate of change, its subject matter, its sound, etc.). In addition or instead, the image may respond by activating a physically separate, tangible device and/or inventive image part (such as a computer, a device that creates other light effects, a device that provides sound, a device that causes an image part to move, an electrical device, a light emitting device such a LEDs or OLEDs, combinations of these, etc.). Such tangible devices or inventive image parts may or may not be visible or completely visible to viewers who perceive their effects (e.g., viewers may see or hear the light or sound that might emanate without seeing the device producing it).

As examples, inventive images might be made in these embodiments using technology such as that described in or by: (a) U.S. Pat. No. 6,377,238 entitled "Holographic control arrangement," (b) Holotouch Inc. of Darien, CT (refer to www.holotouch.com), (c) Atlantex Corp of Hillsdale, NJ, such as HoloTouch or HoloTouch user interfaces, and Beam One or BeamOne holographic user interface (see www.holodemo.com and the document that can be downloaded there: BeamOneDatasheet.pdf), (d) Hologram TV.com of Clearwater, Florida (refer to www.3dtv.tv or www.hologramtv.com), (e) technology used by InfoPerks LLC an affiliate of Green Hills Ventures of NY, and/or (f) technology similar to these examples, (all of which are for making items other than images, such as information and communication devices, telephones, computer monitors, ATM machines, medical devices, information kiosks, instruments controlled with keypads and buttons, etc.).

In other embodiments, tangible holograms are used in inventive images. Examples are holograms that are printed onto inventive image surfaces (such as onto image supports). Other examples are holograms that are projected onto the inventive image or part thereof such as holograms made using materials and/or technology from G+B pronova GmbH of Bergisch Gladbach Germany at www.holopro.com like Holopro. Refer also to the examples of US Patent Application No. 20030035917-A1.

In embodiments, inventive images are made using holographic colorants. In addition to the examples already provided, inventive images might be made with holographic pigments such as Geometric Pigment from Silberline Manufacturing Co., Inc. of Tamaqua and Lansford, PA (refer to www.silberline.com), and Spectratek Technologies Inc. of Los Angeles, CA (refer to www.spectratek.net). Geometric Pigment is made from clear polyester that has been holographically embossed and vacuum metallized, then epoxy coated and specially micro-cut into different pigment flake sizes. In embodiments, other products from Silberline Manufacturing Co., Inc. and from Spectratek Technologies Inc. are used to make inventive images, e.g., for effects of light and color.

Absorbency

In some embodiments, polymer in inventive images can be: absorbent, not absorbent, hydrophobic, hydrophilic, or a combination thereof. These are collectively referred to as "absorbency level" or "absorbent level." One preferred method of forming such polymers is by using particular active ingredients in cPRM and/or one or more particular stabilizers in cPRM, on polymer, or a combination of these (e.g., a fiber stabilizer). In addition or instead, such polymers can be formed using other ingredients in and/or on polymer, such as absorbent papers, paper pulp, colorants and strands of various kinds. Examples of desirable uses of polymer that is hydrophobic, hydrophilic, absorbent, and/or not absorbent are: (1) as a final coat on inventive images, e.g., non-absorbent surfaces desired for permanence; (2) as surface preparation stabilizers (so that paint might soak into an absorbent polymer); (3) for forming image supports (such as absorbent image support stabilizers); and (4) for visual effects on inventive images (e.g., with superimposed coloration); or combinations thereof. Among examples of mediums or colorants which might be superimposed onto absorbent polymer in forming an inventive image are: paints, dyes, inks, primers, binders, or photographic emulsions.

Using hydrophilic and/or absorbent polymers, inventive images can be made with new effects of real light, color, real transparency and real spatial depth, e.g., effects of stained, bleeding and poured color. In embodiments, a synthetic absorbent polymer inventive image is superimposed by one or more mediums that may for example be paint(s), dye(s), ink(s), primer(s), binder(s) or photographic emulsion(s), e.g., which may bond to the absorbent polymer.

In preferred embodiments, an inventive image is made using at least one synthetic absorbent polymer capable of absorbing more than, for example, about 20% of its weight in water. In an illustration, an inventive image is made using an absorbent polymer such as 2-hydroxyethyl methacrylate (HEMA), mono-glycerol methacrylate, and/or another polymer which either has the same or a greater number of oxygens than glycerol. For instance, using such an absorbent polymer, an initial image support stabilizer is made and superimposed by conventional paints and/or inks which absorb into it to varying extents forming a 2D or 3D inventive image painting which may be viewed from one or multiple sides, as desired. In an example, such an absorbent polymer is used (e.g., with a colorant mixed into it) as a surface preparation stabilizer on an inventive image and then superimposed by colorant(s) which absorb into it to form an inventive image. This might be the completed image, but if not it might be further processed.

In a preferred example, in embodiments, an inventive image is made of a mixed polymer or a copolymer comprised of at least one absorbent polymer and at least one polymer that is not absorbent. Thus for example, the absorbent polymer ingredient(s) might provide the image with aesthetic qualities (e.g., enabling desired further processing such as superimposed applications), while the non-absorbent polymer ingredient(s) might provide the image with desired physical, structural and/or dimensional properties such as stability, strength and/or permanence.

In preferred embodiments an inventive image is formed by placing a PRM or cPRM capable of forming an absorbent polymer on a support surface where it polymerizes. The support surface may be a mold, or it may be wood, paper, stone, ceramic, metal, fabric, polymer and/or glass. In embodiments, an absorbent polymer or a cPRM containing at least one polymer that is absorbent, is superimposed on an image support comprised of a different polymeric formulation which provides support to the image, enhancing the structure, stability, strength and/or permanence of the superimposed absorbent polymer layer. In preferred embodiments, an image support (e.g., stabilizer) is made with a first, non-absorbent polymer layer bonded to a layer of a second, absorbent polymer, e.g., made with a synthetic absorbent polymer. In these embodiments, the second polymer may for example, be made with polymer(s) having hydroxyl, amide, amine, ester, or ether functional groups, or, the second polymer might, for example, be made with alkyl acrylate(s), alkyl alkacrylate(s), and/or functionalized derivative(s) thereof. The second polymer might, for example, be made with 2-hydroxyethyl methacrylate (HEMA), it might be made with 2-(Acetoacetoxy)ethyl methacrylate, and/or it might contain no more than, for example, about 4% (by volume) HEMA. The first, non-absorbent polymer layer might, for example, have about 10% (by volume) of absorbent polymer.

In preferred embodiments, an ingredient that modifies the absorbency of polymer is added to polymerization reaction mixture or to a polymer. This ingredient is a stabilizer. When added into or on cPRM or into or on polymer in an inventive image to form or fortify the bond between the polymer and one or more superimposed applications and/or colorants upon it, one or more absorbent polymers, and cPRM or PRM which forms absorbent polymer, are preferred stabilizers. Absorbent polymer might also be used in or on other materials or ingredients in inventive images such as fabric, paper, or wood. Inventive images can have effects which rely on the absorbency of polymer being less than or different than that of comparable conventional images, as well as effects which rely on the lack of absorbency of polymer.

More Changeable Inventive Images such as Stimuli Sensitive Materials

In embodiments, smart materials are used to make inventive images that may be called smart images. An important group of smart materials enables inventive images to be responsive, interactive, controlled, to change, to be programmed or to be modulated, e.g., smart materials that respond to stimuli, triggers or influences. Stimuli, triggers and influences that enable or cause smart inventive images to change are typically stabilizers. Examples of smart materials and smart images self-actuate. In examples, the relationships between smart materials in an inventive image, their stimuli, triggers or influences, and the response(s) apparent in the inventive image may be designed or controlled as desired.

In preferred embodiments, smart materials used to make inventive images respond by changing shape, size, volume, density, viscosity, light properties, color (e.g., hue, value and/or intensity), appearance, optical properties, and/or a physical property, for instance, in response to heat, light, electricity, or energy (e.g., the structure, form or orientation of molecules in a smart material may change altering its optical and light properties). This might change the material's absorbance, scattering and/or reflectance of light, changing its color. The change might be reversible. Examples are photochromic, electrochromic and thermochromic smart materials.

In preferred embodiments, the shape, size, volume, density, viscosity, light properties, color, appearance and/or other physical property of polymer smart material(s) used in inventive images can be changed using one or more stimuli, triggers or influences which are typically stabilizers. These stabilizers might for example, be ingredients in the polymer material or in the inventive image, they might be other inventive image parts and/or elements, or they might be external stimulants or influences which are not tangible inventive image parts. In typical examples, the change(s) in the polymer or polymer material of these embodiments are reversible and if desired, they can be repeated, e.g., with the deactivation and then if desired, the reactivation of the stabilizer(s). Also, in typical examples, the change(s) in the polymer or polymer material can be modulated or tuned, for example, in a controllable way, e.g., by controlling or adjusting the stabilizer(s). It is preferable that the change in the polymer smart material of these embodiments and/or its effect(s) on its inventive image are visible or apparent.

In a number of these preferred embodiments, the smart material, the responsive polymer, polymer mixture or polymeric material is a polymer gel, a hydrogel, an absorbent polymer, a redox polymer, or it contains one or more of these. Responsive polymers, polymer mixtures or polymeric materials in these embodiments might also be called Stimuli Sensitive Materials. Examples of stabilizers for use in these embodiments are: light, heat, radiation, chemicals, solvents, photochemicals, electricity, changes in the environment, in temperature, in acidity or pH; the presence of toxins or drugs, magnetic fields, ionic energy, salt, stress, pressure, switches, dials, wires, electrodes, and other electrical parts that assist the change in the polymer. In certain examples of these materials and of compositions made with them, it is preferable to cross link the polymer composition. Conventional liquid crystal displays (LCDs) are preferably not Stimuli Sensitive Materials or compositions of the present invention, and stimuli, triggers, or influences such as electricity, electrodes and other electrical parts that conventionally modulate or change conventional LCDs and light switches (such as changing nematic liquid crystal materials) are preferably not stabilizers. Also, stimuli, triggers, or influences such as light, heat, electricity, electrodes and other electrical parts that conventionally modulate or change conventional polymeric layers on windows, skylights, on partitions or privacy walls such as those in architecture or design (sometimes called shutters, optical shutters, or smart windows) are typically only stabilizers when used to make inventive image works of fine art (though fine art might function as windows or skylights), when they contribute to, enable or enhance a pictorial or design element, or when they are used to make inventive image works of design which do not function as windows, skylights, partitions or privacy walls. Stimuli Sensitive Materials may for example, change in coloration, in light or in form change as viewers move or gesture, as they initiate a trigger, with sound like voice or footsteps.

Polymeric materials used in these embodiments, are not limited by restrictions that limit their composition and design in the formation of products that are not images (like coatings, sensors, products for medical use, display devices, toys, actuators, optical shutters, layers for use on windows, etc.). For example, specifications which restrict the uniformity or irregularities, the thickness and evenness, the coloration, the shape (e.g., rectilinear); the viscosity, the solidity of the form or the firmness of the gel; the texture or pattern, the response to the stimuli, the rate and consistency of its response, the further processing or the lack thereof, the aesthetic variation, the interactivity, and other elements of stimuli responsive polymeric materials in products that are not images, may or may not be used as specifications for inventive images using the same or similar stimuli responsive polymeric materials. If desired, in making inventive images, such decisions may for example be made primarily or entirely for aesthetic rather than utilitarian purposes.

In response to a stimuli, trigger or influence, polymer gels, absorbent polymers or other polymer materials used in these embodiments, preferably called Stimuli Sensitive Materials, might change in shape, size, volume, density, light properties, color, appearance and/or another physical property. In example, polymers materials might be designed to respond to a particular stimulus by changing into a predetermined shape, form or pattern. In examples, the stimuli, trigger, or influence used might affect a delicate balance of forces between molecules in the polymer gel. Removing or deactivating this stimuli, trigger or influence may reverse the change in the polymer gel, and its reactivation may repeat the change. For instance, a stimuli, trigger or influence that strengthens repulsive forces within polymer gels (which are typically electrostatic or hydrophobic in nature) may make polymer gels expand, and anything that builds attraction within polymer gels may make them shrink, such as influences building attraction mediated by hydrogen bonding or van der Waals interactions. Thus, when exposed to a change in temperature and/or acidity (that may even be minimal), polymer gels may, for example, change in appearance and/or size and their change may be dramatic. Such effects may be desirable in inventive images. There are lots of other examples in the public domain for use in inventive images. Since it is desirable that inventive images be able to be made with the desired aesthetic effect and formal elements, use of any of these may be desirable.

In an illustration, the change in dimensions of polymer material(s) might change the amount of emitted light, reflected light, and/or transmitted light in the inventive image as well as possibly changing other elements in the inventive image, such as its color, composition, shape and/or form. These changes may be reversible and repeatable.

In one of these embodiments, a smart material which is preferably a Stimuli Sensitive Material is a polymer gel, hydrogel or absorbent polymer used to make inventive images that switches between a colored state and a translucent or a transparent state in response to a stabilizer, and/or it changes in size, shape and/or volume in response to a stabilizer (such as radiation, heat and/or other examples named above). In a more specific example, gel particles dispersed in a solvent at room temperature are swollen and the liquid appears dark, but when the liquid is stimulated for example, by heat (e.g., brought to about 40° C., the heat is a stabilizer), its particles shrink and the liquid turns clear. Such a liquid might for example, be used to make an inventive image or part thereof, thus, a stabilizer (like a form of heat) might be used to change the inventive image or the part thereof, such as to modulate its color and light, going from an opaque to translucent or transparent.

In other embodiments, polymer smart materials which are preferably Stimuli Sensitive Materials used to make inventive images, change in the degree of their transparency or translucency, or between a transparent and a translucent state with the use of a stimulant, trigger or influence (a stabilizer). The color of these polymers may change as well. These changes may be reversible, repeatable, controllable, and it might be possible to modulate or tune them. Examples of these are polymer materials conventionally used on windows, e.g., for smart windows, optical shutters or elecrochromic systems or effects.

In embodiments, inventive images or parts thereof can change or be changed from a transparent or translucent state to a reflective, mirror-like or mirrored state. In examples this might be accomplished using a smart material which may preferably be called a Stimuli Sensitive Material. A trigger, stimulant or influence might bring about such change in the formal elements of these inventive images, such as the use of a touch control, an electric switch, electricity, an electric field (electrochromic switching) or by exposure to dilute hydrogen gas (gasochromic switching). Examples are made with transition metals that might be called transition-metal switchable mirrors might be used in inventive images, such as those developed by Thomas Richardson of Berkeley Lab's Environmental Energy Technologies Division. These may for example be made using an alloy of magnesium and one or more transition-metals. Although this technology was developed for conventional windows, it might be used in any way desired in inventive images. For instance, this technology does not have to be applied as thin films, though it may if desired. It might be applied evenly or unevenly on part(s) or on entire surfaces of inventive images or parts thereof such as image supports, or it may be throughout an inventive image or part thereof such as an image support. Use of this technology on windows for architecture and in cars is preferably not basis for designating an inventive image. Technology conventionally used in smart windows might be used in these embodiments, such as materials and/or processes used or similar to those used in smart windows that might be called reversible electrochemical mirrors (REM) by Rockwell Scientific Co. of Thousand Oaks, CA (see www.rockwellscientific.com).

In embodiments, photonic materials might be used to make inventive images. In embodiments, inventive images are made with photonic smart materials that are preferably Stimuli Sensitive Materials which are synthetic opals (e.g., hydrogel opals, inverse opals, and opals made with silica spheres and imbibed with liquid crystal, artificial opals); polymerized crystalline colloidal arrays (PCCA); colloidal crystals; and/or gel particles embedded in crystalline colloidal arrays that change in color, light properties, and/or volume in response to stabilizers (such as: changes in temperature, light, electric field, other examples listed above, and combinations of these). These changes might for example, be tunable and reversible. Synthetic, artificial or plastic opals belong to a class of photonic materials that use light (or photons) to carry or process information. Synthetic opals might for example, dramatically change colors in the presence of a chemical agent. Synthetic opals may be hexagonally packed arrays of silica. Colloidal crystals may be latex microspheres. Inverse opals may be fabricated from metals, oxides, various forms of carbon, polymers, semiconductors, etc. As an illustration, the color and volume of the hydrogel opal in water can respond to changes in temperature and electric field. Such effects may be desirable in making inventive images. Different degrees of opalescence may be observed at varying viewing angles. As an illustration, a polymeric gel material may be synthesized with the inclusion of pigments, which imitate pigment cells in the natural world. A device can be constructed by dispersing the polymer gel particles with high concentration of pigments in an aqueous solution within a transparent structure or encasement. An external stimuli is applied.

Photonic crystals, inverse opals, synthetic opals, colloidal crystals, photonic bad gap materials or structures, and other photonic materials might be used in embodiments as desired. These are preferably Stimuli Sensitive Materials. Among examples of their uses in inventive images are in optoelectronics, optical computing, waveguides, optical integrated circuits, filters, polarizers, antennae, lasers, transistors, sensors, fiber, fabrics, etc. for light or color effects, or other formal elements as desired. It is preferable that photonic materials provide or enhance an aesthetic element or a visible aesthetic element in inventive images. In embodiments, inventive images or parts thereof are made with photonic crystals which are smart materials, such as photonic crystal nanomaterials. Photonic crystal may be desirable for use in inventive images for efficient photoluminescence at room-temperature, and/or to store light or light pulses, e.g., under ordinary conditions. In an embodiment, a photonic colorant smart material is used to make inventive images or part thereof the color and/or light properties of which can be tuned or changed using one or more stabilizers. A photonic colorant might be tunable to one or more different colors or to any color desired, such as by the use of one or more stabilizers. Moreover, a photonic colorant might be retunable, as desired. A photonic colorant composition might also be referred to as a photonic ink, p-ink or as photonic paper. It might be used to make inventive images in ways that are like or related to the ways a conventional colorant or ink, or as a conventional paper might be used, e.g., a photonic colorant might be applied on inventive image surfaces like an ink. Photonic colorants are not limited in the ways they can be used to make inventive images as conventional inks and papers are. A photonic ink or colorant might contribute to an inventive image's form as well as its coloration. For example, a photonic colorant might be used to make the surface of an inventive image, a surface preparation stabilizer, an underlayer, a major or a minor part of an inventive image's form, a combination of these, or even an entire inventive image (e.g., an inventive image that is a photonic "paper" or form). In their use in inventive images, examples of photonic inks, p-inks, photonic crystal compositions or photonic colorants with changeable color are classified as reflective displays or e-materials, e.g., by Opalux, Toronto, Canada, www.opalux.com.

In examples, such a photonic colorant might be a colloidal crystal or an artificial opal. It might be made with a polymer gel, the volume of which is changeable. For instance, the use of one or more stabilizers may cause, accelerate and/or contribute to a change in the volume of the photonic colorant's polymer gel, which may change the photonic colorant in such a way that it reflects a different wavelength of light and appears a different color. Examples of stabilizers that might be used to tune or retune such a photonic colorant in an inventive image are: electricity, electrodes, a solvent, environmental changes, temperature changes, pH changes, and combinations of these. As an illustration, a photonic colorant may be a colloidal crystal material that swells and shrinks reversibly, due for example, to the response of a polymer gel ingredient to a solvent or redox change. Such a photonic colorant might consist of a polymer gel between arrays of nanospheres. Photonic colorants in inventive images might be tuned and/or retuned by the image maker, by viewers, or both, e.g., the color might be changed by turning a dial or flicking a switch, or it may be set up to work with movement or gesture recognition technology or other methods described herein. Electrodes, photosensors, wires, dials, switches and other electrical parts that enable photonic colorants in inventive images to be tuned or retuned are stabilizers. Pixels may be made in inventive images using photonic colorants, which might be controlled as desired, for example, to present a display that might change over time as desired.

In embodiments, responsive polymers are used to make inventive images or part thereof which are thermochromatic smart materials. These polymers they respond to changes in temperature with a change in color and/or light properties that may be controllable or tunable, reversible and/or repeatable. This may provide or enhance an aesthetic element such as a pictorial or design element, e.g., effecting the subject matter or visual effect of the image. In these embodiments, the temperature change and elements which assist in changing these polymers in response to the temperature change (e.g., electricity, electrical conductors, photosensors, temperature sensors, etc.), are stabilizers typically when these polymers are used to make inventive images works of fine art or when they are used to make inventive image works of architecture or design which do not function as windows, skylights or architectural glass. In one of these embodiments, a polymer or a polymeric composition is engineered so that it changes to the color desired at the temperature desired, abruptly or gradually, preferably reversibly when or as the temperature changes back. Such a polymer or polymeric composition might be designed to change when the temperature changes such that the size or kind of lightwave(s) it reflects changes. In embodiments, thermochromatic pigments are used in smart materials in inventive images. It may be preferable that these be Stimuli Sensitive Materials. Such pigments might for example, change in color in response to temperature change, e.g., their use in inventive images might be purely for color and aesthetic purposes, or it might also be utilitarian such as for a means of regulating temperature, for instance in the area around the inventive image such as in an inventive image that is a mural, a wall, a ceiling, a table, etc. Refer to the work of Dr. Yiping Ma at Tongji University in China. In embodiments, one or more thermochromic colorants are smart materials used to make inventive images, the color or colors of which change in response to heat produced using conductive polymer. Such a thermochromic colorant might for example, overlap the conductive polymer, and/or it might be superimposed upon the conductive polymer. In examples, electricity might be used to change the color of the thermochromic colorant by producing heat with the conductive polymer. It is preferable that use of thermochromic materials in mediums and images only qualify as Stimuli Sensitive Materials, as smart materials, or as inventive images if this use is primarily or entirely non-utilitarian, such as use of thermochromic materials to provide, assist or enhance visual aesthetic elements, pictorial or design elements or visible formal elements, rather than for example, use of thermochromic materials for information or as an indicator a utilitarian element. A thermochromatic polymer, pigment or other material made for use in contact with the human body in an image which changes in color in response to body heat, preferably will not be classified as a smart material or a Stimuli Sensitive Material of the present invention unless there is another, different basis for such a designation, e.g., unless it has a conductive polymer, an OLED, a stabilizer, a stabilizer that enhances bonding, an image support stabilizer, etc.

It is preferable that Stimuli Sensitive Materials provide, assist or enhance visible aesthetic or formal elements that change or that are capable of changing in inventive images, such as design elements or pictorial elements.

In embodiments, inventive images have smart materials that make piezorochromic, piezochromic, solvatechromic and/or carsolchromic effects. It may be preferable to classify these as Stimuli Sensitive Materials. Piezorochromic or piezochromic materials in inventive images might create color change triggered or stimulated by pressure. For example, stepping on part of an inventive image, pressing it, or sitting on it may result in a visible color change in the image. Thus such inventive images could be interactive. Alternately, such inventive images could have one or more moving parts that trigger or stimulate color change. Solvatechromic materials might trigger or stimulate color change in inventive images using one or more liquids. These inventive images may self-actuate and/or they may be interactive. Carsolchromic materials trigger or stimulate color change in inventive images using electron beam. These inventive images may also self-actuate or be interactive. Materials for use in these embodiments may have or be nanomaterials or conductive polymer.

In embodiments, inventive images are made with fibers, fabrics and/or textiles that are made with or coated with one or more responsive polymers or Stimuli Sensitive Materials. These may be smart materials used to make inventive images that may be smart. They might be flexible, and/or rigid; coated with a non-conductive or insulating polymer, and/or with another material; made with nanomaterials; photochromic, thermochromic (e.g., made with conductive polymer as in the description above), and/or electrochromic (e.g., made with conductive polymer); and made using any process(es). Such fibers, fabrics or textiles might impart inventive images with or enable them to have desirable aesthetic elements and/or functionality or intelligence, e.g., color and/or light properties, electrical conductivity, sensors, electronics, computer functionality, OLEDs, other light sources, photovoltaics or solar cells, batteries, devices that play sound, e-materials, reflective coloration; changing or changeable coloration and/or light; circuits, computers, interactive and responsive features; the ability to monitor the wearer, the viewer, and/or the environment; the ability to respond or to respond selectively, the ability to heat, to cool or to enhance either or both of these (e.g., refer to PCMs and to nanomaterials), the ability to communicate (e.g., with other computers, other devices and/or other people), etc. It may be preferable that inventive images made of this embodiment not serve utilitarian purposes or that any utilitarian purposes they serve be minor or secondary to their visual or other aesthetic purposes. Examples of fibers, fabrics and textiles of this embodiment might be image supports, image support stabilizers or part thereof. Examples require low power. It may be preferable that this embodiment alone not be the basis for the designation of mediums and images as compositions of the present invention unless they have another variation of the present invention such as a stabilizer, a polymeric form, an added smart material, an OLED, etc.

In embodiments, the absorbent polymer(s) in inventive images is "super absorbent."

In embodiments, inventive images are made using electroactive polymers (EAP) that respond to electric or ionic energy. These are preferably Stimuli Sensitive Materials. EAPs are smart materials and inventive images made with them may be smart images. Electric or ionic energy used to activate these EAPs is a stabilizer, as are inventive image parts that assist in using this energy. In addition to examples in US Patent Application No. 20030035917-A1, these are further examples: (a) ferroelectric polymers such as Poly (vinylidene fluoride) and its copolymers and gels thereof, called ferrogels; (b) dielectric EAPs such as acrylic elastomer products; (c) electrostrictive graft elastomers such as a combination of an electrostrictive-grafted elastomer with a piezoelectric poly(vinylidene fluoride-trifluoro-ethylene) copolymer; (d) electrostatic paper such as silver laminated paper (with silver electrodes); (e) electro-viscoelastic elastomers (which are composites of silicone elastomer and a polar phase); (f) liquid crystal elastomer materials (which are composite materials comprised of monodomain nematic liquid crystal elastomers and conductive polymers distributed within a network structure); (g) ionomeric (or ionic) polymer-metal composites or fluoropolymers; or (h) ionic polymer gel such as materials made from polyacryonitrile. In embodiments, conductive polymers might preferably not be classified as Stimuli Sensitive Materials herein. In some embodiments, EAPs change in shape, size, volume, density, light properties, color, appearance and/or a physical property in response to electrical stimulation (a stabilizer), e.g., deformations may or may not be selectable. The change in the EAP might be modulated, tuned and/or reversible. EAP may, for example, be polymers with one or more added stabilizers that increase their dielectric constants, preferably without decreasing mechanical properties of the polymer or of the composite.

Inventive images might be made using electroactive paper which is preferably a Stimuli Sensitive Material. Examples are constructed by depositing electrodes such as gold or platinum on both sides of the paper, and the paper is deformed upon application of an electric potential. The paper can be constructed of fibers including hardwood, softwood, bacteria cellulose, cellophane, carbon mixture paper, electrolyte containing paper, Korean traditional paper, and others. Refer to "Electro-active paper actuators" by J. Kim and Y. B. Seo, in *Smart Materials and Structures*, Vol. 11, pp. 355-360, 2002; and refer to "Performance of Electroactive paper actuators with thickness variation" by Sungryul Yun, Jaehwan Kim and Chunseok Song, Elsevier 2006, Sensors and Actuators A: PhysicalVolume 133, Issue 1, 8 Jan. 2007, Pages 225-230.

In an embodiment, polymer liquid crystal elastomer is used to make inventive images or part thereof which is preferably a Stimuli Sensitive Material, e.g., it may (a) respond to light (a stabilizer) by altering mechanical properties such as size and/or shape; (b) change color in response to a change in its dimensions, such as by stretching or deforming (an effect that might be enhanced by a colorant e.g., dye molecules); or (c) respond to a change in temperature or voltage by changing shape or dimension.

In embodiments, inventive images or parts thereof are made using one or more polymers, polymer mixtures, or polymeric materials with shape memory or that can change in size, shape and/or volume in response to stimuli, triggers or influences which are stabilizers. Examples of these polymers are: nematic elastomers; polymers used to make artificial muscles or similar polymers; polymers that are electroactive; in compositions with photosensitive molecules, responsive to change in temperature or heat. It may be preferred that the designation of mediums and images of these embodiments that function as clothing, fashion design and/or as textiles as inventive images does not rely solely on these embodiments or on the use of the polymers of these embodiments. It may be preferred that shape memory polymers not be considered polymers of the present invention or Stimuli Sensitive Materials unless they have a nanomaterial, unless they are a nanomaterial, or unless they have conductive polymer, unless they have a stabilizer, or unless they are in certain preferable compositions of the present invention.

In embodiments, inventive images are made with photochromic smart materials that are preferably Stimuli Sensitive Materials. Conventional photographic papers, conventional sun print papers and other such conventional photosensitive papers are preferably not classified as smart materials or as Stimuli Sensitive Materials. Moreover, if inventive images have such photosensitive or photographic paper (2D planar, light sensitive, photographic recording paper), it is preferable that their photochromic smart materials or Stimuli Sensitive Materials are separate from it. It may be preferable that these inventive images do not function as windows or skylights in architecture, or as sunglasses or other eyeglasses as fashion design, particularly if their coloration or lack thereof is uniform and even. In an example, a photochromic inventive image (which may be colored, colorless, transparent, translucent and/or opaque) darkens with exposure to sunlight or ultraviolet (UV) light. This color change may be controllable, tunable, reversible (with the removal of the sunlight or the UV light), and this color change may be repeatable. In embodiments, polymers or responsive polymers used to make inventive images or part thereof are photochromic. They respond to changes in light or UV light with a change in color, optical properties, and/or light properties that may be controllable or tunable, reversible and/or repeatable. Light, UV light, and ingredients added into these inventive images to enable them to respond to light (such as photosensors, silver chloride, silver halide, etc.) are stabilizers, typically when used to make inventive image works of fine art or when used to make inventive image works of architecture and design that do not function as windows, skylights or glasses. In further examples, photochromic effects are created in inventive images using compounds or molecules of silver and halogens, such a silver iodide, silver chloride, silver halide, etc. In an example, such ingredients may be transparent and colorless in visible light until they are triggered or stimulated to change by UV light or sunlight. For instance, molecules of substances such as silver chloride or silver halide (e.g., embedded in polymer and/or coated on it), may undergo a chemical process (typically quickly) with exposure to UV light or sunlight which changes their shape so that they absorb visible light and thus appear darkened (typically quickly). The number of molecules that change shape varies with their use in inventive images and with their exposure to the sunlight or UV light. These photochromic effects may be reversible—with the removal of the trigger or stimulant, the sunlight or UV light, the molecules return to their original shape and thus appear transparent and colorless again. In another example, exposure to UV light, (e.g., in sunlight) might enable electrons in halogen ions to move around and these electrons may combine with silver ions to make neutral atoms of metallic silver which may aggregate into tiny particles, scattering light and changing the color until a little while after exposure to the UV light ends or until heat is applied, which may cause the electrons go away from the silver atoms, so that the particles break apart into silver ions again, changing the color back. In other examples, a similar means of creating photochromic effects in inventive images is used that substitutes a different material for the halogens, e.g., silver ions in the form of silver nitrate is used instead of halogens thus for instance, upon exposure to UV light, the color might change, for example to yellow. Refer to "A silver-containing halogen-free inorganic photochromic glass" Chemical Communications, 2001 p. 2090-2091. In an example, photochromic effects conventionally used for windows and those used in the optical industry (such as on eyeglasses and lenses) are used to make inventive images, such as photochromic layers used on or in windows, smart windows and for optical shutters. In another example, diarylethene crystals are used to give inventive images photochromic effects. These photochromic diarylethene crystals might be thermally irreversible and fatigue resistant, e.g., from Masahiro Irie of Kyushu University, Fukuoka, Japan.

In embodiments, inventive images are made with smart materials or smart fluids that are particle filled, oil based suspensions that change in viscosity reversibly, i.e. from liquid to solid and vice versa, in response to a magnetic or electric field. These are preferably Stimuli Sensitive Materials. Examples are electro-rheological and magneto-rheostatic (MR) fluids, the compositions of which vary widely. For example, a MR fluid may consist of iron particles (micron scale) suspended in oil. As an illustration, a smart fluid embedded in an inventive image or part thereof may enable its flexibility, its firmness and/or its hardness to be controlled or adjusted, e.g., using electricity. Or a smart fluid in an inventive image or part thereof, or a smart fluid that is part of an inventive image may enable its texture, its shape, form and/or its dimensions to change.

In an embodiment, a polymer that is re-mendable, self-healing, or regenerative is a smart material used to make inventive images or part thereof. This kind of polymer is preferably a Stimuli Sensitive Material. Such a polymer might be a nanomaterial or one or more nanomaterials might be used in it or with it. In an example, a thermally re-mendable polymer might be used in this embodiment, thus heat used to mend it is a stabilizer, as is anything that produces the heat, the cooling or the temperature change. When heated and then cooled (such as cooled back to room temperature), polymers of this embodiment might mend themselves, without requiring additional ingredients (such as without requiring added catalyst or monomer, and without requiring surface treatment of the fracture or crack being mended). Moreover, polymers of this embodiment might mend themselves by such a heating process multiple times or repeatedly. Examples of such polymers are Pentacrythritol, tetrakis(2-carboxylethyl) ether, tetrafurfurul ester, copolymer with tris(2-maleimidoethyl)amine, and similar polymers. Also, supramolecular polymers are examples that are formed by reversibly connected non-covalent bonds (i.e. hydrogen bond), which will disassociate at elevated temperatures. Heating these supramolecullary based materials so that their non-covalent bonds to break, and new bonds will form when cooling which may heal any damage. In another example, a re-mendable polymer is made using nanomaterials such as carbon nanotubes (CNTs). As a further example, a polymer material used in an inventive image is made containing tiny capsules containing a liquid healing material. The progression of a crack ruptures these capsules releasing their liquid healing material into the crack, filling it. There might be a catalyst in the polymer material that polymerizes the healing material filling the old crack. Such a healing material in a polymer might lessen problems associated with fatigue.

Conductive Polymers and Related Subjects

In various embodiments, conductive polymers and monomer precursors may be used in inventive images. They may, for example, enable, enhance or create desired aesthetic and/or utilitarian effects in inventive images. In making inventive images, both the process of doping or treating polymer so that it becomes conductive or more conductive, and the dopant or agent used in such processes, are stabilizers. For example, a polymer might be doped so that electrons are removed such as through oxidation (e.g., with chlorine, bromine or iodine vapor, or halogen doping) or so that electrons are introduced such as through reductive doping (e.g., an alkali metal). It is often preferable to use conductive polymer in inventive images in layers or thin applications with one or more non-conductive layers which may or may not be comprised or entirely comprised of polymer. Often layers and applications of conductive polymers in an inventive image are thin or extremely thin, e.g., enabling them to be very light weight. Thin, for example, can refer to less than about 1 mm, preferably less than about 0.2 mm, the thinness can be only about 0.01 to 0.1 mm. or it may be measured in nanometers. An inventive image may be partially or entirely made of conductive polymer, but often inventive images made with conductive polymer are partially non-conductive, e.g., non-conductive layers and/or portions. Conductive polymer and/or cPRM capable of forming conductive polymer may be used in inventive images. Conductive polymers are, for example, desirable in making inventive images for their ability to conduct electricity, and for their ability to emit visible light, e.g., using conventional practices to set up and install the image for such purposes. Electroactive conductive polymer can be desirable in inventive images. In selecting and in forming a conductive polymer for use in an inventive image, the level of electrical conductivity can be precisely controlled over a wide range. If desired, a particular conductive polymer can also be blended with one or more other polymers to produce the desired medium for use in an inventive image. Conjugated polymer systems can show electroluminescence. As illustrations, an inventive image made with conductive polymer capable of emitting light is installed so that it gives off light. An inventive image may be made with a polymer light emitting diode (LED) using conductive polymer, or a PLED might be an inventive image.

Light emitting polymer (also called LEP) devices, are a kind of light emitting diode (LED), also called polymer light emitting diode (PLED, pLED or polyLED), organic light emitting diode (OLED, oLED, poly OLED, Poly OLED), and organic electroluminescent (EL).

On an image support or other inventive image surface, conductive polymer might be used for marking, as a colorant, and/or as a coating, which may be electroactive, e.g., which may illuminate if desired. Conductive polymer might for example, be used in and/or on inventive images, for example in the forms of PRM or cPRM inks, in polymer form, in solution, paints, colorants, coatings, dots and/or pixels which may be electrically active, e.g., which may illuminate in one or more colors or create other effects in images. These might, for example, be painted or drawn on, and/or they might be applied by an ink jet printing or silk screen process. A simple coating process can be used to apply conductive polymer (such as a light emitting polymer) to a surface. Conductive polymer might for example, be applied onto an image support (e.g., stabilizer) in a manner which provides the image with a desired aesthetic which may be as simple or as complex as desired, for example, adding a pattern, a design, drawn or painted shapes, alpha-numeric shapes (which may or may not be legible), and/or pixels to the image, e.g., using one or more painting and/or printing processes. In various embodiments, conductive polymer layers can be applied by painting and printing application processes, spin coating processes, as well as other processes on an image support or other inventive image surface. Conductive polymer, such as that applied on an image surface by painting and/or printing, might, for example, be connected to at least one electrical power source which may or may not be part of the canvas support medium or image.

Conductive polymer might also be used in inventive images for batteries and/or solar cells. Conductive polymer might be used give an inventive image the element of sound or to contribute to its element of sound, e.g., recording sound, responding to sound (such as voice command, footsteps, or music), and/or emitting sound of any kind. Conductive polymer might also be used in inventive images for transistors, capacitors, coatings, photovoltaics, photodiodes, photoconductors, photorefractive devices and sensors, conductive adhesives, conductive coatings, circuits, as inks, paints and/or other colorants, computer memory and hard disks, sensors, for similar uses and for other uses. For example, a polymer solid state laser could be used in an inventive image, feeding energy to it with a conductive polymer "wire" or conduit. In a further example, electricity could be generated in an inventive image from a conductive polymer photovoltaic device or solar cell that is hidden or that receives an invisible light, or both. Although conductive polymer can be used to reduce static on photographic film and computer screens which are part of inventive images, it may be preferable that conductive polymer used for such purpose in an inventive image is not considered part of that image's polymer of the present invention and thus it may be preferable that conductive polymer used for such purpose is not included in any calculation of that image's total amount of inventive polymer.

Inventive images made with conductive polymer can be in any shape, form or size desired. Conductive polymer in inventive images (e.g., as a OLED) can be formed as desired. It can for example, be in any or all 2D or 3D, non-planar or planar forms, as desired, such as in the form of sheets, as films, as fiber of various types such as fabrics (e.g., for use as a canvas); as rods, strips or bar shapes; in volumetric forms (which might be hollow and/or solid), in other forms, and/or in a combination of forms. Conductive polymer in inventive images and inventive images made with conductive polymer, (e.g., images that emit light from conductive polymer) may be transparent, translucent and/or opaque, as desired. Moreover, they might be flexible and/or rigid (e.g., a self-supporting image that is partially or completely rigid, or an image that can be rolled up, draped, folded, or flexed). For example, a PLED inventive image or part thereof might be on an image support made of polymer, film, metal, foil, glass, fabric, paper and/or any other non-polymeric material. A PLED inventive image, or portion thereof, is preferably transparent, translucent, or partially opaque. An image support (e.g., stabilizer) for such a PLED might be transparent, translucent, and/or opaque, it might also have other marking or coloration, other light effects, negative spaces, incising, and/or other aesthetic effects. The PLED might for example contribute to the aesthetic of the image, e.g., providing a design, a drawing, a picture, color, light effects such as reflectivity, other light effects described herein, etc. For instance, PLED devices might be on commercially available ITO (indium tin oxide) coated nonconductive or poorly conductive polymer, and if desired, subsequently encapsulated with a transparent or translucent, rigid and/or flexible barrier on one, two or more sides, e.g., to protect against the ingress of moisture, water and oxygen.

Conductive polymer (e.g., a PLED) might be: (a) an underlayer in or on an inventive image, (b) within an inventive image, (c) on one or more of its external undersides and/or front external sides; (d) attached to, connected to, inlaid in and/or embedded in an inventive image, (e) the entire image support medium or image, and/or (e) a part of an inventive image which is physically separate from the rest of the image. Conductive polymer enables one or more sides, surfaces and/or internal areas of an image, or all of an image, to be electrically active and/or light emitting in one or multiple emission colors, as desired. Inventive images made with conductive polymer (such as inventive images with PLEDs, or other electrically active polymer), might for example, be paintings, drawings, sculptures, constructions, shaped paintings, collages, prints, drawings in space, cutouts, Light Art, Computer Art, Light and Perceptual Art, Video Art, art with film, an Installation, an image that serves as a wall or as an image on a wall, a table, a bench, a window, a tray, a bowl, a floor, graphic design, clothing or fashion design, book design, another kind of design or architecture, a combination of these, etc.

Conductive polymers are one of many ways of creating light emitting image supports (e.g., stabilizers), and inventive images according to the invention, which can, if desired, be further processed (e.g., using additive and/or subtractive processes). Light emitted from an inventive image and light hitting an inventive image can be modified in a many ways, e.g., using coloration, marking, attachments, filters, lenses, subtractive processes, etc.

In various embodiments, conductive polymer can be used to make inventive images using spin casting, and/or printing processes (e.g., ink jet printing processes, lithography, photolithography, soft lithography, high resolution optical lithography, silk screen, block printing, etchings, monotypes, etc). Such processes are stabilizers. In other embodiments, conductive polymer is used in inventive images in melt and/or in solution processing techniques, by blade coating, and/or by evaporation of low molecular weight dyes. For example, polymer (100 nm) might be added onto an image support by spin coating of a solution. As other examples, conductive polymer might be used in inventive images with processes such as: blow molding, calendering, fiber spinning, compression molding, extrusion, coating processes, spraying processes, solution spinning processes (e.g., fibers), casting processes, coating processes, painting, drawing, writing, rolling processes, and/or gel processes.

In embodiments, conductive polymer is used in inventive images in blends.

It is important to note that the use of conductive polymers in making inventive images is not restricted in any way by the limitations which typically exist in the conventional use of conductive polymers for other purposes. Therefore, inventive images can be made using conventional or non-conventional practices for using conductive polymer such as those described herein. As an example, conductive polymers are conventionally used in extremely thin layers, even layers, homogeneous layers, typically on image supports that are rectilinear, geometric, smooth, and/or even. Conductive polymers can be used in these ways in inventive images, as desired. Since conductive polymers have no limitations when used in making inventive images, they can be used in a variety of other ways, including unevenly, irregularly, discontinuously, in any thickness desired, in layers that are heterogeneous, in any number of layers with or without other ingredients, or in a combination of these ways, on image supports and/or on other image surfaces of any description, that comprise one or more internal and/or external parts of an inventive image or that comprise all of it, with or without other aesthetic effects or further processing, such as any described herein or known to those of ordinary skill in the art.

In various embodiments, one or more electrodes, parts, layers, batteries, solar cells, and/or other devices (stabilizers) can be added to an inventive image for its use and/or supply of energy to a conductive polymer, e.g., enabling its conductive polymer to emit visible light. As an example, an inventive image is made with one or more layers of conductive polymer (e.g., thin layers) between two electrodes which are stabilizers (e.g., additional layers, preferably thin). It is preferable for each of these layers to be transparent or translucent, however it is often preferable for one of the electrodes to be opaque, e.g., a reflective cathode. For example, one electrode may be indium tin oxide (ITO) and the other might be calcium (Ca), which might be evaporated on in a thin layer. Between these electrodes there might be one or more conductive polymers, (e.g., in layers). Such inventive image compositions may or may not be formed and/or superimposed on an image support (e.g., stabilizer) made of polymer and/or non-polymeric ingredients, e.g., a polymer (such as polyester or heat stabilized polyester), glass or paper image support. This inventive image composition might for instance, be a layer of conductive polymer in between an anode and a cathode (e.g., metal or metallic), for example, in a composition made of at least three but often more superimposed layers, e.g., perhaps even on a fourth substrate layer. It is preferable to encapsulate PLEDs or parts thereof against the ingress of water and oxygen, e.g., using glass and/or polymer, such as epoxy.

Conductive polymer, such as in the form of PLEDs, can be made to emit light in any color or in multiple colors, the brightness of which can be very low, very high or anywhere in between (e.g., as bright as a television screen or brighter), with only a small power source (such as a battery or current from an outlet), and if desired, at a low operating voltage (e.g., about 2 to 6 volts). Such a PLED may be an unfinished or a finished inventive image. It may, for example, be superimposed by additional layers of cPRM, polymer or colorants, it may have other light effects, etc., or a means of installation or display might be added, as desired.

Among the valuable properties in the use of conductive polymer to produce light in inventive images (such as in the form of PLEDs), are the relatively low power required compared to conventional electrical components such as neon, and the lack of significant heat produced by the emission of light, even over long periods of time. Less power is required than other light sources which might be and have been used in images, which can lead to longer life of the light source. The power source can be any suitable source, but is preferably DC power. In addition or instead, this may facilitate hiding a power source (such as a battery or solar cell) and/or associated materials (such as wires or conduits) from view, and/or facilitate working the visibility of the power source and/or associated materials into the design or aesthetic composition, if desired. The reduced heat output of the light source is typically highly desirable for the stability and permanence of many inventive images, such as images which have conventional image making mediums and materials (e.g., oil paints, colorants containing wax, egg tempera, cellulose paper, photographic mediums, etc.), which can change undesirably with exposure to heat such as that produced by conventional light sources such as bulbs.

In a further illustration, an inventive image has a polymer light emitting device made of one or more spin-cast, extruded and/or printed layers of polymer, on an image surface made of polymer or glass pre-treated with a transparent electrode material patterned (before the polymer is superimposed) to help define the device configuration. The other electrode can be deposited by vacuum metallization and patterned, and the device is sealed in a hermetic package. One or both of these electrodes might, for example, be in linear patterns.

The chemical structure of a polymer and its conductivity can be controlled, engineered, or designed to be appropriate for different aesthetic, utilitarian and other purposes in inventive images, e.g., by altering the polymer's molecular chains. For instance, the chemical structure of a light emitting polymer can be engineered to produce any or all emission colors. This light might be emitted from one or multiple parts, sides and/or surfaces of a single inventive image which are shaped in any way desired. As another example, using a solvent to alter the molecular chains of a polymer can change its conductivity.

In inventive images, light emitted by any portion of the conductive polymer or by all of it, can be any color desired, i.e., one or more colors and/or as white or colorless light. Inventive images made with conductive polymers can have full color light emission, if desired, which can be extremely useful in making images, e.g., full color passive and active matrix display, such as created using direct patterning techniques. Moreover, the light emitted can change over time in any way desired. For example, over time, some or all of the light emitted by any portion of the conductive polymer (e.g., even a portion as small as a pixel), or by all of it can change (e.g., in brightness, in color, in direction, it can go on and off, or a combination of these, as desired). Conductive polymer offers fast response, or switching time, on and off. All of these elements can, if desired, be used to contribute to the inventive image's aesthetic, and/or if desired for other purposes, e.g., to give the image an interactive or utilitarian element. Such an inventive image might for example, have a computer as part of it or it might function like a computer screen. Thus, it might have a screen, a computer chip, a viewer input device to control the image (such as a drawing device, trackball, a button, a mouse, voice command, or switch), an optional audio component (e.g., producing sound and/or responding to sound such as to the viewer), or a combination thereof. The inventive image might also present a moving image (e.g., realistic and/or abstract), such as a film or video image or image part, which might be controlled and/or altered by a viewer controlled input device. PLEDs offer high brightness and resolution at a wide viewing angle. Organic LEDs are compatible with standard silicon driving circuitry, which may be used as desired in inventive images.

Conductive polymer can be applied onto an image support very thinly (or in any other thickness desired), in layers, in pixels or spots, in designs, drawings, patterns and/or compositions which can be as controlled and as precise as desired, even if they are complex, intricate, and/or light emitting (e.g., light intensity is proportional to current). For instance, conductive polymer can be applied onto an image support or other image surface in pixels, e.g., using an ink jet printing process. For example, each pixel may be comprised of multiple sub-pixels (e.g., in layers), each of which might for example, be capable of emitting one color, e.g., three sub-pixels, one can emit red, one can emit green, and one can emit blue light. Using conductive polymers, any pixel shape or size is possible and very high resolution can be achieved. Moreover, light emitted by a conductive polymer can have any level of brightness or contrast, even very high brightness and contrast, and switch at any desired speed. Note that although typically pixels are extremely small, in inventive images they may be any size, e.g., from extremely small to large. Pixels may or may not be visibly apparent in actual inventive images.

Like other polymers of the present invention, conductive polymers can be applied to an image support or other inventive image surface using one or more painting and/or printing processes. Ink jet processes are among those preferred for making inventive images of conductive polymers, both charge conducting and emissive polymer layers, and for other polymers. Examples are ink jet practices specially developed for handling conductive polymers, e.g., by Seiko Epson and Cambridge Display Technologies, or by Philips Research of Eindhoven, The Netherlands. Such processes can be used according to the invention to apply conductive polymer in one or multiple layers, on part or all of any size image support, or one or more other inventive image surfaces. Ink jet printing conductive polymer can be done with the level of precision and resolution desired, it can even be done with great precision and a high resolution.

Specific examples of the use conductive polymers in inventive images will become more sophisticated as the technology is further developed for utilitarian applications in products which are not images, e.g., such as for phone displays, internet appliance displays, utilitarian computer monitors having higher resolution and more sophisticated pixels, instrument panels, clocks, television screens, privacy glass, "smart" windows, batteries, solar panels, cameras, sensors, transparent coatings, fibers such as fabrics, transistors, capacitors, photovoltaics, conductive adhesives, computer memory and hard disks, circuits, photodiodes, lasers, and the like. Any of these items made with conductive polymer might also be used in an inventive image.

In the use of ink jet processes with PRM, cPRM, and/or polymers, a number of variables can be used and/or controlled as desired, e.g., for aesthetic effects as well as practical ones. Different ink jet processes, different PRM, cPRM, polymer, and/or image surfaces might be desired for different purposes. For example, among these variables are the ingredients used in a polymer ink (e.g., the viscosity of the PRM, cPRM or polymer, how it dries, if it bleeds or beads up, etc.), the effect of any ingredients in the ink on the ink jet printer itself (e.g., a solvent dissolving the print head), the ability of the print head to deposit the ink in the manner desired (e.g., for both aesthetic and practical purposes, such as to inhibit ink clogging of the print head nozzle, and in a way so that the print head deposits the ink as desired), the interaction between the ink deposited and the image surface it is deposited upon, and the like. Ink jet processes for conventional PLED displays, which typically strive for qualities like precision, control, high resolution, and perfect registration, can be used as desired in making inventive image. The use of ink jet processes for making inventive images, however, does not have the same kinds of limitations, and one of ordinary skill in the art can envision a wide array of applications in accord with the invention herein.

Conductive polymers or PLEDs may be formed into inventive images and/or onto inventive images or image supports that are even, regular, flat, planar, rectilinear, geometric, and/or exact, but they are not restricted to such kinds of forms. Conductive polymers and PLEDs are formable using a variety of processes in any way, shape or form desired, on inventive images or image supports and/or into inventive images of all descriptions, such as those that are irregularly shaped, uneven, non-planar, not flat, or discontinuous, or in shapes or forms which are not rectilinear and/or non-geometric. Conductive polymer and/or a PLED might be used (e.g., disposed) on an image support that is carved, incised, embossed, textured, undulating, angled, rigid, flexible, foldable, discontinuous, on an image support that already has an aesthetic element, design or picture, or a combination of these, as desired.

It is generally preferred that conductive polymer used in inventive images be stable and permanent, or as stable and as permanent as possible. Thus, it is often preferable that conductive polymer parts, layers, LEDs, other such devices, power sources for any of these, and associated materials are capable of being reworked, replaced, repaired and/or restored if they change over time in an undesirable manner (e.g., if their function decreases or if they stop functioning), and/or if the technology advances in a way which is more desirable for the specific inventive image.

Inventive images made with conductive polymers (e.g., made with any of these devices, made electrically active, and/or made with any of these qualities) can of course be further processed, e.g., painted, incised, developed with additional parts, and/or layers, etc. Such devices and effects might also be added to inventive images which already are developed to any extent, e.g., a PLED added to an image support stabilizer that already has light effects such as those described herein, painting, carving, multiple layers, and/or non-polymeric parts. Light emitted from an inventive image can be modified in many ways, e.g., using coloration, attachments, filters, lenses, gratings, prisms, light effects, subtractive processes, etc.

In addition to, or combination with, these polymers and/or blends, dopants, dyes, and/or complementary materials may be desirable.

Preferred conductive polymers, dopants, dyes, complimentary materials, additives charge transport materials, photo-sensitizers, nanomaterials and desirable other ingredients may be used. Preferred examples are too numerous to mention here. They are recited in U.S. Pat. Nos. 7,629,400 and 8,921,473. Countless other examples are in the public domain, (e.g., on the Internet) and any of these may be more preferable for the aesthetic element(s) they provide or enhance in the inventive image.

In various embodiments, conductive polymer is used to create or enable one or more aesthetic elements in inventive images, e.g., it may emit visible light, it may affect light transmission or the direction thereof, image color, movement, mobility, sound, form, structure, one or more other formal elements, or a combination of these. Such conductive polymer may, for example, be a transparent coating or layer on or in an inventive image.

In embodiments, conductive polymer is used to produce heat in inventive images. The heat produced might for example, trigger another formal element in the same image, for example a thermochromic effect such as by the use of a thermochromic colorant or paint. The heat might also effect the area and/or the people near these inventive images as desired.

In some embodiments, image support mediums and inventive images can be interactive, or interactive and responsive. Conductive polymer may be used to create this interactivity, and/or it may be created by another means. Such inventive images might have computers, camera, control devices, microphones, recording devices, movable parts, changing light effects, changing colors, changing forms, projections, video, film, devices that play sound, printers, sensors, an interactive part or feature that might also be responsive, sound, music or speech, a connection to the Internet, a wireless connection, or a broadcast method, touch controls, a means of detecting and responding to movement, gesture, the environment or an aspect of it, light, and the like, as desired.

In various embodiments, one or more formal elements of an inventive image or part(s) thereof is varied or changed, using energy such as electricity, heat, light, and/or magnetism. After the image is finished, this variance or change of one or more of an image's formal elements may or may not continue and/or be visible, e.g., the finished image may have changing or variable formal elements. Such effects may be electrochromic. Such effects might be created using conductive polymer, nanomaterials, a display device that is light emitting or non-light emissive and/or one or more other mediums, materials and/or devices in inventive images. For example, exposure to electricity or voltage might cause or enable aesthetic and/or functional elements of an inventive image or part thereof to change or vary, such as its transparency, its translucency, its opacity and/or any light it may emit; other aspects of the manner in which it relates to light (e.g., the direction of its light, its reflectivity or other light effects); the hue, the value, and/or the intensity of its color; its use of film, video and/or sound; any other interactive and/or responsive devices or features it may have, other formal elements and/or combinations of these. In another example, an image or a part thereof varies according to changes in the temperature around it, e.g., due to the use of crystal violet lactone, for example in a PRM and/or in a colorant that is in and/or on an image.

Inventive images of these embodiments might be exposed to energy in any way desired, e.g., continuously or for controlled and/or uncontrolled time periods. The variance or change in the image might be controlled directly and/or indirectly or in any other manner. For example, it may be controlled by a switch, button or other device, using a means of sensing or detection, using a stimulant, trigger or influence, with or without human initiation, using a timer, a computer, a camera, or a sensor (e.g., responding to: a viewer's presence, sound, light, change in the environment, or a combination thereof), using the Internet, a wireless connection or means of broadcast; using other means or a combination of these. Such variance or change might be controlled by a viewer speaking, or pressing or touching part of the image, such as a button or a sensor. As an illustration, such variance or change might even be controlled from a distance, and/or regularly, e.g., an image's formal elements changed via wireless communication, or broadcast or via the Internet, and/or changed daily, weekly or monthly. Such effects can be desirable to use or control visible spatial depth and other formal elements in images of the invention. Such effects can also constitute or enhance interactivity in an inventive image. In other examples, an inventive image's form is changed using electricity, which may enable an inventive image or part thereof to be kinetic or mobile. Electricity might run one or more devices in an inventive image, such as a camera, a printer, a screen, a display, a projector, a monitor, a computer, a fan, a light source, a recorder; a radio, a machine or player that emits sound (e.g., music or speech), or the like.

In embodiments, a colorant, paint or ink is used in and/or on inventive images that can be varied and/or changed, as desired, using energy such as electricity. The change or variance in these images can be done in any manner and at any rate desired, e.g., changing part or all of an image very slowly, very fast or at any rate in between. Thus, for example, moving images, full motion images, video and film images can be made in various embodiments. (Refer to the prior descriptions of the fast response or switching time conductive polymers offer for use in inventive images, as well as their full range of emission colors, etc.)

In some embodiments, the colorant, paint or ink used in and/or on inventive images that can be varied and/or changed, as desired, using energy (such as electricity) is made using tiny microcapsules of transparent or translucent fluid (e.g., microcapsules of a polymer, each of which may be about the diameter of a human hair). In the inventive image, each microcapsule might be capable of functioning like a pixel. These microcapsules are placed between electrodes, at least one of which is at least partially transparent or translucent. Within each of these microcapsules there are suspended particles (e.g., pigment) of one or more colors, e.g., white and black; or white and red, blue, green and/or yellow. Each suspended particle either has a negative charge or a positive charge. A microcapsule might contain particles with a positive charge and/or particles with a negative charge, e.g., it is often preferable for a microcapsule to contain both. Suspended particles can move within their microcapsules, e.g., moving to the side of the microcapsule that is against one of the electrodes. So, when one electrode is negatively charged, it draws the positively charged particles to the part of the microcapsule that is against that electrode. If that negatively charged electrode is transparent or translucent, the color of the positively charged particles drawn to it, is visible at that spot on the inventive image. Likewise, when one electrode is positively charged, it draws negatively charged particles to the part of the microcapsule that is against that electrode. If that positively charged electrode is transparent or translucent, the color of the negatively charged particles drawn to it is visible at that spot on the inventive image. Thus, if a microcapsule that contains both positively and negatively charged particles is in between a negatively charged electrode and a positively charged electrode, the particles will position themselves in opposite areas of the microcapsule, against the oppositely charged electrodes. Thus, to the extent that one or both electrodes are transparent or translucent and to the extent that any other part of the inventive image which is against each electrode is transparent or translucent, the microcapsule with show a color on one or both sides of the image.

In various embodiments, electrochromic mirrors, coatings, and/or effects are used on or in inventive images. For example, such a mirror, coating or effect changes its surface and/or its use of light (for example darkening it) in response to an electrical charge, e.g., when a sensor detects the presence of bright light, the image darkens. Examples are electrochromic mirrors made by Gentex Corporation of Zeeland, MI Conductive polymers might be used in such inventive images. In some embodiments, inventive images or parts thereof function as electrochromic windows, "intelligent" windows, "smart" windows, and/or it enables them have these kinds of effects, whether or not these images function as transparent windows or not. Such images can vary, control, block, and/or reduce the amount of light, the color of the light and/or other properties of the light that can pass through them. Such effects may be created in inventive images using conductive polymers. Also, in certain embodiments, "switchable" mirrors, the effects of switchable mirrors and/or similar effects are used to make inventive images or parts thereof. For example, switchable mirrors, or the effects of them, can be used in inventive images, such as the switchable mirrors made by Philips Research in Eindhoven, The Netherlands. Inventive images of these embodiments might be made with conductive polymers and/or nanomaterials. Examples of switchable mirrors can change from a reflective to a transparent state and back when voltage is applied and turned off. It is possible to modify this effect and create variations of it as desired in inventive images, e.g., for aesthetic purposes. In switchable mirror inventive images or parts thereof, made using the same technology as Philips or made with technology that is similar or related, a rare-earth metal is induced by exposure to hydrogen, to convert to its ionic hydride. The hydrogen can be transported into a transparent hydrogen storage electrode when energy (e.g., voltage) is applied and back when it is switched off. If desired, such features can be part of a system or a "smart" system of inventive images e.g., a system in which one or more aesthetic elements and/or functions of an image are controlled, varied, and/or changed over time. For example, such features can be part of a smart system that varies or effects the properties of light that pass through the image or part thereof, e.g., varying or effecting the amount of light, the path of light beams, the color of light, and/or its other properties in the inventive image.

In certain embodiments, suspended particle devices are used in inventive images, e.g., in between layers. In these devices, the random positioning of particles suspended in a material, liquid or film inventive image layer and/or part inhibits or prevents light from passing through until an electrical charge causes these suspended particles to align or position differently, thereby modifying the amount of light passing through the inventive image layer and/or part, which has increased or decreased transparency or translucency than before the electrical charge. The use of such suspended particles might create a filter in an inventive image that changes over time, (e.g., quickly), as desired, e.g., controlled by a switch, a timer device, a viewer-controlled device, or the like. Mirrors or mirrored surfaces in inventive images might also have layers or parts with these kinds of suspended particles. The suspended particles in such layers and parts of inventive images might for example be liquid crystal, including liquid crystal dispersed (e.g., droplets) in a layer or matrix of polymer (which is preferably transparent or translucent, and typically thin, e.g., a conductive polymer), in an inventive image, sandwiched between two conductive layers and/or electrodes (which are preferably transparent or translucent and typically thin also, e.g., layers of ITO). Moreover, the entire layered form might then be superimposed on one or both sides by a polymer (like polyester) and/or by glass. Such technology is currently used in cars, windows and privacy glass.

As an alternate example, the polymer layer or film with the dispersed liquid crystals might be sandwiched between layers of polyvinyl butyral (PVB), then, if desired, glass might be superimposed on one or both sides. Alternately or additively, glass coated with PVB might be superimposed on one or both sides of the polymer layer or film with the dispersed liquid crystals. For instance, a conductive layer comprised of polymer with suspended particles such as dispersed liquid crystals, is sandwiched in between electrodes (e.g., ITO). Then, this is preferably sealed or encapsulated to inhibit or prevent the ingress of water, oxygen, or both. For example, it might be superimposed by polyester on one or both sides. In addition, or instead, PVB and/or glass are superimposed, e.g., as separate layers.

In embodiments, inventive images or parts thereof function as smart windows or they have electrochromic systems or other technology that is used on smart windows or similar to this for a smart window effect. Such a smart window effect may be made using conductive polymer and/or nanomaterials. Examples are suspended particle devices, liquid crystal devices, polymer dispersed liquid crystal devices, devices that use reflective hydrides or transition-metal hydride electrochromics, devices with a changeable or switchable mirror effect (e.g., changing from see through to reflective abruptly or gradually), it may be made using another technology described herein in Patent Application No. 20030035917-A1 or in U.S. Pat. No. 8,921,473, such as an e-material or OLED technology, or it may be made using a combination of these. For example, a smart window effect or part thereof might be a layer or an aesthetic element on an inventive image or part thereof, such as on a polymeric image support that may be a stabilizer. Examples of this smart window effect produce or enhance change in color and/or light properties with a trigger, stimulus or influence (such as electricity, light, movement, or programming), and this change may be reversible, e.g., darkening and becoming less transparent, changing in reflectivity, in color, becoming lighter and more transparent in response to the trigger, stimulus or influence, or changing from light emitting to non-light-emissive. This might be desirable in inventive images or parts thereof for aesthetic and/or utilitarian purposes, e.g., as a changeable design or compositional element, a pictorial element, and/or as an underlayer for superimpositions, such as for an inventive image painting, construction, wall, ceiling or window. Examples may have polyvinyl butyral, employing an oxidation reaction; using reflective hydride coatings that may use hydrogen gas; made with conductive polymer, lithium, lithium metal oxide, tungsten oxide or absorptive tungsten oxide, ceramic, and/or inorganic materials. Examples may be layers or films e.g., thin or very thin. Examples may have superimposed layers, e.g., the electrochromic layer or coating either on at least one other layer or image support (e.g., of glass and/or polymer, with electrodes), or between at least two layers or image supports. Examples by Research Frontiers, Woodbury NY, www.refr-spd.com; Sage Electrochromics, Faribault, MN and NJ, www.sage-ec.com, e.g., SageGlass; Pulp Studio, LA, CA www.pulpstudio.com; Pilkington, London, UK and Ohio, www.pilkington.com; Aveso; PPG Aerospace of Huntsville, AL; T. Richardson, J. Slack, and others at Berkeley Lab's Environmental Energy Technologies Division, CA; Gentex Zeeland MI www.gentex.com; technology by these resources or similar technology.

In embodiments, inventive images might be made using a conductive polymer or an electrically conductive polymer with a conductive center (e.g., made of PEDOT) and two non-conducting end pieces. Such a polymer might be able to dissolve or disperse in solvents, in organic solvents and/or in non-corrosive chemicals. It might be able to attach new compounds and/or specialized molecules to its end pieces, thereby enabling new molecules to be synthesized and/or additional functionality to be added. Such a polymer might be able to be photo-crosslinked or cured with Ultraviolet (UV) light, or may be crosslinked or cured by adding heat. It might be applied by printing, and/or other methods described herein and in US Patent Application No. 20030035917-A1 and U.S. Pat. No. 8,921,473.

In embodiments inventive images or parts thereof are made with polymer electronics, organic electronics, or organic inorganic hybrid electronics. Polymer electronics may or may not contain silicon. Such electronics might be partially or entirely made with one or more polymers, such as non-conductive or insulating polymer(s), semi conductive polymer(s) and/or conductive polymer(s). They might contain or be nanomaterials. They may be partially or entirely transparent or translucent, and partially or entirely flexible. Examples of polymer electronics or part thereof might be produced by direct writing, printing process(es), ink jet printing, lithography, gravure, solution processing, spraying, spin coating, and/or by roll to roll process(es) on inventive images or image supports (e.g., stabilizers), and might be flexible, rigid, polymeric, non-polymeric, paper, a combination of these, etc. Polymer electronics may for instance, be active or passive devices, semiconductors, circuits, integrated circuits, transistors, TFTs, TFT backplanes, TFT circuits or TFTC, power sources, batteries, solar cells, optoelectronic devices, computer components, memory, computer chips, backplanes, active matrix backplanes, passive matrix backplanes, circuit components, connections (e.g., resistors, capacitors, diodes, electrodes, inductors, sensors, transducers, polymer interconnects, and via-holes), etc., all made with conductive or semi conductive polymer, e.g., in forms that are thin or very thin, flexible, lightweight and/or rugged. As an example, polymer active matrix backplanes and/or polymer semiconductor transistor arrays might be used in inventive images, partially or entirely made or patterned by ink jet printing, e.g., made by PARC or made using technology by PARC. For instance, inventive images might have printed semiconductor circuits by Lucent Technologies Inc.'s Bell Labs in Murray Hill, NJ Another example is polymer memory such as that made with polyethylenedioxythiophene or PEDOT. Further examples of polymer electronics for use in inventive images are made by or are made using technology by Plastic Logic of Cambridge, UK. Refer to www.plasticlogic.com. Examples are polymer backplanes made by Plastic Logic, Ltd., Royal Phillips Electronics of Sunnyvale CA and Rolltronics of Corp of Menlo Park, CA Further examples are by E-Ink Corp., e.g., see U.S. Pat. Nos. 6,498,114; 6,422,687; and 6,413,790. Inventive images may have organic photovoltaics from Konarka (www.Konarka.com) of Lowell, MA, or they may have organic electronic ingredients or conductive polymer ink from Plextronics of Pittsburgh, PA www.plextronics.com; or organic electronics from DuPont, Plastic Logic, Cambridge Display Technology, Advance Nanotech, Center for Advanced Photonics and Electronics at the University of Cambridge, UK.

In embodiment, inventive images or parts thereof are made with transistors, semiconductors, microprocessors, integrated circuits, chips, polysilicon TFTs (poly-Si TFT), and/or poly-Si TFT backplanes. These devices may or may not be or have: image supports that might be stabilizers. They might have nanomaterials and/or conductive polymer, and they might be nanoscale, flexible, rigid, thin, very thin and partially or entirely transparent or translucent. They may be TFTs, organic transistors, polymer transistors, conductive polymer transistors, conventional transistors, flexible transistors, organic or polymer TFTs that may or may not be flexible, amorphous silicon, transistors with exotic metal oxides, or other transistors. Among examples are polymer transistors or conductive polymer transistors that are printed or ink jet printed on substrates or image supports. A transistor might have light properties, such as light emission, transparency or translucency. In inventive images, transparent and/or translucent transistors are preferably stabilizers, particularly in transparent and/or translucent polymer image supports and image support stabilizers. An inventive image with a transparent transistor may change from clear to displaying a static or changing drawing, photo or other depiction in color and/or light. Chips, integrated circuits and microprocessors for e-materials and OLEDs in inventive images are stabilizers. In examples, parts made of this embodiment might be used to make image support mediums and aesthetic works that are or are partially visible tangible forms or displays that are largely or entirely transparent or translucent and capable of aesthetic change.

In embodiments, conductive inks are used in inventive images or parts thereof such as polymer image supports that might be thin, very thin, films, thick, flexible, rigid, transparent, translucent and/or opaque, and that might be stabilizers. Examples of conductive inks are made using conductive (semi conductive) polymer, and/or one or more nanomaterials. Conductive ink may for example be printed or patterned onto an image support (e.g., stabilizer) forming a design (e.g., a linear design) on it that may carry electricity and that may or may not be visible in the finished inventive image. Examples are applied using ink jet printing, brushes, spin coating, screen or stencil printing processes, offset printing, other liquid deposition techniques, etc. In some inventive images or parts thereof, transparent conductive inks or use of conductive inks in amounts that enable them to be transparent or minimally visible are preferable. In examples, conductive ink made of this embodiment might be used to make image support mediums and aesthetic works that are or are partially visible tangible forms or displays that are largely or entirely transparent or translucent and capable of aesthetic change.

In embodiments one or more batteries, energy cells or thin film batteries are used in inventive images, referred to herein as batteries. These might for example be made of printed ink, conductive ink, insulating polymer, conductive polymer and/or semi conductive polymer. They might be made on or with an image support (e.g., stabilizer). Those batteries made with conductive and semi conductive polymer are stabilizers in inventive images. Batteries in these embodiments may be rechargeable, they may have a long life, and they may be considered dry and thus they may or may not have the metal casing common in other conventional batteries. Batteries in inventive images may be any shape or size (they do not have to be bulky) and they may be flexible or rigid, and they may be thin or very thin. They might be custom made or designed for inventive images. For example, they might be thin and flat, with any shape desired. They might be made right on an inventive image or part thereof, such as on or in an image support and/or in or on a textile or fabric. For example, a battery might be made in or as part of the fibers of a textile in an inventive image, e.g., it might be made in layers on or in fibers which might be thin or very thin, for instance, the conventional anode, cathode and electrolyte might be on or in fibers. Thus a battery might for example be woven into a textile for an inventive image. Batteries used in inventive images might also be stand-alone batteries, e.g., attached to inventive images or parts thereof. The size and shape of a battery might be incorporated into the design of an inventive image, e.g., so that they are visible and contribute to the aesthetic; so that they are hidden from view; or so that they are partially visible contributing to the aesthetic and partially hidden from view. For instance, an inventive image might have one or more of these batteries that is circular, that is in a recognizable shape (like that of a peanut or a half moon), or that forms a border around some or all of the inventive image's perimeter edge.

In an example, one or more batteries or products similar to these are used in an inventive image made by or made using technology by Power Paper (www.powerpaper.com) of Kibbutz Einat, Israel, or Thinergy in Hong Kong. In examples, one or more batteries, power cells or products similar to these are printed onto natural polymers (like paper), synthetic polymer or both in forming an inventive image. In another example, batteries for use in inventive images are lithium cells made with polymer (or tiny carbon rods), or they are made with lithium and polymer. In a further example, batteries in inventive images are made by or made using technology by Cymbet Corp. of Elk River, MN (refer to www.cymbet.com). Batteries used may be made by or made using technology by Enfucell, Espoo Finland www.enfucell.com, such as thin, planar batteries made with paper, zinc and manganese dioxide. Batteries may be made by or made using technology by: Geomatec www.geomatec.co.jp/English; Ntera of Dublin, Ireland www.ntera.com; Altair Nanotechnologies www.altairint.com (e.g., their electrode nanomaterial, their lithium-ion battery-electrode material or nanomaterial, and/or its lithium-titanium-oxide particles or NPs); Gemz Corp. gemzcorp.net; A123 of Watertown, MA, Firefly Energy of Peoria IL; Oak Ridge Micro Energy Inc. of Oak Ridge, Tennessee www.oakridgemicro.com; Batteries for use in inventive images may be made using nanotechnology. Batteries and the energy they provide might be stabilizers in inventive images.

In embodiments, inventive images are made with photovoltaics such as solar cells or panels, and/or light detectors. Preferred examples are organic, polymeric, and/or made with conductive or semi conductive polymer. In examples, inventive images might have thin film silicon solar cells; photovoltaics made with crystalline silicon (such as those by Solaicx of Los Gatos, CA, refer to www.solaicx.com); and/or solar cells based on amorphous silicon solar technology that may be partially or entirely transparent or translucent, e.g., PV-TV by MSK Corp., Tokyo, Japan, refer to www.msk.ne.jp. Photovoltaics made with nanotechnology and/or nanomaterials are preferable for inventive images, e.g., solar cells made with polymer and nanomaterials or with polymer nanomaterials. Some preferred examples of solar cells for inventive images can convert both outdoor and indoor light into electricity. Photovoltaics might for example, be made or partially made by printing, ink jet printing, screen printing and/or a roll to roll process. They might be made on image supports that might be polymeric, e.g., stabilizers. Photovoltaics might flexible, rigid, opaque, translucent and/or transparent. If they are visible in inventive images, they are preferably aesthetically integrated and desirable. In illustrations, inventive images may be made with photovoltaics, solar cells or solar technology from Cambridge Display Technology in England (refer to www.cdtltd.co.uk), from MicroFab Technologies in Plano, Texas (refer to www.microfab.com), and/or from Konarka Technologies in Lowell MA (refer to www.konarkatech.com). I n examples, photovoltaics or solar cells made of this embodiment might be used to make image support mediums and aesthetic works that are or are partially visible tangible forms or displays that are largely or entirely transparent or translucent and capable of aesthetic change.

In embodiments, inventive images have one or more magnets made with polymer and/or of conductive polymer. Such magnets may have metal or they may be non-metallic.

In certain embodiments, polymer in an inventive image serves as insulation for one or more other parts thereof, e.g., insulation for a conductive polymer in the same inventive image.

OLEDs

In embodiments an inventive image or part thereof is an organic light emitting diode or OLED. An inventive image or part thereof may have one or more OLEDs that are the same or different. OLEDs are also called organic electroluminescent, organic EL, or OEL. OLEDs offer features such as wide viewing angles, great contrast, colors that can be saturated and that can span the entire visible spectrum, low operating voltages, a response time that can be very fast or instantaneous; light, thin, flexible, bendable, rollable, durable and/or rigid forms; etc., static, changing, moving or video displays, etc. OLEDs can be made using any process (es), with any specifications, e.g., any thickness, weight, shape or form, even a curved, textured or irregular form, any ingredients, structures, organic light emitters, etc. OLEDs may provide backlighting, underlayers, coloration; other compositional, aesthetic, design or formal elements.

As an illustration, an OLED is made as an inventive image or as part thereof by placing a series of organic thin films between two conductors or electrodes. When electrical current is applied, the OLED emits light in one or more colors, designs and/or patterns that may stay constant or that may change over time. Inventive images can be made with OLEDs that might be flexible and/or rigid, and that may be light weight, thin, durable and power efficient.

In embodiments, OLEDs with properties such as color-switching ability might be used in inventive images. As an example, by changing the voltage in an OLED made using a semiconducting polymer combined with a phosphorescent complex, the light emitted might be switched between red and green.

The thickness and weight of OLEDs varies. Typically OLEDs made for uses other than for images, are extremely thin and light in weight. However, qualities that are valued in such products that are not images (like thinness, light weight and a planar rectilinear shape) may or may not be preferred in OLEDs in inventive images, e.g., for inventive images this decision may be more aesthetic than utilitarian. Also, as the technology develops, the specifications of OLEDs are likely to continue to vary and change, for example OLEDs are likely to become thinner and lighter in weight. This is acceptable in inventive images, new and improved OLEDs are desirable. OLEDs used in embodiments might be any thickness, weight, shape or form e.g., 2D, 3D, regular or irregular. In inventive images, these choices may be aesthetic choices, and any utilitarian concerns which affect them may differ from the utilitarian concerns for products that are not images. An inventive image's OLED or OLEDs might or might not be further processed.

These are further examples of stabilizers for inventive images. 1). Ingredients, processes, layers, and/or parts in and/or on an OLED or part thereof which reduce or eliminate changes to it after it is formed as an inventive image or as part thereof are stabilizers. 2). Another inventive image stabilizer is energy used by its OLED or OLEDs. Such energy stabilizers might, for example, be electrical current, solar energy, heat or another form of energy. 3). All inventive image ingredients and parts that provide, process or carry energy (in any form) to its OLED or OLEDs are stabilizers. 4). Polymer that supports, reinforces, strengthens or enhances the support of an OLED in an inventive image is a stabilizer, an image support stabilizer, or a strengthening stabilizer. 5). A dopant used in making an OLED used to create an inventive image is a stabilizer, as is the process of doping.

In embodiments, inventive images are made of or with small-molecule OLEDs (sometimes referred to as SMOLED). Small-molecule OLEDs might illuminate an inventive image in a single color or in as many colors as desired, and if desired, these colors may change over time as desired, e.g., creating a moving display, or a display that is like video or film. Among examples of sources for small-molecule OLEDs, OLED technology and/or complimentary ingredients for inventive images are Eastman Kodak of Rochester, NY (refer to www.Kodak.com); Opsys of Yarnton, Oxford and Fremont, CA; Universal Display Corporation (UDC) in Ewing, New Jersey (refer to www.universaldisplay.com); and Covion Organic Semiconductors GmbH of Frankfurt/Main, Germany (refer to www.covion.com). For example, OLEDs with fluorescent, electrophosphorescence and phosphorescent small-molecule emitters might be used in inventive images. In an inventive image, a small-molecule OLED may be on and/or under a polymer layer for support (a stabilizer).

In embodiments, an OLED in an inventive image emits light through a process of phosphorescence, e.g., using phosphorescent materials as dopants (stabilizers). In comparison, the light emission of other OLEDs might be based on the process of fluorescence. In an example, OLEDs are made using a phosphorescent small molecule material that is an iridium complex which emits light from its triplet states. In an example, one or more PHOLEDs (phosphorescent OLEDs) from UDC might comprise an inventive image or part thereof.

In embodiments, inventive images are made using OLEDs with triplet based emitting centers in polymer and/or other organic light emitting diodes (in PLED and in OLEDs). Among examples are phosphorescent PLEDs.

In embodiments, the OLED or OLEDs in an inventive image are a combination of small molecule and polymer OLEDs. In embodiments, inventive images are made of or with hybrid small molecule-polymer OLEDs. These might use hybrid technologies that for example, enable wet processing of small molecules, (solution processing, room temperature processing, roll to roll processing, etc.), triplet emitting compounds and/or phosphorescent polymers. OLEDs may have both small molecule and polymer organic ingredients. These might also use iridium or other heavy metal complexes, where the emission can be tuned by controlling the nature and position of the organic ligand substituents such as 2-phenylbenzothiazole.

OLEDs might illuminate an inventive image in a single color or in as many colors as desired, and if desired, these colors may be constant or they may change over time at any rate, e.g., creating a moving display, or a display that is like video or film.

In another example, one or more of the organic small molecule OLED ingredients might be incorporated into one or more of the polymers and/or monomers used to make polymer OLEDs. Thus, for example, the resulting organic mixture or material may be further processed using methods for making polymer OLEDs, such as those described in US Patent Application No. 20030035917-A1, like solution processing, spin coating, printing, ink jet printing and/or brushed applications. More specifically for instance, aluminum tris(8-hydroxyquinoline) or Alq3 might be incorporated into polymer, cPRM, or into monomer to make an OLED.

Printable, small molecule OLEDs are made in embodiments. Thus, for instance, the OLEDs in these embodiments might combine desirable performance features of phosphorescent small molecule materials and desirable solution-based application methods offered to OLEDs by polymers, e.g., they have printed or ink jet-printed polymer.

In embodiments, OLEDs are made or partially made using solution processing. Among examples are printing processes, ink jet printing, screen printing, gravure printing, contact printing, laser-induced thermal imaging (LITI), conventional printing processes, etc. For example, an OLED might be formed by screen printing two layers of polymer between an anode and a cathode. In other examples, small molecule materials are solution processed to make OLEDs. They may for instance, be used or modified with polymer for solution processing.

In embodiments, OLEDs used to make inventive images or parts thereof are transparent or translucent. For instance, unlike other OLEDs which typically have one transparent or translucent electrode, both of the electrodes in these OLEDs may be transparent or translucent. Thus these OLEDs might emit light from one or more sides. Such transparent or translucent OLEDs might be small molecule OLEDs, polymer OLEDs, both or a hybrid. As an example, one or more TOLEDs (transparent OLEDs) from UDC might comprise an inventive image or part thereof. Thus, transparent or translucent OLEDs, such as TOLEDs are able to emit light from both sides or from one particular side (e.g., emitting from the top only or from the bottom only, for instance, using an opaque substrate such as a low reflectance absorber, black backing). Moreover, the display emitted on one side of a transparent or translucent OLED or TOLED may or may not be independent from and different from the display emitted on its reverse side. Because TOLEDs allow light to emit away from the TFT array (rather than through it), they can also improve active matrix display apertures. TOLEDs and other transparent or translucent OLEDs can be used in inventive images as building blocks for stacked OLEDs such as SOLEDs, or for hybrid OLEDs.

In embodiments, the light emitted by OLEDs in inventive images enhances other effects in those inventive images such as effects of light and color. Examples of effects that might be enhanced are: effects created with transparent and translucent coloration, reflective effects, fluorescent effects, iridescent effects, effects that modify or distort light (such as by the use of lenses, filters, gratings, prisms, etc.), chromic effects such as photochromic or electrochromatic effects, dichroic effects, video, film, photography, holograms, effects from ingredients with different or high refractive indexes, effects from other light sources, carving, incising, negative spaces, texture, air pockets, an electrically active layer or part, effects from devices or systems, effects of light and color from nanomaterials or nanotechnology and others.

In embodiments, one or more stacked OLEDs might comprise an inventive image or part thereof. SOLEDs (stacked OLEDs) from UDC are examples. Such stacked OLEDs like SOLEDs may have stacked red, green and blue subpixels, superimposed on top of one another (e.g., instead of next to one another). According to UDC, this stacking of subpixels improves display resolution and enhances full-color quality. In a stacked OLED, each of these subpixels (the red, the green and the blue) may be individually controlled to tune the color visible. Brightness may be controlled by varying the total current through the stacked subpixels. Modulating the pulse width creates the value or the level of gray desired. Thus, for example, with stacked subpixels, all pixels emit light regardless of the color tuned. In comparison, if red, green and blue subpixels are side by side, and one of these colors is desired, the pixels of the other two colors are typically not emitting light. Stacked OLEDs, such as SOLEDs, enable hue or color, intensity and value or gray scale to be independently tuned to achieve the color desired or high-resolution full-color if desired (which may be effective for inventive images that employ wireless technology such as wireless world wide web technology). Stacked OLEDs might be small molecule OLEDs, polymer OLEDs, both or a hybrid.

In embodiments, OLEDs are flexible, for example, they are on flexible polymer image supports (e.g., stabilizers). Flexible OLEDs might be small molecule OLEDs, polymer OLEDs, both or a hybrid. Examples of flexible OLEDs might be transparent, translucent or opaque (e.g., with an opaque reflective electrode). In an example, one or more FOLEDs (flexible OLEDs) from UDC might comprise an inventive image or part thereof. According to UDC, FOLEDs are functional, rugged, impact resistant, and robust. Other examples of flexible OLEDs have been developed by researchers at Princeton University in NJ. Inventive images may be made that take advantage of the flexibility of OLEDs like FOLEDs. For example, flexible OLEDs can form or conform to contoured, curved, undulating, or three dimensional inventive images as well as other inventive image surfaces or parts thereof (e.g., they might be installed on a nonplanar image support stabilizer). Also, as inventive images or in inventive images, flexible OLEDs might move, for instance, they can be rolled up and unrolled, they can be moved by air currents, in inventive images that function as clothing they can move as the wearer moves, and when they are used as part of other flexible inventive images they may move also (such as their use as part of textiles or fabrics in inventive images. Flexible OLEDs might for instance, be made on substrates of any of a variety of materials that range for example, from polymer films (that might be optically clear), to substrates made of metal foil (that might be reflective). Flexible OLEDs can be thin or very thin, and light weight. Flexible OLEDs or FOLEDs in inventive images may be opaque, translucent and/or transparent (these might be called T-FOLEDs).

In embodiments, inventive images switch from having their OLEDs emit light to being transparent, translucent, reflective or a combination of these (simultaneously or at different times). The light emitted may be colorless, white, colored, multicolored, or combination of these. As and/or after the OLED appears translucent and/or transparent, the inventive image or its OLED part may be colorless, white, colored, multicolored, or combination of these. The switching of OLEDs in these embodiments may be done in any way desired. For instance, they may emit light (to any extent) while they are transparent or translucent. Such inventive images might for example switch themselves, self-actuating (e.g., due to programming, a timer, another internal or external cause, etc), they might be switched by viewers (e.g., by their sounds or voices, by movements or gestures, etc; and/or they might be switched by the presence (perhaps to different degrees) and absence of one or more triggers, stimulants and/or influences (such as light, heat, electricity, pressure, a liquid, sound, other examples described herein, etc.), etc. The inventive images in these embodiments may serve utilitarian purposes if desired. It may be desired that inventive images or colorless inventive images made in these embodiments that switch from emitting white light (preferably uniformly, e.g., without a design), to being transparent (preferably uniformly, e.g., without a design), not function as windows in images of architecture or design.

In embodiments, OLEDs are sealed or encapsulated, preferably in an inert atmosphere before exposure to ambient environmental conditions (a stabilizer). In embodiments, hermetic seals are used to encapsulate OLEDs, e.g., sealing the OLED with a transparent thin-film barrier, for instance, comprised of multiple layers.

In embodiments, OLEDs are made with organic TFTs, OTFTs, TFTs, or polymer TFTs, e.g. transistors made with pentacene that might be on a polymer or a polyester image support.

In embodiments, OLEDs are used which have ingredients such as phosphorescent materials from UDC, PPG Industries, Princeton University and/or University of Southern CA. In embodiments OLEDs have amorphous silicon TFT backplanes, or poly-silicon backplanes such as those by Sansung SDI of Yongin-City, Kyonggi-do, Korea; or by AU Optronics Corp. of Taiwan. In embodiments, OLEDs have a phosphorescent material integrated with amorphous silicon, TFT backplane technology, e.g., from UDC and AU Optronics Corporation, headquartered at Hsinchu, Science-Based Industrial Park, Taiwan. In embodiments, OLEDs have organic TFTs, e.g., these OLEDs are flexible and their organic TFTs might be made with polymer, conductive polymer and/or semi conductive polymer. In other embodiments, inventive images are made using an OLED or Olight by DuPont Displays, Santa Barbara, CA.

In embodiments, polarizers are used on OLEDs. In embodiments, OLEDs are made using oligomeric technologies. In an embodiment, LEDs, PLEDs or OLEDs are made with efficient blue chromophores.

In preferred embodiments, OLEDs are made using dendrimers. Dendrimers might be solution processed to make OLEDs, e.g., spin coated, printed, ink jet-printed, brushed on, etc. Dendrimers might specially designed for use in OLEDs such as for inventive images in general or for specific inventive images, e.g., OLEDs designed for optimum light emission, quality and efficiency. For example, the core of dendrimers might be modified to change the color light emitted, the size of dendrimer spheres might be modified to control the spacing of cores within the film, and/or dendrimer surface groups might be modified to control processing properties like solubility. In another example, dendrimers might be modified to incorporate the best features of small molecule materials and still be solution processed to make OLEDs. For example, dendrimers modified with phosphorescent emitting cores might be solution processed to make OLEDs. For instance, an iridium based phosphor emitter might be placed at the heart of dendrimers used in OLEDs to increase their efficiency. Dendrimers in OLEDs might for example, enable OLEDs to be highly efficient, and they might enable OLEDs to be made with a single layer of organic material between the electrodes. Other variations might also be used in embodiments, such as the use of superimposed layers of organic materials that are allowed to diffuse into one another, e.g., forming a mixed layer between superimposed layers. For example, in making an OLED, a doped luminescent dendrimer layer might diffuse into an undoped dendrimer layer that is not luminescent, forming a mixture between them. Refer to OLEDs made using dendrimers from Opsis, Cambridge Display Technology, University of Oxford (all in the UK) and University of St Andrews. Dendritic technology offers the potential of high electrical/light-conversion efficiency and high color quality, with low manufacturing costs.

Among further examples of preferred organic ingredients for use in OLEDs in embodiments are the Spiro compounds. Examples of molecules from the Spiro family are Spiro-6PP and Spiro Octopus. Examples of Spiro hole transporters, emitters, and color dopants are available from Covion Organic Semiconductors in Frankfurt/Main Germany. Also available from Covion are poly-spiros for RGB applications (Polyspiro Red, Polyspiro Green and Polyspiro Blue). These are soluble, (e.g., for solution processing such as by ink jet). They are also tunable over a full color range, they have high temperature stability, geometry that prevents polymer chains from aggregation, and for additional functionality an orthogonal biphenyl unit can be used (dyes, charge transport units). Covion also offers small molecule RGB Guest Host System using temperature stabile Spiro compounds.

In an embodiment, one or more ingredients used to make an OLED are fluorescent materials from organisms or mimicking those from organisms. As an example, OLEDs are made using green fluorescent protein or GFP which makes the Pacific Ocean jelly fish Aequorea victoria glow green. GFP collects the energy produced in a chemical reaction and emits it as green light from a small molecular unit in its long molecular chain called a chromophore. Chromophore-like molecules can be used in an OLED, for example, added or scattered as dopants through a matrix of aluminum tris (8-hydroxyquinoline) or Alq3. Refer to "Fluorophores related to the green fluorescent protein and their use in optoelectronic devices." Advanced Materials 12, 1678-1681 (2000).

In an example, an OLED might illuminate part or all of an inventive image with light that appears colorless or white to the unaided human eye, or as colorless or as white as conventional indoor lighting. For instance, such an OLED made for utilitarian purposes as lighting, might be used to make an inventive image. Examples are OLEDs by General Electric or by GE Global Research in NY (refer to www.research.ge.com or www.ge.com) or OLEDs made using the same or similar technology. In another example, an OLED which illuminates a planar inventive image might emit a consistent light (e.g., a colorless light, a white light, a light in another single color, or light in a variety of shades of one or more colors such as different whites), or an OLED may emit light in a single white color that changes to other whites or to other colors over time, e.g., with the color and light changing randomly, with color and light changing according to preprogramming, or with its change dependent on the time of day, on the presence of viewers (their movements, voices, other sounds, etc.), or on intentional controls like touch controls.

In embodiments, inventive image OLEDs (such as inventive images made of or made with TOLEDs) might for example, be on transparent, translucent or opaque substrates or image supports (e.g., stabilizers), that are made with any material desired, such as metal, polymer, paper, foils, silicon wafers, reflective substrates, non-reflective substrates, glass, crystal, stone, wood, a combination of these, etc. In an example, an inventive image is made by installing a small molecule OLED, a polymer OLED, a combination of these and/or a hybrid of these on a transparent or translucent, colorless or colored image support, such as an image support stabilizer. This image support may for example, be the same size as the OLED or OLEDs on it, or it may be larger than the OLED or OLEDs on it. The resulting form may be the inventive image or it may be further processed, for example, by the addition of polymer, colorants, incised marks, mounts or another means of displaying the image, additional ingredients that enable the image to have desired light effects, and/or another variations described herein and/or in US Patent Application No. 20030035917-A1. The resulting inventive image functions as art, design or architecture. It might for example, also have a battery, a solar cell, and/or a TFT (one or more of which may be thin, transparent and/or translucent), or another variation described herein. It might for example, be a painting, a construction, a sculpture, a table top, or a wall made using real light and transparency and/or it may be a textile or a fabric.

In embodiments, OLEDs such as light emitting polymer or LEP displays are able to power themselves. They may for example be photovoltaic, e.g., converting light to electricity which they use to power themselves. In an embodiment, inventive images are made so that their OLED or their OLEDs can easily be accessed and/or removed such as for maintenance, upkeep or other care, for repair, for removal, and/or for replacement.

In an embodiment, an OLED is made with liquid crystal or liquid crystal is a light emitter in an OLED in an inventive image. Examples of liquid crystals for this use may be those with organic compounds called aromatics or those with aromatic rings. Liquid crystal may for example be used in pixels or subpixels, such as red, blue and green, or in stacked pixels. All colors of light may be produced, even white or colorless light. Examples of these OLEDs are UV cured, made in a printing process, a lithographic process, or a combination of these. Liquid crystal OLEDs may have any of the aesthetic variations or further processing described herein or in the documents included by reference herein, e.g., transparency, translucency, opacity, the ability to be reflective, rigidity, flexibility, the ability to roll, scroll, or fold, a pictorial or design element, interactive or responsive features, a utilitarian function, etc. Examples of these liquid crystal OLEDs are by Stephen Kelly and Mary O'Neill and from University of Hull in the UK, and Polar OLED Ltd. in Leeds, England (refer to their patents on light emitting liquid crystal).

In embodiments an OLED is used in or as an inventive image with a liquid light emitter or semiconductor, such as an OLED with ethylhexyl carbazole (EHCz) doped with rubrene as the liquid semiconducting layer. See Denghui Xu and Chihaya Adachi. "Organic light-emitting diode with liquid emitting layer." *Applied Physics Letters* 95, 053304 (2009). Inventive images may have OLEDs or Lumiblade OLEDs by Royal Philips Electronics in the Netherlands.

For examples of OLED light emitters and other OLED ingredients, OLED structures, OLED technologies and processes, materials associated with OLEDs for use in inventive images, complimentary materials, sources for these and related information refer to U.S. Pat. Nos. 7,629,400 and 8,921,473. However these examples are not limiting at all since the specific choice of these variables can significantly affect aesthetic elements in inventive images, and the present invention is designed to enable the widest possible range of aesthetic variations. Countless other examples can easily be found in the public domain, e.g., on the Internet, and any of these may be highly desirable.

Liquid Crystal

In embodiments image support mediums and/or aesthetic works are made with or as one or more liquid crystal displays or LCDs. Examples of these LCDs in or as aesthetic works are optionally capable of illumination, e.g., with light emitting from the liquid crystal or from another source or ingredient in the inventive image such as a backlight. Typically, electronic practices (e.g., electricity and electronic processes) are used in inventive images with liquid crystals. Such LCDs may for example be rigid or flexible, opaque, interactive, responsive, programmable, thin or very thin, transparent and/or translucent. They may have a means of installation or display. In addition or instead, they might have any of the other specifications and aesthetic properties described herein.

In embodiments, liquid crystal is painted, applied by hand, printed, sprayed, coated or applied in another way that a paint might be applied onto inventive images or part thereof such as image supports (e.g., stabilizers), to form a liquid crystal display or LCD, referred to herein as a "paint-on liquid crystal display" which is made using a photo-enforced stratification process, preferably on a single substrate. In an example, a blend or mixture of liquid crystal and at least one other ingredient, preferably one or more polymer precursors or monomers, is applied on an inventive image or part thereof, such as an image support or image support stabilizer. An application of a liquid crystal mixture of these embodiments is preferably photopolymerized, at least once, twice using some variations of the process, or another number of times, e.g., by the use of stabilizers such as one or more of: ultra violet light, a UV light absorbing dye in the liquid crystal mixture, and a mask. The polymerization is preferably inhomogenous so that the surface nearest the UV light source polymerizes first. Then there may be a stage in which the gridded or partially polymerized application is exposed to UV light again (preferably without a mask) to form a polymer cover over the grid or network (or over its open areas) so that its cells are closed with liquid crystal inside. These paint-on LCDs may have a nanomaterial and/or conductive polymer. Refer to Royal Philips Electronics in Eindhoven, The Netherlands, and to www.Philips.com. Also refer to "Single-substrate liquid-crystal displays by photo-enforced stratification" by Roel Penterman, Stephen I. Klink, Henk de Koning, Giovanni Nisato and Dirk J. Broer, in Nature Vol. 417, May 2, 2002, pages 55-58. In such liquid crystal mixtures used to form LCDs in inventive images, the polymer precursor, precursors, or monomer or monomers that forms the grid or cell walls, and that forms the cover or lid closing the cells are stabilizers. Electrodes used in such LCDs in inventive images are stabilizers, as are other electrical parts and the electrical current used to run them and radiation or UV light used to make them.

E-Materials, Reflective Displays

In embodiments, inventive images are made with or of e-materials; reflective displays or mediums; electro-optic displays or mediums, and/or electrochromic systems. These materials may for example, be bistable, and they might change in at least one optical property (a formal element such as color) in response to energy, an electric field, an electromagnetic field, electricity, light, and/or radio wave, e.g., using a stimulant or trigger. Such materials may have nanomaterials or smart materials, or they may be nanomaterials (e.g., hybrid nanomaterials) or smart materials. Examples often preferred might be: rigid, flexible, thin or very thin, reflective or non-light-emissive, paper-like, made in a roll to roll process, made with polymer electronics or conductive polymer electronics, made by printing process(es) and/or made to be as lasting and as permanent as possible. E-materials typically have changeable or rewritable coloration. This coloration is typically changed or rewritten using a trigger, stimulant or influence that is typically energy or electricity. E-materials are typically bistable, they typically only require energy or electricity to transition from one stable or resting state to another, to change their coloration or visual presentation. It is preferable that e-materials do not require any energy or electricity to display and maintain still or unchanging coloration. If this is not possible, it is preferable that e-materials only require low or minimal power, energy or electricity to present and maintain still or unchanging coloration. E-materials may be made using any of a number of different technologies or combinations of them, e.g., electrophoretic technologies, liquid crystal technologies such as cholesteric liquid crystal (CLC or ChLCD) technologies, etc. E-materials are typically light reflective. Among the exceptions are e-materials that are illuminated, light emitting, and/or transparent, e.g., those that are illuminated for viewing in dark places; those that have OLEDs, PLEDs or other LEDs, those in European Patent EP 1118039, transparent NanoChromics (see www.n-tera.com and description herein). Examples of e-materials are made with polymer or polymer image supports that may be stabilizers, e.g., they might be made with two or more different polymers; semi conductive or conductive polymer(s); an image support formed of two or more layers, etc. E-materials might be made with nanomaterials and/or nanotechnology. Non-polymeric e-materials might also be used to make inventive images. E-materials in inventive images or parts thereof might be made with a wide range of variations and e-materials may be further processed as desired, e.g., using additive or subtractive processes, for example, adding filters, lenses, prisms, reflective effects, other light effects, other coloration, a photographic picture, a means of display or installation, a part that enables an aesthetic element to be changed interactively, etc. Further description follows and can be found in U.S. Pat. Nos. 7,629,400 and 8,921,473. More information on e-materials for inventive images is on the Internet. More examples of e-materials will be developed in the future that may be used in inventive images.

Conventional e-materials typically are made to conform to limitations that do not exist in the use of e-materials in inventive images. In contrast, the use of e-materials in inventive images is unlimited—it may or may not fall within some or all of the limitations restricting the use of e-materials in items and products that are not images. In inventive images, e-materials or part thereof may or may not be viewed or viewed entirely by reflective light. They may emit light, they may be illuminated, they may transmit light, or they may be partially or entirely transparent or translucent. Inventive images or parts thereof made with or of e-materials, may have any size, shape or 2D or 3D form desired, and these formal elements might change if desired. For example, in inventive images, e-materials may be thin, very thin, thick or very thick; they may be uniformly smooth, even, consistent throughout, irregular, textured, uneven, perforated, inconsistent in one or more ways; they may have irregular shapes and/or forms; they may be light weight, heavy or very heavy; they may be two or three dimensional; they may be on the surface of an inventive image or part thereof that is substantial in size or large, etc. Also, whether they are conventional or they are in inventive images, e-materials may be rigid and/or flexible. They might for example, open like a book, a magazine, a newspaper, a notebook, a scroll, an architectural blueprint, etc., e.g., resembling conventional paper. They might be folded, and/or they might roll up (even tightly or very tightly, e.g., tightly enough to fit into a tube that may be about 7.5 mm in diameter, about 4 mm in diameter or less). And, unlike typical, conventional e-materials, e-materials in inventive images may be volumetric forms, objects, walls, ceilings, large structures, linear sculptures, or e-materials might be on the surfaces of such forms, etc.

Inventive images or parts thereof made with or of e-materials might use electricity in any form and they may only require low power. They might for example run on batteries, on solar energy, photovoltaics, or a combination of these (e.g., forms of these that are thin, very thin, lightweight, small or a combination of these, like thin film batteries or slimline batteries). Inventive images or parts thereof made with e-materials might be driven by polymer electronics, organic electronics, circuits made with organic or polymer semiconductor materials, or active matrix polymer electronics. They might use thin film transistors (TFT), polymeric transistors, flexible transistors, TFT arrays, active matrix backplanes, active matrix TFT backplanes, flexible backplanes, ink jet-printed active matrix backplanes, direct drive polymer backplanes, low temperature polysilicon TFTs, flexible microprocessors, any of these examples or others on a polymer image support (that might be a sheet, a film, flexible, three dimensional, or of another description), or a combination of these. Refer to "Flexible active-matrix electronic ink display" by Chen, Y. et al. in Nature 423, 136, 2003. Examples of e-materials for in inventive images may have writing methods or methods to change their coloration that may be electric, magnetic, influenced by light (photochromic methods), thermomagnetic (e.g., using leuco dye, thermochromism), and/or other methods. Examples of e-materials from these embodiments are made by or made using technology by Seiko Epson; by Lucent Technologies, Murray Hill, NJ (such as their flexible transistors, e.g., for e-materials by E-Ink); and/or by Plastic Logic, Cambridge UK (e.g., for e-materials by Gyricon Media of Ann Arbor, MI). In an illustration, the circuitry for e-materials may be made using an organic material that can function as a semiconductor (e.g. pentacene), on an image support that may be polymer and/or flexible.

E-materials in inventive images or parts thereof may have preprogrammed displays, they may store information or images (e.g., even in large quantities); they may download from the Internet or provide Internet access; they may be controlled or operated by viewers; they may be self-actuating, self-writing or changing their coloration themselves; they may have a unit or part that rewrites or changes the coloration (it may or may not be physically separate from the rest of the inventive image); they may be controlled or operated using a stylus or wand device, by touch controls, by movement, gesture, sound or voice recognition technology, by a printer-like device that they pass through, and/or remotely controlled, e.g., receiving broadcasts, information over a network, via wireless communication and/or from the Internet. Thus, for example, inventive images with e-materials might have graphics, text, other images, coloration, aesthetic elements like lines or circular forms, or a combination of these that change as desired e.g., in a design, randomly, in a manner that is organized, orderly or logical; they may change uniformly (such as a uniform color change or a change from one subject or abstract element to show another), etc. The coloration or display of e-materials might change at any rate, for example, ranging from changing from one still presentation to another when triggered (such as when a viewer presses a touch control), to changing very quickly or at video speed (such as to show movies). Process(es) such as electrowetting processes might be used in making e-materials that may enable faster, quick or very quick switching, e.g., in about 10 milliseconds or about 100 frames per second (which is about four times the switching rate of the average VCR). Refer to "Video-speed electronic paper based on electrowetting" by Hayes, R. A. and Feenstra, B. J. in Nature 425, 383-385. Refer to electrowetting processes by Royal Philips Electronics.

In embodiments, electrical current, solar power, photovoltaics or another form of energy, an electrode, a battery, a circuit, a transistor, a TFT, a backplane, a TFT backplane, or another power source or carrier may be stabilizers when used to control and/or change the color visible in e-materials in inventive images. For instance, by attracting or repelling the negative or positive charge of particles (e.g., beads, capsules, spheres, microcapsules, pigment particles, colored liquids, etc.), or by attracting or repelling the negative or positive charge of a colored area of particles (e.g., a colored hemisphere or side of such particles). Other stabilizers are other ingredient(s) in an inventive image that assist or enable the visibility of coloration in a process, in a matrix or in a system relying on attracting or repelling the negative or positive charge of that coloration. Examples are fluids, oils, etc. used in e-materials. Materials and/or processes that alter the rate that e-materials change are also stabilizers, (e.g., electrowetting processes)

In an example, an inventive image might be made with multiple sheets of e-materials bound together or connected in another way. In another example, an inventive image might be comprised of a single sheet of e-materials and the device(s) that controls it, updates it and/or changes its display or the device(s) that assist in any of these processes might be in a backing, in another layer and/or in a frame or rim. In an illustration, e-materials are incorporated into or onto fabric, textiles, and clothing in inventive images or parts thereof. These might be flexible. In further examples, e-materials is in rigid inventive images or parts thereof.

Examples of e-materials, EPF or EPD for use in inventive images or part thereof are made with an inner layer of pockets (chambers, connected cells or a honeycomb-like structure) that may be structural in inventive images. The pockets and the design of such an inner layer of pockets may or may not be uniform in shape or size. These pockets may be any shape or size. The inner layer of pockets may be an image support, an image support stabilizer, a strengthening stabilizer, etc. The walls, dividers or partitions between these pockets might be part of the display's inner structure. Each pocket may contain fluid and/or particles (preferably both), the coloration of which is visible depending on the use of an electrical charge or other trigger or influence. Examples are displays by Sipix Imaging Inc. of Milpitas, CA and Fremont, CA (refer to www.sipix.com, e.g., to the technical information online). Sipix displays, Sipix Microcup technology or EPF, or related technology or products may be used in inventive images. For example, inventive images might be made with Sipix's Microcup EPFs that have flexible, TFT backplanes from Polymer Vision.

In embodiments, inventive images or part thereof are made with reflective displays, EPDs, and/or technology by Gyricon LLC of Ann Arbor, Michigan (refer to www.gyricon.com) and/or PARC (Palo Alto Research Center, now a Xerox subsidiary). Examples are inventive images or parts thereof made using e-materials with an internal layer of bichromal beads that can be rotated by voltage, inventive images or parts thereof made using Gyricon, made using SmartPaper or made using SyncroSign, or the technology for these. Such e-material might have backplanes that are active matrix, made of polymer, printed, ink jet-printed, flexible, very thin, or a combination of these, e.g., backplanes made by Plastic Logic or by using their technology. In an illustration, such inventive images might be made of or with a flexible electronic display that has two layers or sheets of thin polymer (which are image supports e.g., stabilizers) with many tiny bichromal beads (e.g., millions of beads measuring about 100 microns in diameter or smaller) embedded in a cavity, internal layer or central layer between the two polymer layers or image supports, e.g. in a cavity filled with liquid, polymer and/or oil. These beads have a different color and a different electrical charge on each of their halves, hemispheres or sides (e.g., with contrasting colors on the two hemispheres of the beads like black and white, or red and white). Using voltage, the beads can be made to rotate within the cavity, inner layer or central layer of the e-material's form, changing the color viewers see, e.g., each bead serves as a pixel in a larger image, picture or display. Without voltage the image, picture or display remains unchanged. The use of voltage again causes the beads to rotate changing the coloration they display and thus the image presented. Such e-materials may be bistable.

In embodiments, inventive images or part thereof are made with e-materials by Canon (refer to www.canon.com), and/or E-Ink Corp (see www.eink.com, particularly for technical and updated information). Refer to patents assigned to E-Ink Corp (such as U.S. Pat. Nos. 6,392,785; 6,422,687; 6,518,949 and 6,445,489). Refer to Royal Philips Electronics in Amsterdam and Eindhoven, the Netherlands, www.Philips.com, Polymer Vision in Eindhoven, in the Netherlands, www.polymervision.com, and http://polymervision.nl/. In embodiments, inventive images or part thereof have e-materials made by Aveso Inc of Fridley MN, see www.avesodisplays.com for further information. In an embodiment, inventive images are made using compositions, methods and/or systems described in US Patent Application No. 2005/0079386 A1 or are made using similar technology. Such inventive images may be made using a fibrous organic image support such as one made of cellulose. They may have nanomaterials or they may be nanomaterials.

In embodiments, inventive images or part thereof have e-materials made with liquid crystal. An example is that developed at Tokai University, refer to H. Yoshikawa et al. "Digital Paper with Guest-Host-Type Liquid-Crystal Medium," J. Imaging Science and Technology, 47, No. 4 304-308 (2003). In embodiments, inventive images or part thereof have e-materials made with conventional paper and polymer electronics, e.g., the electronics might be coated on the conventional paper, forming an image support. In another example, inventive images are made using e-materials that are bistable and made with liquid crystal, and/or this technology. For instance, these might be nematic LCDs, the technology for these, or both, such as that by Nemoptic of Magny les Hameaux, France, which may be called BiNem (refer to detailed information at www.nemoptic.com). In embodiments, inventive images are made using e-materials that has bistable, grating-aligned zenithal liquid crystal displays, or zenithal bistable displays that employ a simple micro-structured grating surface to control the alignment of liquid crystal molecules, such as those by ZBD Displays, Ltd. of Worcester UK and Windsor UK, refer to details at www.zbddisplays.com. As a further example, refer to work done by Korea Electronics Technology Institute (KETI) in Korea. In embodiments, inventive images are made using e-materials based on MEMS (Micro-Electro-Mechanical-System) such as the Interferometric Modulator (iMoD) Matrix component, which is a bistable, reflective display by Iridigm Display Corp. (www.iridigm.com), a subsidiary of Qualcomm of San Diego CA (refer to www.qualcomm.com). Such e-materials made using MEMS might be further processed, e.g., using additive processes such as adding polymeric compositions.

In embodiments, inventive images or parts thereof are made using e-materials or technology from the Flexible Display Center at Arizona State University in Tempe, Arizona, such as electrophoretic ink or EPD technology, cholesteric liquid crystal technology (CLC or cholesteric liquid crystal display ChLCD), and integrated subsystems technology. See information at http://flexdisplay.asu.edu/ or http://flexdisplay.asu.edu/index.htm. In an embodiment, inventive images or parts thereof are made using e-materials from Kent Displays, Inc. of Kent, Ohio. Examples of these use CLC or ChLCD technology. Refer to www.kentdisplays.com and in their US and foreign patents, especially for technical information. In embodiments, inventive images or parts thereof are made using e-materials or technology from The Liquid Crystal Institute at Kent State University in Kent Ohio (refer to www.lci.kent.edu), and/or from its Center for Advanced Liquid Crystalline Optical Materials (refer to www.lci.kent.edu/ALCOM/alcom.html). In an embodiment, inventive images are made with e-materials, CLC displays, technology and/or similar technology by Magink or Magink Display Technologies Inc. of NY, NY, of Middlesex, UK and Israel (formerly E-Magin Ltd, see www.magink.com and their parent company, Sixeye Ltd.). These may have full color if desired, e.g., as many as 4096 colors or perhaps more. Examples are inventive images made with CLC displays and/or CLC technology by Magink that may be partially or entirely made by Mitsubishi Electric of Japan. In embodiments, inventive images are made with e-materials and/or technology from Eastman Kodak, such as their flexible, bistable, polymer-dispersed CLC display made using roll to roll processing and/or technology for this.

In embodiments, inventive images or part thereof are made using CLC, as desired. These may be e-materials, they may be bistable, flexible, made in a roll to roll process, reflective, non-light-emitting, and/or made with polymer or organic electronics. The use of CLC and other liquid crystal materials in inventive images is not limited to films or thin layers.

CLC may be used in inventive images for the color, colors and/or light properties it shows in reflected light. This color may be iridescent, it might appear intense, and it might change as the viewer moves in relation to the image, or as the image moves in relation to the viewer. In further examples, CLC might be used in inventive images as flakes, paint, ink, pigment, and/or another kind of colorant. For instance, CLC pigments may be used in inventive images, such as Helicone pigments from Wacker-Chemie Gmbh of Muenchen, Germany (www.wacker.com). Examples of other colorants for use in inventive images are described in U.S. Pat. Nos. 5,599,412 and 6,338,807 and in US Patent publication 2002/0020829.

In preferred examples of these embodiments, the color and/or light properties of CLC in a smart inventive image are changed or modulated using one or more stabilizers, and this change or modulation may be reversible and repeatable. Examples of such stabilizers are: electricity, electric fields, temperature, light, radiation, dopants, photo sensing materials, and/or impurities. Other inventive image parts that stimulate, influence or trigger such a change in color and/or light properties, or which assist in this process are also stabilizers, such as electrical parts and chemicals. The color and light of CLC in inventive images might be controlled, modulated or changed uniformly, more or less uniformly, or differently in different areas, such as to form a varied design, pattern or display and/or to form text in inventive images. The response rate of CLC to the stabilizer might be at any rate, it may be good, very good or quick.

In a preferred example, one or more stabilizers might be used to rotate, flip, move, reposition and/or switch the CLC molecules and/or the particles or flakes comprised of them, changing their angle and/or alignment and thus changing or modulating their color and light properties. The binder, coating, host fluid or material that such CLC flakes are in might be polymeric, and it might be conductive or semi conductive. In inventive images, pixels might be made using such CLC flakes.

CLC materials might for example be used on image supports that may be polymeric, that may be stabilizers, and that may be flexible and/or rigid. In embodiments, bistable flexible CLC e-materials, or full polymer bistable cholesteric displays are used in inventive images.

In embodiments, inventive images are made with at least one touch activated or touch enabled control, touch screen or touch activated command device referred to herein as a touch control. Examples may or may not be or have nanomaterials, conductive polymer, transparency and/or translucency. Conductive polymer may for example, be used instead of ITO. Examples may be flexible, rollable, foldable, bendable or rigid; any dimensions, shape or form; planar or non-planar; 2D, 2D planar or 3D; with any coloration and light properties; thin, very thin, thick; in the form of keys or buttons; they may be part of an inventive image that is connected or separate; a keyboard or keypad or on one; part of a computer; made with sensors, resistive sensors or capacitive sensors; made with buckypaper, another nanomaterial layer or conductive polymer (e.g., instead of ITO); and/or integrated to any extent with aesthetic and/or utilitarian elements in an inventive image, e.g., touch controls may be visually continuous with the rest of the image to any extent, viewers may or may not readily see them, they may be integrated with the subject matter and/or color, for example, all red areas or star shapes on an inventive image may be touch controls. Touch controls may enable viewers to interact with the Internet, to communicate, to use a wireless feature; to input, activate or use information and/or images that may be stored or programmed or sent to the inventive image; they may activate devices that emit or record images, text or sound such as camera(s), they may enable one or more other formal elements of the image support or the inventive image to be changed or modified.

In other embodiments, inventive images have a smart material, one or more sensors and/or a fabric strain gauge that is sensitive to being bent, strained or extended, and/or that measures the degree to which it is bent, strained and/or extended. Such materials, sensors and/or fabric strain gauges may have conductive polymer and/or they might or might not be or have nanomaterials. Once bent and/or extended, the image might respond, e.g., the image might play a sound, change its light properties, move, etc. Piezoelectric, piezorochromic and/or piezochromism materials for use in embodiments may also respond to bending and/or extending.

In embodiments, inventive images are made with movement or gesture recognition technology, and/or with sound or speech recognition technology, which may be nanomaterial or which may have conductive polymer, a nanomaterial, sensor(s), camera(s), sound recording and/or playing devices, other sound technology, computer(s), computer part(s) or part(s) similar to those used in computers; it might be made with wireless systems or devices, other technologies, combinations of these, etc. Also, this technology might enable the inventive image to be responsive, and the response might be of any kind, e.g., recording the gesture or sound, reading sign language or interpreting speech; responding with change in coloration, light, sound, music, movement, other aesthetic or formal elements, information, speech, conveying the gesture and/or the sound or an interpretation of it or them to another location, responding using wireless communication or the Internet, and/or responding in other ways. Examples of movement or gesture recognition technology might be called capacitive sensing technology, 3D capacitive sensing technology, active capacitive sensing technology, gesture recognition technology, computer vision system, human hand gesture recognition, human body motion recognition, motion recognition, sign language recognition, facial gesture recognition, face recognition, pattern recognition, detection technology, sensing technology, etc. Refer to EtherTouch of Cranford, New Jersey and South Africa at www.ethertouch.com.

In embodiments, a two or three dimensional image support medium and/or aesthetic work is made or prepared with one or more of these specifications:

A) it is capable of being responsive, self-actuating, interactive, controlled, modulated, changed and/or programmed, or it has a part with this capability; it has this capability when stimulated, activated, influenced or triggered or when externally stimulated, activated, influenced or triggered;

B) use of the capability in A) above causes or assists in causing the image or the image support medium, or at least one of their aesthetic elements: to change, modulate, move or stop moving; to be visible, hidden, audible or silent; or to change its electrical current, color, a light property, form, shape, position, volume, density, viscosity, appearance, a physical property, or a visible aesthetic property;

C) the work or the image support medium has means, a part, an area, a layer, an element, a device or a mechanism that can be activated, stimulated, triggered or used by: a person intentionally or unintentionally, the environment, temperature, heat, radiation, light, movement, acidity or pH, magnetism or magnetic field, a solvent, a chemical, a liquid, moisture, pressure, stress, programming, electricity, ionic energy, an electron beam, or by change in any of these, and this causes or assists in causing change, modulation or another response in the image, in the image support medium, in a part of one of these or in one or more of their aesthetic elements;

D) the work or the image support medium is prepared with one or more of: programming, means which enables it to be programmed; a computer, part of a computer or memory; an interactive part, means device or system; sound, music, speech, light, or the presence and the absence of sound, magnetism or a magnetic force, music, speech or light; a microphone or a speaker; a control mechanism or device; a viewer input device, a switch, a dial, a button, a touch control or touch activated device; a mechanism or device which enables control or change when pressure or stress is applied, a drawing device, a stylus or wand to control, interact with or change the image or image-making support medium; a trackball or a mouse; a computer vision system; means of responding to sound or voice command; technology or capability for: speech or voice recognition, movement or gesture recognition, capacitive sensing, human hand gesture recognition, motion recognition, human body motion recognition, sign language recognition, facial gesture recognition, pattern recognition, a means of sensing and/or detecting; a fabric strain gage or a technology, sensor, device or ability that is sensitive to or that detects being bent or extended, or, such a technology, sensor, device or ability plus the ability to respond to this as a stimulant, trigger or influence; means of controlling, interacting with or changing the image or image-making support medium from a distance, using the Internet, using a wireless method or using a broadcast method; a sensor, means of sensing or detecting a viewer, movement, sound, light, the environment or an aspect of it, heat, temperature, change in any of these or other change, or such means of sensing or detecting plus means of responding or responding with a change in the image or image support medium, or in one of their aesthetic elements; a part that is a camera that is subsidiary or that is subordinate in proportion to the visible work as a whole or hidden from view, or making the work free of a camera; a means of being programmed; a means by which a person can intentionally or unintentionally control, change or vary the electrical current, color, light, form, shape, movement, position, volume, form, density, viscosity, appearance, a physical property or an aesthetic element of the image-making support medium or the work; an interactive feature or part which is hidden from view, unobvious or unapparent to viewers, or an interactive feature that is perceived to be visually continuous with, or visually integrated with the appearance of the rest of the image-making support medium or image; a photorefractive polymer absorbent polymer, polymer gel, hydrogel, or redox polymer; a shape memory polymer; an ionomeric polymer-metal composite; conductive polymer; or polymer capable of changing or responding to stimulation, a control, activation, a trigger or influence;

a solar cell, photovoltaics; a non-silicon solar or photovoltaic cell; a solar cell or photovoltaics applied or partially applied by painting, brushing, printing, spraying, spin casting, solution processing or a solution coating method; a power source, means of carrying power, a battery, a thin film battery, a circuit, an electrode, conductive ink, or a composition, material or technology that provides or carries power; polymer electronics, printed electronics, an integrated circuit or chip, a non-silicone integrated circuit or chip; a transistor, a thin film transistor (TFT), an organic transistor, a light emitting transistor, a backplane, a TFT backplane, an active matrix backplane; a nanoscale device, machine or system; a light emitting material, light emitting silicon; an electroluminescent material, a metal coated polymer, a polymer coated metal or a semiconductor; a material or a polymeric material that is: photochromic, thermochromic, piezorochromic, piezoelectric, piezochromic, solvatechromic, carsolchromic, electroactive, gasochromic, a photonic colorant, a photonic crystal, a photonic material, a synthetic opal or a synthetic opal containing silica spheres or imbibed with liquid crystal, polymerized crystalline colloidal arrays, gel particles embedded in crystalline colloidal arrays, a photonic band gap material or structure; a phase change material; liquid crystal, liquid crystal elastomer; a smart fluid that is a particle filled, oil based suspension that changes in viscosity reversibly or that changes from liquid to solid reversibly; electro-rheological or magneto-rheostatic fluids; a polymer or conductive polymer magnet; porphyrin; a polymer that is re-mendable, self-healing or regenerative; a hologram or a hologram that appears two or three dimensional and at least partially intangible; or one or more of the above, a device, a material and/or a conductive electronic material or device that is: at least partially transparent, translucent or flexible; thin or very thin; made with polymer or conductive polymer; a nanomaterial or made with at least one nanomaterial, carbon nanotube or carbon nanomaterial; or made in a roll to roll or continuous manufacturing process, a printing process, a coating process or a non-vacuum process;

E) the work or the image support medium has one or more from A) or B) above that functions with, that employs, that is activated by, stimulated by, triggered by, produced by, or produced in part by one or more from C) or D) above;

F) the work or the image support medium has or is an OLED, a LED; a display made with at least one nanomaterial, quantum dot, nanocrystal, nanotube, and/or graphene; a light emitting device or display, a field emission display, electronic paper or an e-material, another device, machine or system; a device, machine or system made with at least one nanomaterial, graphene, a nanotube, a carbon nanotube, a nanocrystal, a nanoparticle or a quantum dot; or the work is prepared with or as at least one of these and also with one or more from A)-E) above; or G) the work or the image support medium is prepared according to one or more from A)-F) above and: it has at least one part or device that is partially or entirely transparent or translucent; it has at least one specification described above that is partially or entirely transparent or translucent; it has a form that is partially or entirely transparent or translucent; the work is made with polymer or with transparent or translucent polymer, or a combination of these;

H) at least part of the work or the image-making support medium shows a visual presentation, a visible or aesthetic element, color and/or light that is capable of partially or entirely changing over time at any rate, or changing over time like or as video or film; or I) any combination of any of the above.

In embodiments, the image support medium or the aesthetic work has a utilitarian part or it serves a utilitarian function as: a door, a gate, a fence, a stage set, a partition, a screen, furniture, a table, a chair, a stool, a chest, a cabinet, a cart, a bench, a tent, an awning, a fountain, a basket, a case or container, a light fixture, candelabrum, a window, a skylight, a lunette, shades, shutters, a window treatment, a tile, a column, or a set, grouping or compositional arrangement of these that is a single work; interior design, architectural feature design, a feature of a building or architectural structure, a building façade, a wall, a ceiling, a floor, stairs, a crosswalk, a bridge or an architectural form or structure; craft design, a vase, a bowl, a tray, a cup or goblet, a plate, a dish, a pitcher, a soup tureen, a table cloth, a runner or a centerpiece, a placemat, home product design, or a work of design for household use; an altar, a menorah or an image for spiritual or religious use; a book or pad that is a new version of the conventional image making blank book or blank paper pad capable of being developed into an image, or a plurality of associated sheets arranged in a book or pad form capable of such image making, or one or more pages in or removed from such a book or a pad, or one of these that is an aesthetic work; graphic design or book design preferably free or nearly free of visible legible text; a work of design, a wearable image, fashion design, a fashion accessory, a handbag, jewelry, a hat, a belt, a tote bag or a costume; a combination of any of these; or one of these or a combination of any of these that is partially or entirely capable of light emission, changing over time, flexing, folding, rolling, transparency and/or translucency, and/or that is capable of interactivity or being responsive.

In further examples, inventive images may be utilitarian forms conventionally made in glass or conventional polymer like: furniture, a table, a chair, an architectural feature, a work of design for the home, or a table top object that is a work of design, which is made with polymer of the present invention that is transparent or translucent, that has coloration, e.g., coloration from a means described herein.

In further examples, inventive images are a plurality of associated sheets arranged in a pad or book for image-making, or in a pad or a book with a form of or similar to a conventional blank paper pad or blank book for image-making. An inventive image might be developed using one or more of such a pad or book's pages or sheets. These pages or sheets might be in the book or pad, and/or removed from it, e.g., to develop images using these pages or sheets like pages and sheets in conventional image making pads.

In an embodiment, the image support medium has, is accompanied by, or is displayed with text identifying it as a medium for making images. For example, the image support medium may have a label or packaging that states it is an image making medium or a medium for making art, design or architecture, or it may be accompanied by text stating this such as a brochure, instructions, a flier, a package insert, a sign, a document on a CD Rom or other electronic storage device, etc.

All of the image support mediums and inventive images described herein might, if desired, be further processed using any method(s) and material(s), such as conventional image making practices, and such as the examples provided herein and/or in U.S. Pat. Nos. 7,629,400 and 8,921,473.

Note that image support mediums and inventive images herein are not limited by the restraints that conventionally determine the design, preparation, development and/or production of conventional items made using materials and devices described herein, because inventive images need not serve the same utilitarian functions as these conventional items. This leads to a wide array of aesthetic possibilities. For example, a mirror, a window or an effect like that in a conventional mirror or window, which is part of an inventive image, need not be smooth, even, consistent, or planar, and need not have the same light properties as a conventional mirror or window, e.g., it may have distortions, any other irregularities desired, as well as further processing such a superimposed layers. In making inventive images, materials, devices, and conventional practices such as those described herein, can be used in any manner desired. Various conventional practices can be used to make the inventive images of the invention, as will be readily determined by those of ordinary skill in the art.

Examples of the technologies, materials, nanomaterials and processes for making inventive images described herein, in U.S. Pat. Nos. 7,629,400 and 8,921,473 will change, become more sophisticated, be made in new variations, and/or be further developed for products and uses that are not images, e.g., smart cards, computers, various kinds of displays, etc. These changes and variations may be used in inventive images and they might be preferable, e.g., for aesthetic reasons. As specific examples, all OLEDs, all e-materials and all nanomaterials may be used to make inventive images, even further developments of those herein and in the patents included herein by reference.

It is to be understood that the invention is not to be limited to the exact configuration as illustrated and described herein. As an important examples, variations of the present invention made using conventional practices in image making, in fine art, in design, in architecture, in polymer science, in OLEDs, in other light-emitting displays, in nanotechnology and in the conventional practice of the other technologies described herein and in the referenced documents are very desirable. Understanding the present invention requires being mindful that the reason for its existence and its ultimate goal are both aesthetic—namely to create art, design, pictures and architecture with new aesthetic properties or formal elements. Since specific choice of ingredients and processes used to make specific inventive images often affects, significantly affects or even determines their aesthetic elements (formal elements), it is very important to understand that the specific ingredients and processes used to create inventive images includes examples of the kinds of ingredients and processes named herein and in the referenced documents, which are not specifically named herein or in the referenced documents. For example, countless other desirable examples of inventive image ingredients and processes of the kinds mentioned herein are in the public domain, (e.g., on the Internet and in publications), and any of these may be highly preferred for the aesthetic variation it provides or enhances. Accordingly, all expedient modifications readily attainable by one of ordinary skill in the art from the disclosure set forth herein, or by routine experimentation therefrom, are deemed to be within the spirit and scope of the invention as defined by the appended claims.

The invention claimed is:

1. A method of making a macroscopic, two or three-dimensional image-making support medium that facilitates the creation and display of a two or three-dimensional macroscopic work of art, design that is applied art, and/or architecture,
    making the support medium or work so that it is macroscopic and two or three-dimensional, and so that it is a whole in and of itself with distinct edges or boundaries, and
    making the support medium or the work with at least one nanomaterial that affects the color or adds to the color of the support medium or the work, which is a nanomaterial not found in nature and other than a carbon nanotube or fullerene added to conductive polymer or to a material that has conductive polymer to improve its conductive or emissive properties, and
    making the support medium or work as or into a two or three-dimensional artwork, work of design that is applied art or architecture that lacks a means of interactivity or of actively changing more complex than or other than a conventional on/off or dimmer, and also
    making this aesthetic work other than a conventional utilitarian: computer, camera, phone, personal digital assistant device, digital photo frame, digital picture frame, portable media player device or wrist watch.

2. The method of claim 1 in which the support medium and/or work is made with a paint or ink made with at least one nanomaterial.

3. The method of claim 1 in which the support medium and/or work is created or designed by a designer, an architect, an artist or by more than one image makers.

4. The method of claim 1 in which the unfinished or finished work is displayed or presented as art, as design that is applied art or architecture.

5. A method of making a macroscopic, two or three-dimensional support medium for a work of design that is applied art, that facilitates the creation and presentation of a two or three-dimensional work of design that is applied art,
    making the support medium or work macroscopic and two or three-dimensional, with at least one nanomaterial that is not found in nature and that is other than a carbon nanotube or fullerene added to conductive polymer or to a material that has conductive polymer to improve its conductive or emissive properties,
    making the support medium or work with a macroscopic material or composition that is incapable of actively changing over time using a means more complex than or other than a conventional on/off or dimmer,
    making the support medium or work as or into a whole in and of itself with distinct edges or boundaries,
    making the support medium or work as or into a macroscopic two or three-dimensional work of design that is applied art, and
    making this work of applied art so that it is other than a conventional utilitarian: computer, camera, phone, personal digital assistant device, digital photo frame, digital picture frame, portable media player device or wrist watch.

6. The method of claim 5 in which the support medium and/or work is made with a macroscopic material or composition that is made with the at least one nanomaterial.

7. The method of claim 5 in which the support medium and/or the work is made with: polymer, glass, crystal, clay, ceramic, cement, metal, sheetrock, plaster, paper, wood, stone, a gem, fabric, fiber, a textile, yarn or thread; an organic or natural material or composition; a means of having and using electricity; one of these made with at least one nanomaterial; a nanocomposite or hybrid nanomaterial; or two or more of these.

8. The method of claim 5 in which the support medium and/or the work are made capable of emitting light, or they are made with at least one: light emitting diode, organic light emitting diode, other light emitter or one of these made with at least one nanomaterial.

9. The method of claim 5 in which the unfinished or finished, two or three-dimensional support medium or work functions as furniture or it is wearable.

10. The method of claim 5 in which the image support or the work is partially or entirely transparent or translucent so that light can pass into or through part or all of it.

11. The method of claim 5 in which the unfinished or finished, two or three-dimensional support medium or work is capable of emitting light, it functions as lighting or as a lighting fixture.

12. The method of claim 5 in which the finished or unfinished work is prepared with a visible signature or distinguishing mark identifying the artist, designer, architect or the group of image makers who created it, which is other than the mark of an industrial or commercial manufacturer or scientific organization; or the finished or unfinished work is prepared with a title as art or design that is applied art.

13. A method of making a macroscopic, two or three-dimensional support medium for a work of art, that facilitates the creation and display of a two or three-dimensional work of art,
  making the support medium or work macroscopic and two or three-dimensional, with at least one nanomaterial that is not found in nature and that is other than a carbon nanotube or fullerene added to conductive polymer or to a material that has conductive polymer to improve its conductive or emissive properties,
  making the support medium or work with a macroscopic material or composition that is incapable of actively changing over time using a means more complex than or other than a conventional on/off or dimmer,
  making the support medium or work as or into a whole in and of itself with distinct edges or boundaries,
  making the support medium or work as or into a macroscopic two or three-dimensional work of art, and
  making this artwork so that it is other than a conventional utilitarian: digital photo frame, digital picture frame or portable media player device.

14. The method of claim 13 in which the unfinished or finished, two or three-dimensional support medium and/or aesthetic work is made with paint, with ink, or it is made with paint or ink that is made with at least one nanomaterial.

15. The method of claim 13 in which the unfinished or finished, two or three-dimensional support medium and/or work has a means of display, presentation, mounting or installation.

16. A method of making a macroscopic, two or three-dimensional support medium for a work of architecture that facilitates the creation and presentation of a three-dimensional work of architecture,
  making the support medium or work macroscopic and two or three-dimensional, with at least one nanomaterial that is not found in nature and that is other than a carbon nanotube or fullerene added to conductive polymer or to a material that has conductive polymer to improve its conductive or emissive properties,
  making the support medium or work with a macroscopic material or composition that is incapable of actively changing over time using a means more complex than or other than a conventional on/off or dimmer,
  making the support medium or work as or into a whole in and of itself with distinct edges or boundaries, and
  making the support medium or work as or into a macroscopic three-dimensional work of architecture.

17. The method of claim 16 in which the support medium and/or work is made with a macroscopic material or composition that is made with the at least one nanomaterial.

18. The method of claim 16 in which the support medium and/or the work is made with: polymer, glass, crystal, clay, ceramic, cement, metal, sheetrock, plaster, paper, wood, stone, a gem, fabric, fiber, a textile, yarn or thread; an organic or natural material or composition; a means of having and using electricity; one of these made with at least one nanomaterial; a nanocomposite or hybrid nanomaterial; or two or more of these.

19. A method of making a macroscopic, two or three-dimensional image-making support medium that facilitates the creation and display of a two or three-dimensional macroscopic work of art, design that is applied art, and/or architecture,
  making the support medium or work so that it is macroscopic and two or three-dimensional, and so that it is a whole in and of itself with distinct edges or boundaries,
  making the support medium or work with at least one light emitter that is: a small molecule organic light-emitting diode (OLED) or SMOLED; an OLED free of conductive polymer; a phosphorescent OLED or PHOLED; a stacked OLED or SOLED; or a light emitter made with at least one nanomaterial not found in nature and other than a carbon nanotube or fullerene added to conductive polymer or to a material that has conductive polymer to improve its conductive or emissive properties,
  making the image support or work with a macroscopic, non-light-emissive material, composition or part that is incapable of actively changing over time using a means more complex than or other than a conventional on/off or dimmer,
  making the support medium or work as or into a two or three-dimensional artwork, work of design that is applied art or architecture, and also
  making this aesthetic work other than a conventional opaque utilitarian: computer, camera, phone, digital photo frame, digital picture frame, portable media player device or wrist watch.

20. The method of claim 19 in which the support medium and/or the work is made with: at least one nanocrystal or quantum dot; a means of having and using electricity; a means to electrically power its light emitter; a solar cell and/or a battery.

21. The method of claim 19 in which the support medium, the work and/or a least one light emitter is made partially or wholly capable of flexing or folding.

22. The method of claim 19 in which the support medium, the work and/or a least one light emitter is made partially or wholly transparent or translucent.

* * * * *